US009772971B2

(12) United States Patent
Smith

(10) Patent No.: US 9,772,971 B2
(45) Date of Patent: Sep. 26, 2017

(54) DYNAMICALLY ERECTABLE COMPUTER SYSTEM

(71) Applicant: Roger A. Smith, Santa Fe, NM (US)

(72) Inventor: Roger A. Smith, Santa Fe, NM (US)

( * ) Notice: Subject to any disclaimer, the term of this patent is extended or adjusted under 35 U.S.C. 154(b) by 227 days.

(21) Appl. No.: 14/400,401

(22) PCT Filed: May 23, 2013

(86) PCT No.: PCT/US2013/042324
§ 371 (c)(1),
(2) Date: Nov. 11, 2014

(87) PCT Pub. No.: WO2013/177347
PCT Pub. Date: Nov. 28, 2013

(65) Prior Publication Data
US 2015/0143082 A1 May 21, 2015

Related U.S. Application Data

(60) Provisional application No. 61/651,064, filed on May 24, 2012.

(51) Int. Cl.
| | |
|---|---|
| *G06F 13/42* | (2006.01) |
| *G06F 15/76* | (2006.01) |
| *G06F 15/82* | (2006.01) |
| *G06F 7/76* | (2006.01) |
| *G06F 11/00* | (2006.01) |

(Continued)

(52) U.S. Cl.
CPC .............. *G06F 15/825* (2013.01); *G06F 7/76* (2013.01); *G06F 11/00* (2013.01); *G06F 11/1484* (2013.01); *G06F 11/2002* (2013.01); *G06F 12/0875* (2013.01); *G06F 15/76* (2013.01);
(Continued)

(58) Field of Classification Search
None
See application file for complete search history.

(56) References Cited

U.S. PATENT DOCUMENTS

| | | | |
|---|---|---|---|
| 7,484,032 B2 * | 1/2009 | Smith | .................... G06F 11/203 710/104 |
| 7,984,108 B2 * | 7/2011 | Landis | .................. G06F 9/5016 709/213 |

(Continued)

*Primary Examiner* — Hyun Nam
(74) *Attorney, Agent, or Firm* — Thomas J. Tighe, Esq.

(57) ABSTRACT

A fault-tolerant computer system architecture includes two types of operating domains: a conventional first domain (DID) that processes data and instructions, and a novel second domain (MM domain) which includes mentor processors for mentoring the DID according to "meta information" which includes but is not limited to data, algorithms and protective rule sets. The term "mentoring" (as defined herein below) refers to, among other things, applying and using meta information to enforce rule sets and/or dynamically erecting abstractions and virtualizations by which resources in the DID are shuffled around for, inter alia, efficiency and fault correction. Meta Mentor processors create systems and sub-systems by means of fault tolerant mentor switches that route signals to and from hardware and software entities. The systems and sub-systems created are distinct sub-architectures and unique configurations that may be operated as separately or concurrently as defined by the executing processes.

13 Claims, 45 Drawing Sheets

(51) Int. Cl.
*G06F 12/0875* (2016.01)
*G06F 11/14* (2006.01)
*G06F 11/20* (2006.01)

(52) U.S. Cl.
CPC .. *G06F 2015/765* (2013.01); *G06F 2212/452* (2013.01)

(56) References Cited

U.S. PATENT DOCUMENTS

2007/0005861 A1* 1/2007 Smith ................. G06F 11/2043
 710/264
2011/0302450 A1* 12/2011 Hickey ............... G06F 11/1641
 714/17
2012/0089762 A1* 4/2012 Zhu ....................... H04L 49/109
 710/305

* cited by examiner

| | A-CPU-0 | B-CPU-0 | A-CPU-2 | B-CPU-1 |
|---|---|---|---|---|
| Proc 1 | .75 | .69 | .75 | .75 |
| Proc 2 | .75 | .69 | .75 | .75 |
| Proc 3 | .75 | .69 | .75 | .75 |
| Proc 4 | .75 | .69 | .75 | .75 |

Table G

| | A-CPU-0 | B-CPU-0 | A-CPU-2 | B-CPU-1 |
|---|---|---|---|---|
| Proc 1 | .75 | .75 | .75 | .75 |
| Proc 2 | .75 | .75 | .75 | .75 |
| Proc 3 | .75 | .75 | .75 | .75 |
| Proc 4 | .75 | .75 | .75 | .75 |

Table F

Fig. 42

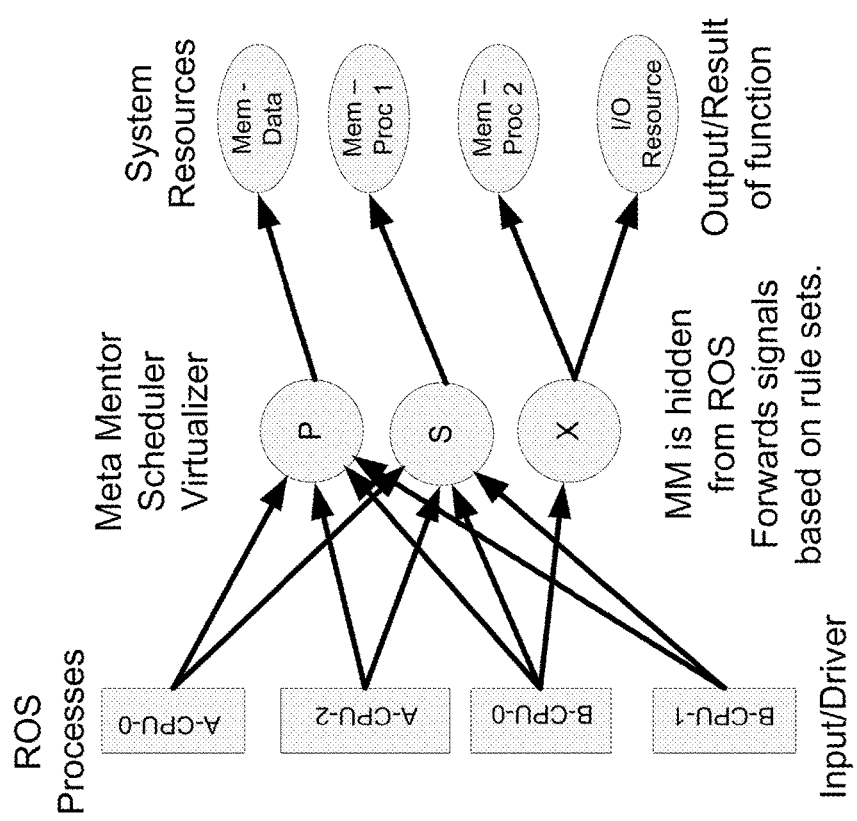
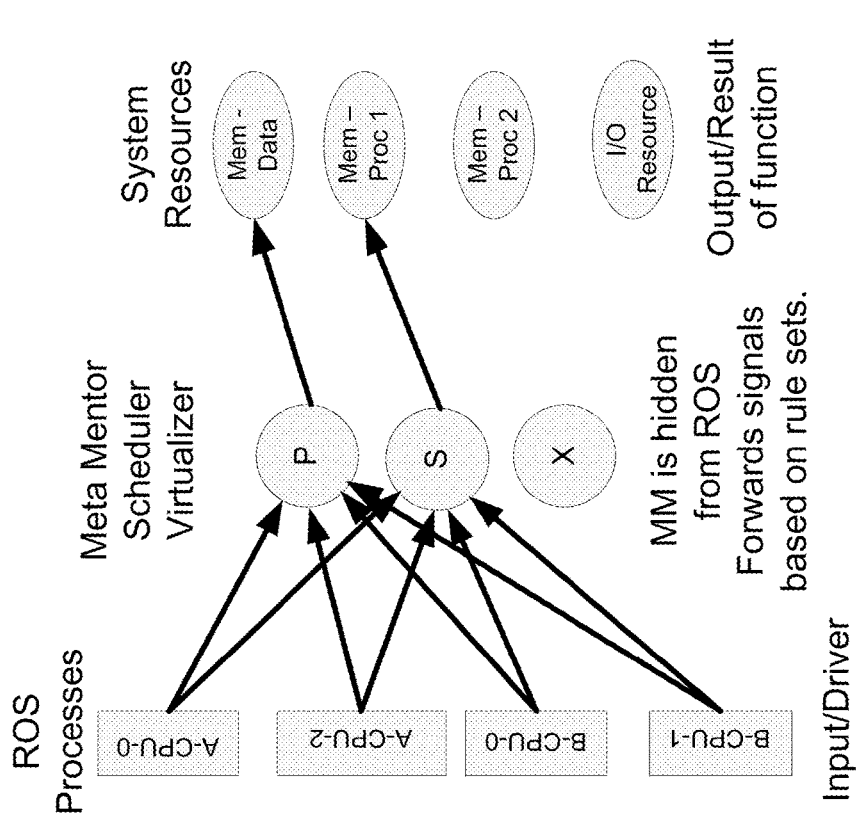
Fig. 43

DYNAMICALLY ERECTABLE COMPUTER SYSTEM

BACKGROUND OF THE INVENTION

The invention is a novel and unique computer architecture that recognizes hardware and software components as individual entities that are dynamically erected to create computer systems and sub-systems that meet functional and performance requirements as defined by executing processes. This invention replaces traditional computer designs with a unique, asynchronous decentralized process that does things existing computer architectures cannot.

The architecture is termed "Meta Mentor" (also referred to herein as "MM") and is a fault-tolerant, distributed processing architecture. Meta Mentor processors create systems and sub-systems by means of a fault tolerant mentor switches that route signals to and from hardware and software entities. The systems and sub-systems created are distinct sub-architectures and unique configurations that may be operated as separately or concurrently as defined by the executing processes.

According to this invention any unexpected or unplanned change in hardware or software operation, intentional or random, is defined as a fault. Intentional faults are considered to be a category of faults that include planned subversion of a system or component. These types of faults are mitigated by two approaches, rule and role based definitions of individual components and processes, and secondly, using algorithms that analyze component and process characteristics. According to this invention, fault mitigation is accomplished by dynamically reconfiguring a functioning system through process assignment and system virtualization.

The MM architecture operates beyond the conventional one domain of reference; MM systems operate in both the data and instruction domain of conventional systems, but also in the meta mentor domain which is independent and distinct from the data and instruction domain, as further explained below. It should be noted that throughout this document, the data and instruction domain is referred-to alternatively as "data and instruction domain" or "DID".

An MM system can be dynamically reconfigured to achieve quorum-based computing, Euler Square paradigms, asynchronous fault tolerance that requires available components (as opposed to redundant components). It is capable of running different operating systems simultaneously, and is not bound to binary-compatible CPUs, (although the applications must be binary compatible with the CPU). The system can also monitor the integrity of application software, prevent unauthorized access from personnel, or programs, and record malware activity.

The unique design of the MM architecture recovers from faults by saving system-state information in a classical checkpoint action. The system can be check-pointed during an interrupt, system-context switch, or forced timeout. In the event of hardware failure, the system or application is automatically restarted at the last checkpoint, and reassigns functioning processes to available hardware. Errant applications, random or intentional, are "blacklisted", and all associated data, storage usage, and state information can be saved for forensic analysis. After the errant application is bypassed and operator notification sent, the system continues to function as if the application was never started. In addition to withstanding hardware or software malfunction and preventing computer virus infections, the exclusive architecture also functions seamlessly with existing operating systems and software.

To explain the Meta Mentor architecture, it is useful to review conventional computer architectures which can generally be divided into two categories, von Neumann (VN) architecture and non-von Neumann architecture. The vast majority of production computer systems incorporate the VN architecture. Referring to FIG. 1, illustrated is a conventional VN architecture consisting of four components: (a) processing unit that has an arithmetic logic unit (ALU) and control registers 2; (b) a control unit that is comprised of an instruction register and program counter 3 (the ALU and the control unit are collectively called a central processing unit and commonly referred as a "CPU" 4); (c) a common memory 5 to store both data and instructions (the common memory illustrated as six "Mem" units); and (d) an input 6a and output 6b mechanism. According to some in the art the phrase von Neumann architecture has evolved to mean a stored-program computer where instructions and data are stored in the common memory, and instructions and data cannot be accessed simultaneously due to the physical limitations of accessing two pieces of data through one data bus. This limitation is called the von Neumann bottleneck and is commonly referenced as the limitation of the architecture.

FIG. 2 shows the VN architecture represented in a Venn diagram. The CPU 4 has an intersection with the System 5. The System in this diagram consists of the memory and the input/output devices. At startup, some event interrupts the CPU and defines an address for a process to be started, which defines the address space of the individual components. In this sense, it's circular logic. The CPU is directly affixed to the system, and a centralized timing signal coordinates all component functions with the architecture. The address space of the CPU defines a domain, which is the entire space the CPU can have direct control. The intersection of the system and CPU represent the circuitry connecting the two entities.

FIG. 3 is a Venn diagram showing the VN architecture in a virtualized configuration. This configuration is seen in several applications today, such as Zones, Zen, Vmware, and others. Virtualization within VN architecture is a software aberration and when the software stops functions, the system reverts to FIG. 2. It is also a single domain system, with the interconnecting circuitry defined by the intersection of the CPU and System.

Referring to FIG. 4, illustrated is another type of computer architecture, the Harvard (H) architecture. The H architecture is differentiated from the VN architecture by separation of the instruction and data information. This means the two types of information are physically separated, and often have a different format. The input/output to a Harvard CPU 4 is basically the same as utilized in the VN architecture. A hallmark of the H architecture is that the instruction fetches and data access does not contend for a single physical path to memory. Implicit in this design are two different and separate types of memory, data memory 7 and instruction memory 8, and two data paths 9a and 9b, one for each type of memory. The H architecture is considered faster than the VN architecture because instruction and data can be acquired roughly twice as fast.

FIG. 5 shows the H architecture in a Venn diagram. The intersection between the Instruction System 10 and CPU 4 can be seen, which represents the circuitry connecting the two. Likewise, the intersection between the Data System 11 and CPU denotes the connecting circuitry. As seen in the VN architecture, a centralized timing signal (or signals) sent from the CPU coordinates all components within the system. Also, like the VN architecture, the H architecture address space defines a single domain, the data and instruction domain (DID) more fully explained below.

The Harvard architecture can be designed such that data, or data memory, cannot modify instruction memory if the memory is read only. However if anyone wanted to modify the instructions, the new instructions would be loaded from the data memory. An application for example, would transfer its execution code from data memory to instruction memory based upon the CPU's, ALU's transfer instructions. This is important when considering the effect of malware that might modify the instruction code causing the CPU of a system to perform unintended tasks.

The H architecture is often characterized as being "memory bound" because the Instruction set execution speed in the ALU is far greater than the memory access time. Thus the speed in which the ALU can process data is limited by the access time to the instruction memory and the execution speed is bound by the memory access time. This problem is often solved by providing the ALU a small amount fast memory, called a cache. In practice there are three levels of cache normally referred to as L1, L2, and L3.

Another architecture combines both H and VN architectures to create a functioning CPU. Internal to the CPU, common VN information is divided into data and instruction H categories. This is usually accomplished in a temporary storage area called a cache. The H architecture handles internal CPU data/instructions and the VN handles external CPU data/instruction transfers. Instruction information can be divided based on an algorithm. A simple algorithm example is to assign address range 0-500 as instruction and 501-1000 as data. This rule is determined by the electronic design, and can never be changed after manufacture. A control unit is connected to address space 0-500 and the ALU to address space 501-1000. This defines an H architecture where the address space of information is divided into either logic or data information as shown in FIG. 4. This address space between the control unit and the ALU is a one-to-one relationship in a VN or H architecture, as shown by in FIGS. 1 and 4.

Also shown in FIGS. 1 and 4 are the external input 6a and output 6b modules. These modules receive or process information by electronic signals external to CPU. This relationship is determined at electronic design time and cannot be changed after manufacture. The input/output, information or data areas, and control are determined by a fixed electronic pathway. How information is classified as instruction or data is determine by software algorithms that function in the control unit and ALU. The control unit requesting information from the data memory can change the information to instruction information.

How the algorithm is executed can be accomplished by the electronics or the algorithm. In the algorithm case, what is data and information is decided by the algorithm, which is circular logic. The electronics defines the hardware address space by how the pins are connected. Together they define a domain, a DID. The address space is all information, data or instruction, the algorithm or electronics can control by an algorithm within the address space. Furthermore, when information is exchanged between components they adhere to periodic signals common to all devices that define the state of the communication. This is usually provided by the CPU to external devices within its domain and this signal is timed with internal devices. This defines a synchronous system, where a common periodic signal, such as a clock, governs components states during information transfer.

Functionally, a CPU has other components. A temporary information storage area, called a cache, is typically where data and instruction information is categorized. An example is shown in FIG. 7. The L2 Cache 12 receives information from the Common L3 cache 13 and associated elements. The L3 cache is VN architecture and the L2 cache is H architecture. These internal memory components create high speed memory transfers within a predefined network of electronic paths located within CPU.

Referring again to FIG. 7, externally the CPU uses von Neumann's architecture. Using this architecture the CPU emanates, receives, and processes (information) signals with devices that are external to the CPU. These devices are usually slower than the internal devices. The flexibility and practical considerations make VN the architecture of choice external to the CPU. External devices electrically transfer information to instruct the CPU how to function. The CPU operates on external memory information, both data and instruction information, and operates as a von Neumann machine. In practice data is transferred between the VN and H architectures in bulk, through a process called direct memory access (DMA). The DMA process bypasses the CPU and transfers information faster than the normal CPU read/write process.

Another computer architecture is called tagged token or dataflow. The VN and H architectures can be categorized as control flow architectures and feature a CPU, memory, and their transfer within. Dataflow systems do not theoretically have a program counter and execute processes by the availability of the input data to an instruction set. It is billed as an artificial intelligence engine, a data-driven parallel computer professed to have a simple architecture that acts as a kind of neuron. This system has several registers or processes that execute based upon signals that the data has arrived. Dataflow architecture can be evaluated/contrasted in terms of control flow architecture.

Referring to FIG. 6A, illustrated is a comparison of a control flow and a dataflow program. The Equations define the problems to be solved. The left hand shows a conventional control flow architecture and the right side the dataflow architecture. The solid arrows and lines point to the locations and flow of the data. In a memory program each process stores the resultant in a common memory location that is accessed by the next process in a session of processes. The dashed arrow lines show the instruction progression. The Tagged Token model places data into the process memory directly. When a process is filled with the required input tokens, the process is fired and its output is pointed to defined processes input or placed in memory outside the Tagged Token processing element.

In practice, the Dataflow architecture has a several processing elements which can communicate with each other. One such processing element is described in FIG. 6B and consists of a matching unit 21, fetching unit 22, functional unit 23, and associated memory, 24a and 24b. It can be noted that in simple dataflow machines the matching and fetching units are combined into a single processing element called an enabling unit that has a single memory. However, when input tokens become numerous or grow in size, the enabling unit is configured with two memory types, each attached to its processing element.

The matching unit stores tokens (data) in its memory and checks the availability of the destination node shown as the Fetching unit. This requires information on the destination address and the process tag. When all of the tokens for a process instance are assembled they are sent to the fetching unit, which combines them with a node description (This is analogous to instructional memory). The node description is stored in the memory for nodes and forwards this information onto the functional unit where the process is executed.

Inside the CPU

The VN and H architectures can be seen in CPU designs. For example, FIG. 7 shows a conventional microprocessor architecture that is representative of a typical CPU. Depicted in FIG. 7, an L2 cache 12 is synchronously connected to an Unicore module, consisting of an L3 cache 13, memory controller 14, Quick path Enter-Connect (Inter-Connect) 15, and a Quadruple Associative Instruction Cache 16. It can be seen the instruction and data memory use the L2 cache. The L2 cache feeds one data path 17 that is connected to the instruction cache that ultimately feeds the Decoded instruction queue 18; the other path feeds the Data Cache 19. The L2 cache is a von Neumann memory with Harvard categories and is connected with other von Neumann style memories via the L3 cache in the Unicore module. Although it can be argued there is some virtualization of the various caches, these are passive devices where timing signals and address space are sent to and from a predetermined device and information is always located in a predefined device whose timing signals and data path cannot be altered, thus defines a single domain, a DID, with a single purpose dedicated to one device. In this system having a single domain, data and instructions can be interchanged creating computational corruption hazards.

The Translation Lookaside Buffer (TLB) 20, shown in FIG. 7 as "L2-TLB", references the physical (primary) von Neumann memory. A TLB has a fixed number of slots that contain page table entries, which maps virtual addresses to physical addresses. This space is segmented in pages of a prefixed size; one page for each table entry. The TLB has two modes, physical address and virtual address, depending where the TLB is located. When the TLB is located between the CPU cache and primary memory storage the cache is physically addressed. In physical addressing, the TLB performs a lookup on every memory operation and the information located in the primary memory is copied to the cache.

When the TLB is located between the CPU and cache, the CPU TLB is only referenced when a cache miss occurs. FIG. 7 shows the L2-TLB connected to a CPU consisting of the Quadruple Associative Instruction Cache 16 and Octruple Associative Data Cache 19. The L2-TLB is also connected to the L3-Cache and Memory controller which is a type of hybrid physical/virtual location.

A Harvard architecture CPU takes a different approach. In a pure Harvard architecture, as described above, instruction and data memory are physically separated and can be seen in the two data paths or data busses external to the Harvard architecture CPU; one leading to the instruction memory and the other is connected to the data memory, which leads to two distinct cache types, one for the instruction memory and the other for data memory.

Although there are several commercial examples of a pure Harvard architecture, in practice most Harvard architecture use modified designs of the Harvard architecture and are sometimes referred to as 'modified Harvard architectures'. In this modification a common memory device is used and the separation between data and instruction memory is divided by memory address space and not physically separation. This allows for the Harvard's architecture improved performance with a type of common memory. However, current CPUs typically separate the data and instruction memory within the CPU cache. This can be seen in FIG. 7, where the information signals travel from the L2 cache instruction memory address space to the Quadruple Associative instruction cache. Also shown in FIG. 7 is the L2 cache data memory address space providing information to the Quadruple associative data cache via a permanent connection labeled "256". Once the information is separated in the data cache and the instruction cache the remaining processes act like Harvard architecture. Also shown in FIG. 7 is the permanent connection between the L2 and L3 caches, which provides a pathway from the CPU's internal components to the CPU external components. It is notable that the information pathway to and from the L2 are dedicated and timed to devices located within the CPU. This constitutes a single process domain, a DID.

Multiple Core Processors (Homogeneous)

Referring to FIGS. 8A and 8B, two or more Central Processing Units (CPUs) can be packaged in a single chip and two examples are shown. In this configuration each processing unit is independent of one another but share internal resources and a common external interface. In packages that have multiple internal CPUs, each CPU is referred as a core. Cores share resources as described above. A package can contain many cores. FIGS. 8A and 8B show two types of dual core (CPU) processors. FIG. 8A is a dual core processor with respective L1 caches 25 and a shared L2 cache 26. Each core is directly connected to the L2 cache and each I/O Control manages the instruction and data memory in the shared cache. As illustrated in FIG. 8B, each core has an individual L2 cache 27 that is not shared. In each case, the external interface is configured by the memory controllers 28 or bus interface 29 and is defined by the core address space.

Referring to FIG. 9, shown is a sixty-four core CPU. FIG. 9 is a representative of a multiple core CPU as there are no theoretical limits to the number of CPU's, although there are practical limits that involve manufacturing the package. The devices on the left side of FIG. 9 depict how this configuration transfers information to and from input and output apparatuses external to the CPU. Also shown on top and bottom are four memory controllers 30 that reference the physical (primary) von Neumann memory. The cores 31 transfer among themselves through a 2-D mesh network. FIG. 9 has five paths in its network node, each path dedicated to transferring one type of information. The information is segregated to increase transfer speed within the internal network. Attached to each core is a mesh switch 32 (FIG. 9, detail A) whose purpose is to transfer information to and from each core and separates the information into the five data paths. Internal to each CPU core, are the L1 and L2 caches as shown in FIG. 9, detail B. In this particular representation the L1 cache has Harvard architecture and the L2 cache von Neumann architecture. The L1 Instruction and Data TLB determine their respective memory space within the L2 Cache. A unique feature of this device is its ability to share L2 cache between cores.

Multi-Core Processors (Heterogeneous)

Some other configurations of multiple cores in a single CPU package are called graphics processing units that employ a type of processing unit called a GPU in addition to a CPU. GPUs are devices designed to do calculations related to 3D computer graphic cards. Because 3D graphic computations involve complex mathematical operations, GPUs are designed to perform mathematical operations with high speeds and efficiency. GPUs can be employed to perform non-graphical calculations. When a GPU design is used for this purpose, the device is referred as a GPGPU (general purpose GPU). The model for GPGPU computing is to use a CPU and GPU together in a hierarchical, heterogeneous computing model. The sequential part of the application runs on the CPU and the computationally-intensive part is accelerated by the GPU. In this heterogeneous model the CPU and GPCPU memory operates in conjunction with its memory in von Neumann, Harvard architecture, or modified Harvard architecture.

In practice, the application (code) is started on the host CPU, which is tasked to distribute the compute-intensive portions of the application to a GPU. The rest of the application remains on the host CPU. Mapping a compute intensive function to a GPU involves a process called parallelizing. Manufactures of GPGPU devices provide special compute commands that facilitate parallelization processes that move data and instruction information to and from a GPU. The individual who develops the application is tasked with launching 10s of 1000s of instruction snippets called threads simultaneously to the GPUs using these compute commands. The GPU hardware manages the threads and does thread scheduling.

Referring to FIG. 10, a conventional GPGPU and GPU architecture is illustrated. One function of this design is to display pixel values on a video display from an input algorithm. The host 33 sends an algorithm call geometric primitive to the GPGPU input assembler 34, which is usually a CPU that schedules a series of GPUs to calculate a pixel value on a computer screen. The thread processor assigns various thread issue(s) to calculate the pixel value. The thread processor function can become quite complicated as it is transformed from primitive to pixel, using various shading and rendering hardware and software, but the bottom line is the GPU deposits a pixel value information into a frame buffer (FB) memory 35. The FB memory is displayed on the computer screen and the image is displayed to a user.

Referring again to FIG. 10, a process from the host is transformed into pixel values deposited to the FB memory. A process sent from a host is routed to the input assembler GPGPU. The input GPGPU in conjunction with the thread schedule segregates the host process, by function, and assigns the segregated sub-processes to the thread issue hardware and the texture processing cluster (TPC) for processing. This action, in effect, breaks the host process into segments that are processed separately by the individual TPCs. The TPC output results in ordered pixel value blocks associated with the segregated sub-process that are routed to the associated frame buffer memory by the thread processor. In this fashion the pixel value blocks are aligned with a video display in a human readable format. The raster operations processor (ROP) puts the finishing touches on the frame buffer pixel values. From a memory perspective, instruction memory in this device is determined at the device's design and resides internal to the Thread Issue, TPC, and ROP hardware. Data is passed from the Host and deposited into FB memory. In this configuration it is a modified Harvard architecture where data and instruction memory are separated.

The type of heterogeneous system shown in FIG. 10 can be applied to solve general computing problems. The basic process for CPU/GPGPU application computing is the same as the graphics card, with the addition of a bi-directional bus to the CPU and memory.

FIG. 11 illustrates a TPC module and the basic process flow of a GPGPU. Two types of processing units are shown, sp 36 and tp 37. The stream processing units (sp) and special function unit (SPU) 38 process the math. The texture processing units (tp) process texturing. All sp units perform the same functions for a single cycle, acting as a single processor processing multiple values. The same can be said for the tp units. The interconnection network 39 routes data information requests from the host and input assembler via the thread processor. The TPC process engines generate their address space and the interconnect network performs a one-to-one mapping between TPC address space and individual ROP and shared memory. Together the ROP and shared memory (L2) are referred to as shared parallel memory. When used as a generalized computer, the frame buffer 40 is referred as the global memory and communicates by transferring sequential grids via permanently connected shared memory. The memory configuration remains the modified Harvard architecture, where data from the host is handled by input assembler and passed on to the TPC for further processing in the same manner described above. Using the GPU device to solve general computing problems, data information is passed to the host for storage or further processing.

Grid Computing:

Grid computing is a term referring to the combination of computer resources from multiple administrative domains, each domain being conventionally a DID, to reach a common goal. The grid can be thought of as a distributed system with non-interactive workloads that involve a large number of independent system DIDs. It is a sharing of computing resources in a related manner, similar to a gas or electric grid sharing resources to deliver a service to a customer.

For example an electric consumer turns on a light and consumes electricity from sources that seem to appear as needed and you pay for what you use. The light bulb does not require the use of the total capacity of the system, and the grid resources are shared by others who are attached to the same grid. In the case of grid computing, it is useful to divide the resources into the "front end" and the "back end". The front end is analogous to the consumer whose light is using the grid resources, and the back end is analogous to the dams, power plants, transmission lines, and control systems supplying the resource to the light. In computer terms, the back end grid computing refers to the various computing systems that include computing/computational resources, storage resources, and control systems that route the information from resource to resource. The front end is the resource user, a PC or MAC, is requesting a back end service to accomplish a task, algorithm, or other request.

Each device on a computing grid is represented by an individual computing resource domain, conventionally a DID. There are many of these resource domains and when a front end user executes an application using grid computing; a combination of computer resources from multiple system DIDs combine to reach a common goal and form a single process domain. This combination may or may not happen simultaneously. The process domain convergence is accomplished by the front end user requesting grid resources and back end creating the request. The resource sharing is not primarily file exchange but rather direct access to computers, software, data, and other resources, as is required by a range of collaborative problem solving and resource-brokering strategies emerging by grid users. A set of individuals and/or institutions defined by such sharing rules form what is called a virtual organization using a single process domain, a DID.

Cloud Computing

Referring to FIG. 12, illustrated are several variations of grid computers that are often referred as cloud computers. These computers are available including, but not inclusive, cloud, volunteer, network, utility, and more. There are private and public clouds, hybrid clouds, community clouds and more. One problem with grid computing is security.

Concerns about loss of control over sensitive data, such a passwords, email, or file information, and the lack of security for remotely stored kernels owned by anonymous operators that are beyond the administrative control of front end user is a problem for grid computing.

Cluster Computing

Cluster computing is defined as linking two or more computers usually via local area networks that work together as a unit, sharing computing resources such as common disk space, power, and networking. It is similar to grid computer, but with cluster computing all resources within the cluster are dedicated, closely coupled, and locally connected. There are two basic memory models in cluster computing, parallel and distributed models shown in FIGS. 13 and 14.

Referring to FIG. 13, the parallel memory model has memory permanently attached to a processor. Information needed to perform a common task is passed through processor communication. This type of cluster share features two or more CPUs 41 sharing a common memory 42. It is also called a Common Memory Architecture or Shared Memory Architecture. This arrangement is similar to the multi-core CPU or GPGPU described above. This arrangement involves connecting the buses of several processors together such that all memory is available for all processors on the shared bus or only inter-processor communications share a common bus. Shared memory systems usually operate with a single operating system either with a master processor partitioning the shared memory and several slaves operating in their respective partitions; or with all processors running separate copies of the operating systems with a common arbitrated memory and process table.

Distributed cluster memory configuration is illustrated in FIG. 14. Several computer entities 43, each running their own operating system are networked together. Parallelism is accomplished by parent nodes passing child processes to another networked entity, where the completed process passes the result back to the parent entity.

Both distributed and parallel cluster systems share common resources that are physically connected. These shared resources extend beyond the memory models in FIGS. 13 and 14 to shared peripherals such as disk space, networking resources, power, and more. The resources are networked together to form the cluster. The physical implementation is accomplished one or more types of network topologies and protocols. Topologies include: point-to-point, bus, star, ring, mesh, tree, hybrid, daisy chain. Some of the variations on each type listed are centralized, decentralized, local, wide, logical, and physical. When applied to cluster technology each system utilizes a network configuration to send signals between systems and to common resources.

One such network is called a switched fabric. FIG. 15 illustrates a switched fabric network in a mesh topology and configured as a synchronous fault tolerant system. For example, Host' 44 requests services from a Resource2 and the transaction is carried through either switch 45 or switch 46, depending on the how Host' requests the resource. Should one switch fail, the all traffic is routed through the remaining switch. While both switches are functioning properly the system is fault tolerant, however after one switch fails, the system is not fault tolerant until the failed switch is repaired.

FIG. 16 illustrates another type of network called a Clos network. A Clos network is a multi-stage circuit switching network that has seen application in cluster networking. This network features middle stage crossbar switches 49 that are able to dynamically route signals between hosts 47 and resources 48. For example, Host' requests services from a Resource2 and the transaction is carried through either Switch1 or Switch2, depending on the how Host' requests the resource. Should one cross bar switch fail, the all traffic is routed through the remaining cross bar switch. When all cross bar switches are functioning properly the system is fault tolerant, however after one switch fails, the system is not fault tolerant until the failed switch is repaired.

In addition to the conventional architectures described above, there are more, too numerous to list. They all have one thing in common; all processes and sub-processes are initiated by a processor unit that operates within one DID defined by the processor's frame of reference whose extent is the address space of the processor. In some cases, a parent process can pass a child process to another DID for sub-processing. The child process's DID is another independent domain whose extent is defined by the address space of the processor unit running the child process. Even in shared memory computer architectures, the frame of reference is defined by the processor's address space that operates only on data and instructions within that address space and this constitutes one domain, the data and instruction domain (DID).

The MM architecture has the ability to dynamically define and re-define the data and instruction information address space. This eliminates the distinction between the von Neumann and Harvard architecture because both of these architectures define their address space in terms of the processing unit. The MM architecture logically defines the address space; making the physical location of the memory irrelevant and beyond the scope of a central processing unit. Furthermore, in the von Neumann and Harvard architectures, the processing unit, or a process emanating from the processing unit, schedules when and how their processes are run. The MM architecture uses one or more MM processors to schedule processes on slave processor units (SPU) operating in the DID. All requests for processes are handled and scheduled by the MM algorithms. Furthermore, in all architectures information is exchanged between components along predetermined paths that adhere to periodic signals common to all devices and define the state of the communication. In the MM architecture these paths are determined by the MM processor, and the periodic signals are common to MM devices, rendering the information exchange among devices asynchronously.

BRIEF SUMMARY OF THE INVENTION

The Meta Mentor (MM) architecture according to this invention includes at least two domains of reference. One domain, the DID, handles processing information including data and instructions, and an MM domain (alternately referred-to as "mentor domain") which dynamically defines and reconfigures as needed the address spaces of the DID. In addition the MM domain contains the data and instructions for the DID, schedules processes executed by processors in the DID, and monitors the DID according to a set of rules pre-stored in an MM cache and accessed by an MM processor. The rule set establishes invariant guidelines and limitations on DID processes and events, rules designed to protect against faults and malware, as explained in more detail below.

Definitions of terms used in the specification and claims herein: The term "set" means one or more in quantity but does not include a null set. The term "subset" means some or all members of a set. The term "meta information" refers to data, algorithms and rule sets used by mentor processors for mentoring as described herein. The term "mentoring"

means applying and using meta information in the MM domain to dynamically monitor, control, configure, and reconfigure the DID in the ways described herein. Examples of mentoring include, but are not limited to: creating abstractions and virtualizations according to meta algorithms and enforcing meta rule sets. Definitions of other terms can be found in the specification, claims and drawings.

The MM architecture according to this invention makes possible a dynamically erectable computer system comprising a DID and a mentor domain. The DID generally includes a set of processors operating only in the DID, and a set of memories operable in the DID. The mentor domain (also referred-to as the MM domain) generally includes meta information, a mentor domain memory containing the meta information, a set of mentor domain processors including access to the mentor domain memory, and a set of mentor switches providing communication between the sets of processors and memories in the DID, the set of mentor switches cooperating with the set of mentor domain processors for mentoring all said communications according to the meta information. The set of DID processors can include one or more processors having a Von Neumann, Harvard, modified Harvard, or dataflow architecture. The mentoring further includes receiving system interrupts and selectively assigning interrupt service processes to the DID processors and memories, abstracting system input and output activities. The mentor switches generally include dynamically configurable communication paths between the DID processors and the DID memories, and the switches cooperate with mentor domain processors to selectively configure and reconfigure as desired the communication paths according to the meta information.

In another preferred embodiment mentoring is done at the processor core level. In this embodiment the mentoring includes virtualizing information being transferred to and from one or more core caches, e.g., instruction caches, data caches, levels two and three (L2 and L3) caches. Mentor switches provide communication paths between cores and such caches, the mentor switches cooperating with mentor domain processors for mentoring all such communications according to meta information contained in a MM cache. In another similar embodiment involving multiple cores, there are two MMs. There is a MM that mentors all communications between an instruction bus and a data bus, and an L2 cache, like the previous embodiment, but in addition there is a core mentor switch interposed between the control units and arithmetic-logic units of each core. A core MM processor cooperates with the core mentor switch to mentor communications between the cores' control units and respective and arithmetic-logic units. Preferably the two MMs communicate for coordination.

In another embodiment multiple DID processor cores are partitioned into blocks. Each core of each block contains an instruction and data cache. Each block includes a block meta information, a block MM memory functioning as a virtualized L2 cache for the instruction and data caches, a block mentor domain processor, and a block mentor switch. Preferably the L2 cache is virtualized into at least multiple partitions for each block by the block mentor domain processor in cooperation with the block mentor switch according to the block meta information. In addition this embodiment includes a set of DID memories, overall meta information pertaining to all blocks, an overall mentor domain processor including access to the overall meta information, an overall mentor switch providing communication between all the blocks and the set of DID memories, and a communication link between all the blocks and the overall mentor switch.

In systems involving multiple DID processors or cores, preferable embodiments of the mentor domain include a first memory containing a master set of rules accessible to a first processor functioning as a rules server, a set of secondary processors each mentoring a subset of the multiple DID processors, a set of secondary memories accessible to corresponding secondary processors, each secondary memory containing a subset of rules relevant to the mentoring being done by its corresponding secondary processor. In this case the first processor serves the relevant subsets to the secondary memories.

In another preferred embodiment, there are a plurality of computer sub-systems, each including a DID and an MM domain. The DIDs each include a set of DID processors and a set of DID memories. The MM domains each include meta information, a mentor domain processor, a mentor switch cooperating with the mentor domain processor for mentoring all communications between the DID processors and DID memories according to the meta information, a communication link for transferring information in the DID among the plurality of computer sub-systems, and a communication link for transferring information in the meta mentor domain among the plurality of computer sub-systems. This embodiment may also include a plurality of sensors each communicating with the plurality of computer sub-systems, and a plurality of display devices each communicating with the plurality of computer sub-systems.

BRIEF DESCRIPTION OF THE DRAWINGS

FIG. 42 are more tables illustrating output of the Meta Mentor system according to FIG. 40.

FIG. 43 illustrates mathematical techniques such as, analysis of variance or neural networks used to define a Meta Mentor system.

DESCRIPTION OF THE PREFERRED EMBODIMENTS

Figure 17:
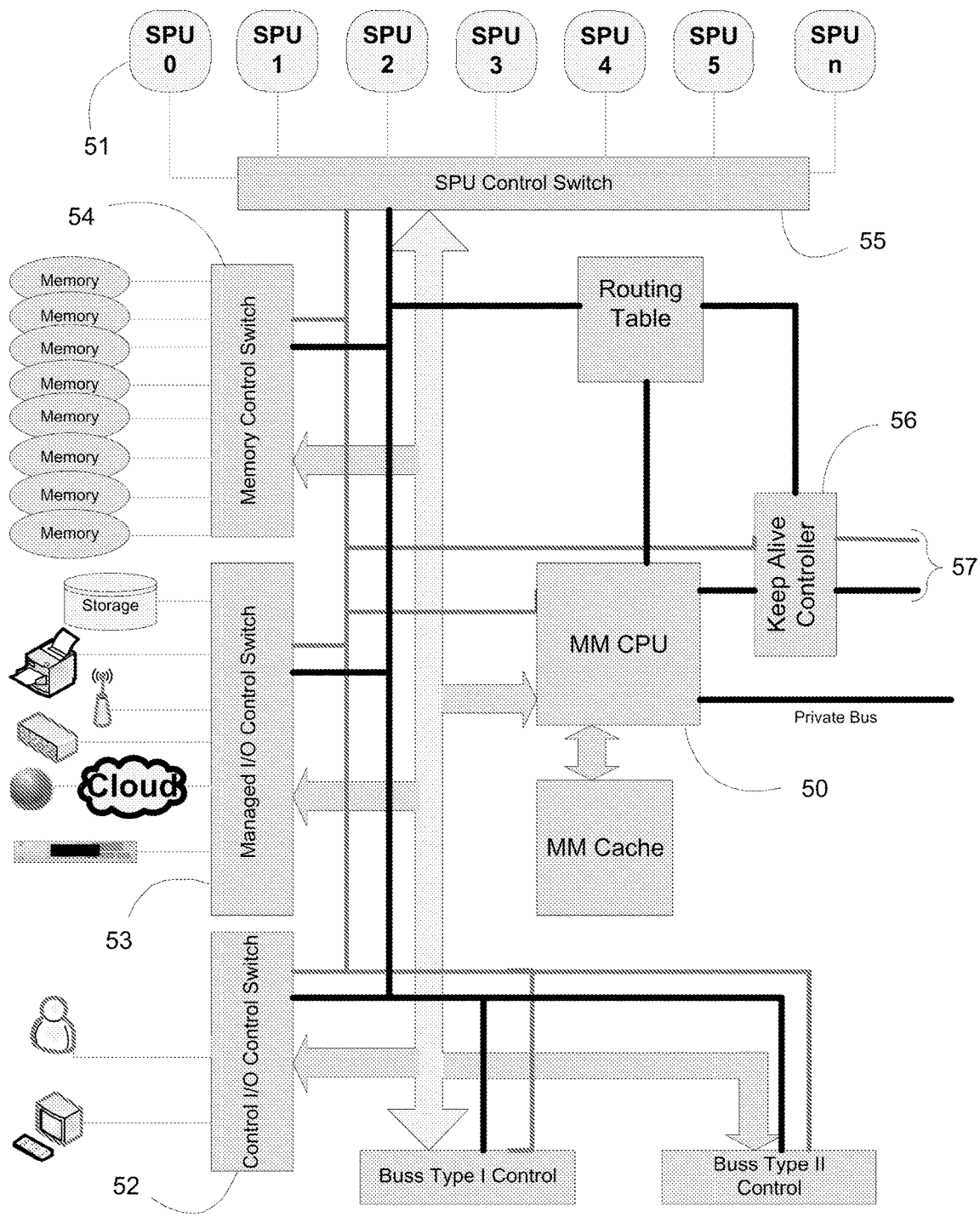
FIG. 17 is a functional block diagram illustrating a Meta Mentor controlled multi slave processor system.

Referring to FIG. 17 illustrated is a basic Meta Mentor (MM) in block form using a virtualizing switch that is represented by the "SPU Control Switch". This MM architecture as disclosed herein is analogous to the invention addressed in U.S. Pat. No. 7,484,032 B2 but distinctly novel. Also shown in FIG. 17 are the logical controls for the switch, MM CPU, MM Cache, Routing Table, and Keep Alive Controller. Included is an MM central processing unit (MM CPU) 50 which can be a single device or a series of devices that operate to perform this function. The MM can even be implemented in a state machine. According to the invention disclosed herein, the MM CPU operates in the MM domain and runs the overseeing algorithm that monitors, stores, and controls all of the events pertaining to the machine. It schedules threads to an array of slave processing units (SPUs) 51, monitors their progress and can detect faults signals. It distributes system and I/O resources and creates interrupts to the SPUs, and stores their memory stacks. The MM CPU also decides which SPU will continue a process following the servicing of an interrupt. This means that the SPU that was interrupted will not necessarily be the same processor to which the MM CPU returns the stack information; the MM CPU can decide to return the stack information to a different SPU (running the same operating system). By the same token, the same operating system may or may not be assigned to the same processor when servicing the interrupt. As long as the operating system is compatible with the SPU it will be up to the MM CPU algorithm to determine which processor will be assigned to an operating system. In addition, to handling the interrupt and stack, the MM CPU algorithm handles and stores all events leading up to an interrupt. In this way, the MM CPU always knows the state of every process on the machine. Each MM can include a plurality of control switches: control I/O 52, managed I/O 54, memory 54, and an SPU switch 55 for selecting among the plurality of SPUs.

Referring again to FIG. 17, also shown is a keep alive controller (KAC) 56 whose function is to transmit and receive information to and from other MM machines or devices outside the MM's frame of reference. Preferably the information is shared among MM devices via data and control lines 57, and includes process data, process table, machine state, and according to this invention other information, e.g., cloud key and sequence information, and scheduling and I/O information as will be explained below in connection with FIGS. 35 and 39.

The MM according to this invention has the ability to dynamically route signals between computer peripheral components and processing units based upon a rule set and/or algorithm. In a Meta Mentor architecture there is no central processor or defined system. In the preferred design, a logical switch that does not switch physical connection between components processes the signal information and logically determines the connection. The logical style switch is called a Mentor switch.

The purpose of the Mentor switch is to provide an abstraction layer between the processing units and resources and to schedule applications and processes. The Mentor switch processes address information from a processing unit and translates it into another virtualized address, or preferably two or more addresses, that physically stores and retrieves the information in the case of a memory read and writes. It does not have to modify the data, although it could, for example, encrypt data. The logical part of the switch determines how the switch functions. There are several logic properties that will be described later, but basically the logical part controls how the address signals and control signals are processed. The logic represents another process domain that controls the functions of the first domain. This arrangement may be recursive; where the switch can be placed within a computer system at different layers and can transfer signals among the mentor switches to facilitate their functioning and operations. Mentor switches communicate information among other Mentor switches or among system components comprise a system. A system exists while the Mentor switches perform these communications and the system ceases to exist at the end of their communication. In non-recursive configurations the Meta Mentor communicates with other recursive Meta Mentor systems to create multi-domained systems. Like recursive MM systems, these multi-domained systems exist when the MM communications and tasking takes place and cease to exist when at the end of their communication.

Figure 18:
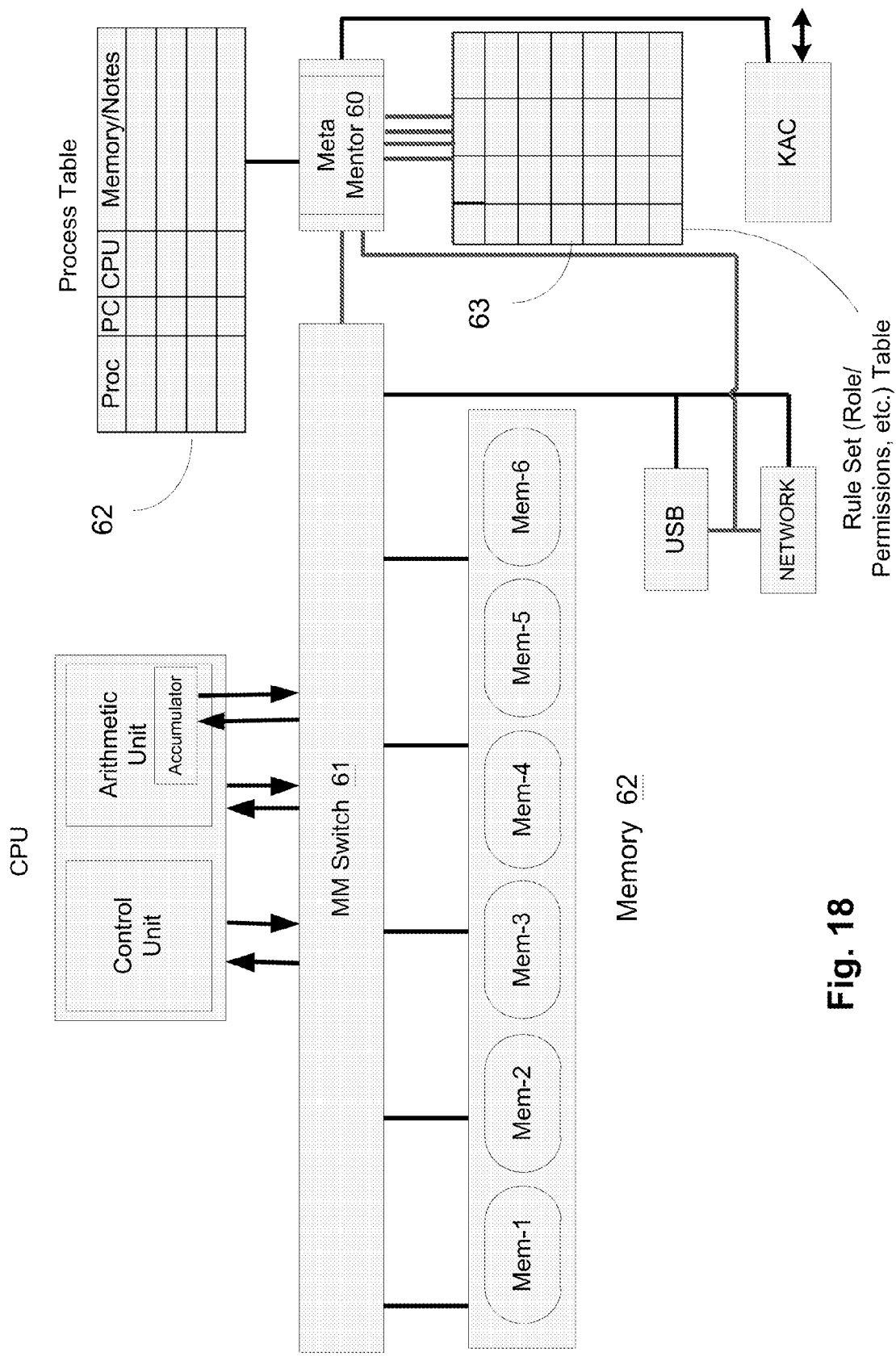
FIG. 18 is a functional block diagram illustrating a Meta Mentor incorporated according to this invention in a von Neumann style computer system.
Figure 19:
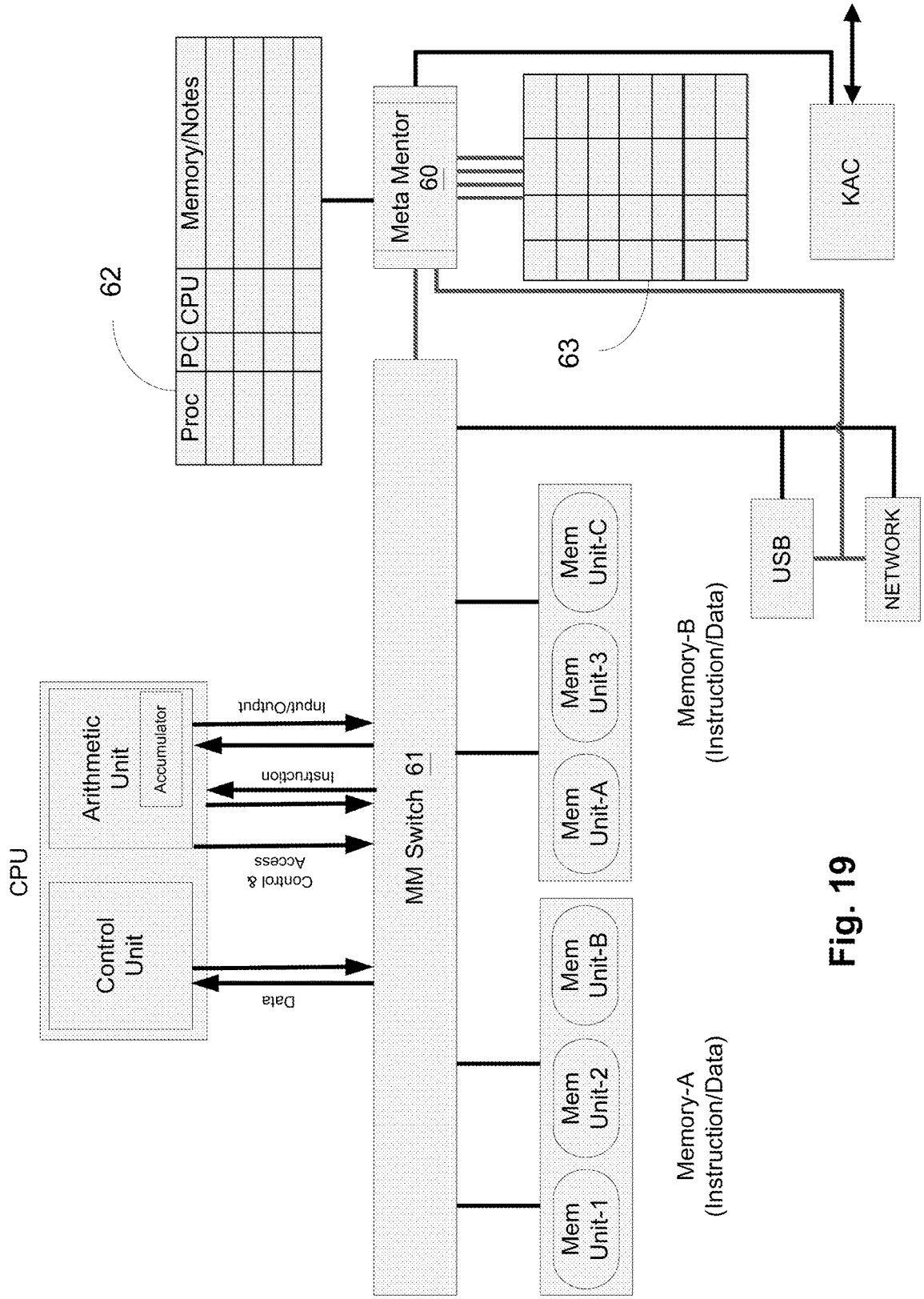
FIG. 19 is a functional block diagram illustrating a Meta Mentor incorporated according to this invention in a Harvard style computer system.

Referring to FIGS. 18 and 19, shown are Meta Mentors 60 according to this invention incorporated, one each, in von Neumann and Harvard architecture configurations. In each case, the request for memory, either instruction or data memory, is transformed by the fault tolerant MM Switch 61 (e.g. the memory control switch 54 illustrated in FIG. 17) as prescribed by the MM logic and algorithms run, e.g., by an MM CPU (50 in FIG. 17). In the von Neumann case (FIG. 18), the CPU request for either data or instruction memory is transformed by the MM and is logically separated into data and instruction regions within the overall memory 62 illustrated as multiple memory units Men-1 through Men-6. This effectively transforms von Neumann architecture into Harvard architecture. In the Harvard case (FIG. 19), the CPU request for data memory is transformed into any memory location within Memory-A or Memory-B. Likewise, any CPU request for instruction memory is transformed into any memory location within Memory-A or Memory-B. The access control lines are connected to the MM Switch and may or may not have interaction within the overall system. Furthermore, Memory-A or Memory-B does not have to be compatible with the CPU. So if Memory-B has a 24-bit storage unit, the MM can transform a CPU read 8-bit data memory request into two or three 8-bit reads from the 24-bit Memory-B. Likewise, the MM can transform a CPU 24-bit instruction read into three reads from the 8-bit Memory A, which may or may not occur simultaneously. Because in the Meta Mentor architecture the overall system memory does not require a physical separation of data and instruction memory, it can be considered von Neumann architecture even when the CPU (SPU) has Harvard architecture construction.

Referring again to FIGS. 18 and 19, both MMs 60 communicate with respective process tables 62 and rule sets 63, for establishing invariant guidelines and limitations on DID processes and events run by the CPUs, rules designed to protect against faults and malware. The tables and rule sets are stored in MM domain memory, and the contents of same vary depending on the applications and system environment. The process tables contain allowable processes and information pertaining to them, e.g., process identifiers (proc), program counter information for each listed process, the CPU associated with each process listed, and other memory and/or information of note pertaining to respective processes.

Figure 20:
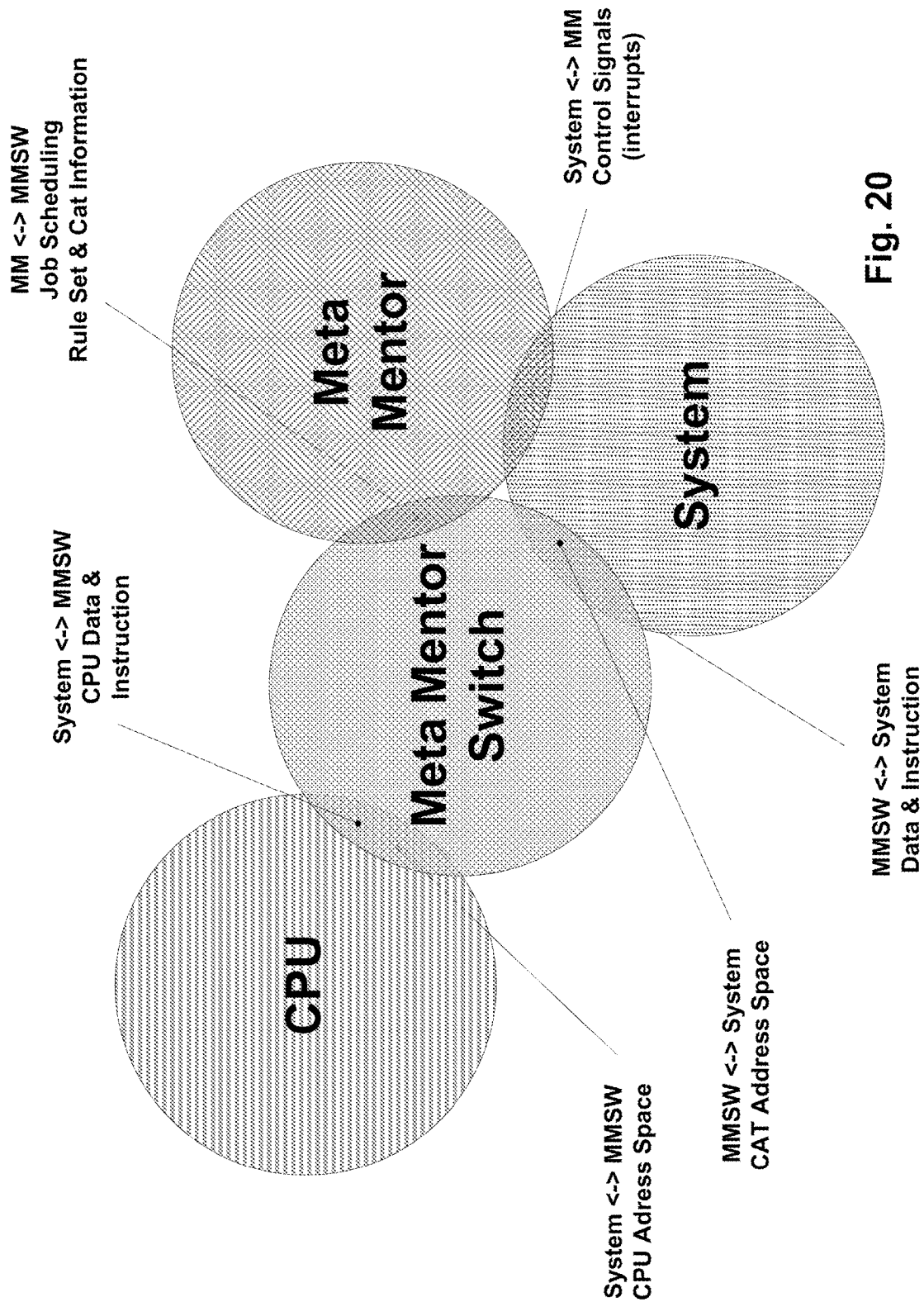
FIG. 20 is a Venn diagram illustrating the Meta Mentor architecture according to this invention.

FIG. 20 illustrates the Meta Mentor architecture in a Venn diagram. The CPU intersects the Meta Mentor Switch, not the system. The System also intersects the MM switch, and is disjoint with the CPU. This allows the MM switch to asynchronously virtualize the CPU (or CPU array) and System. The intersection between the MM and System represents the signal control lines, such as interrupts, which is part of the scheduling process. This creates two domains. The CPU domain handles the instruction and data information, and the MM domain virtualizes the address space and handles control and scheduling.

Figure 21:
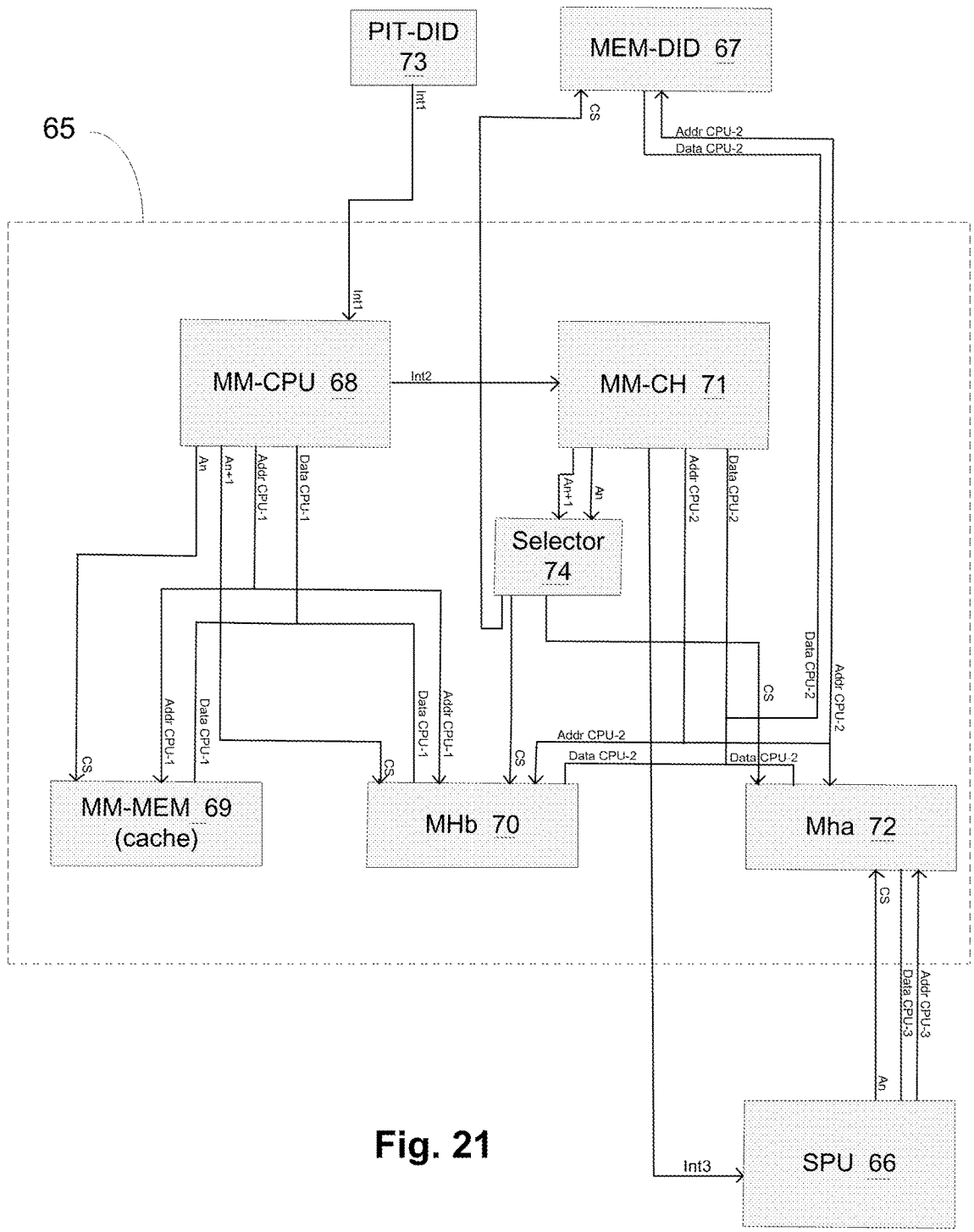
FIG. 21 is a functional block diagram illustrating in more detail a Meta Mentor switch incorporated according to this invention in a single processor, single memory computer system with a programmable interrupt timer.

Referring to FIG. 21 illustrated is a Meta Mentor operating in the MM domain controlling a single processing unit, SPU 66, and single memory MEM-DID 67 operating in the DID. The dashes lines 65 in FIG. 21 enclose components of the MM and Mentor switch that comprise one novel embodiment of the MM CPU, MM Cache, and internal workings of the SPU Control Switch 55 in FIG. 17. The MM-CPU 68 is a processor that serves abstraction instructions from its meta data repository located in MM-MEM 69 (e.g. the MM Cache of FIG. 17). An instance of an abstraction is deposited by MM-CPU into the memory MHb 70 via address and data buses, Addr CPU-1 and Data CPU-1, and is executed by the processor MM-CH 71, which provides the abstraction descriptor between the processor SPU and memory component MEM-DID.

Figure 2:
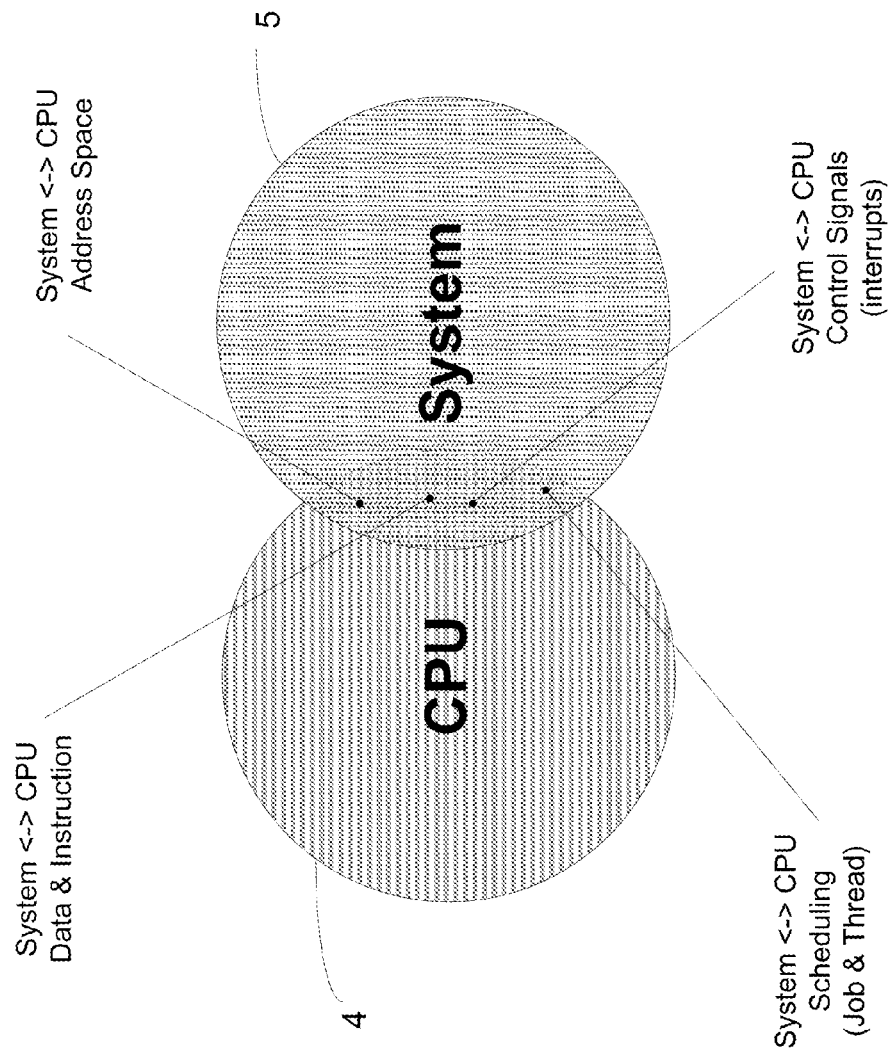
FIG. 2 is a Venn diagram Illustrating a conventional von Neumann architecture.
Figure 3:
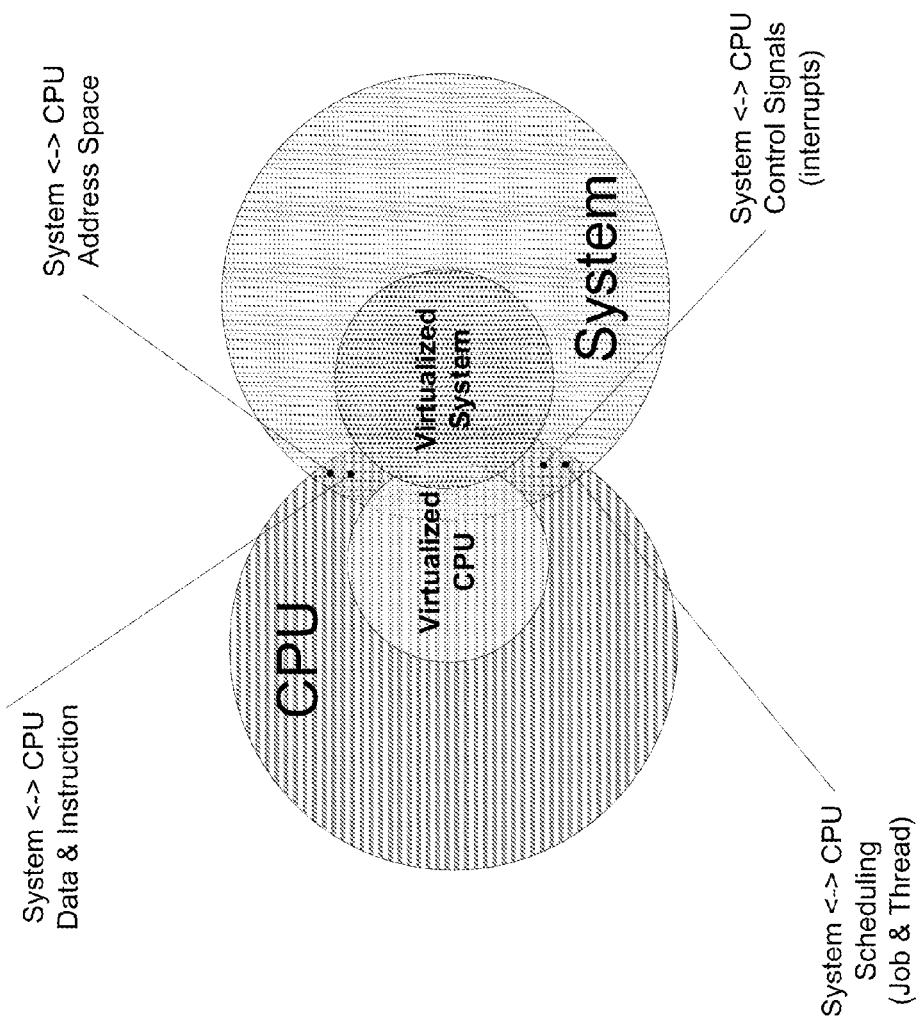
FIG. 3 is a Venn diagram Illustrating a conventional von Neumann architecture in a virtualized configuration.
Figure 5:
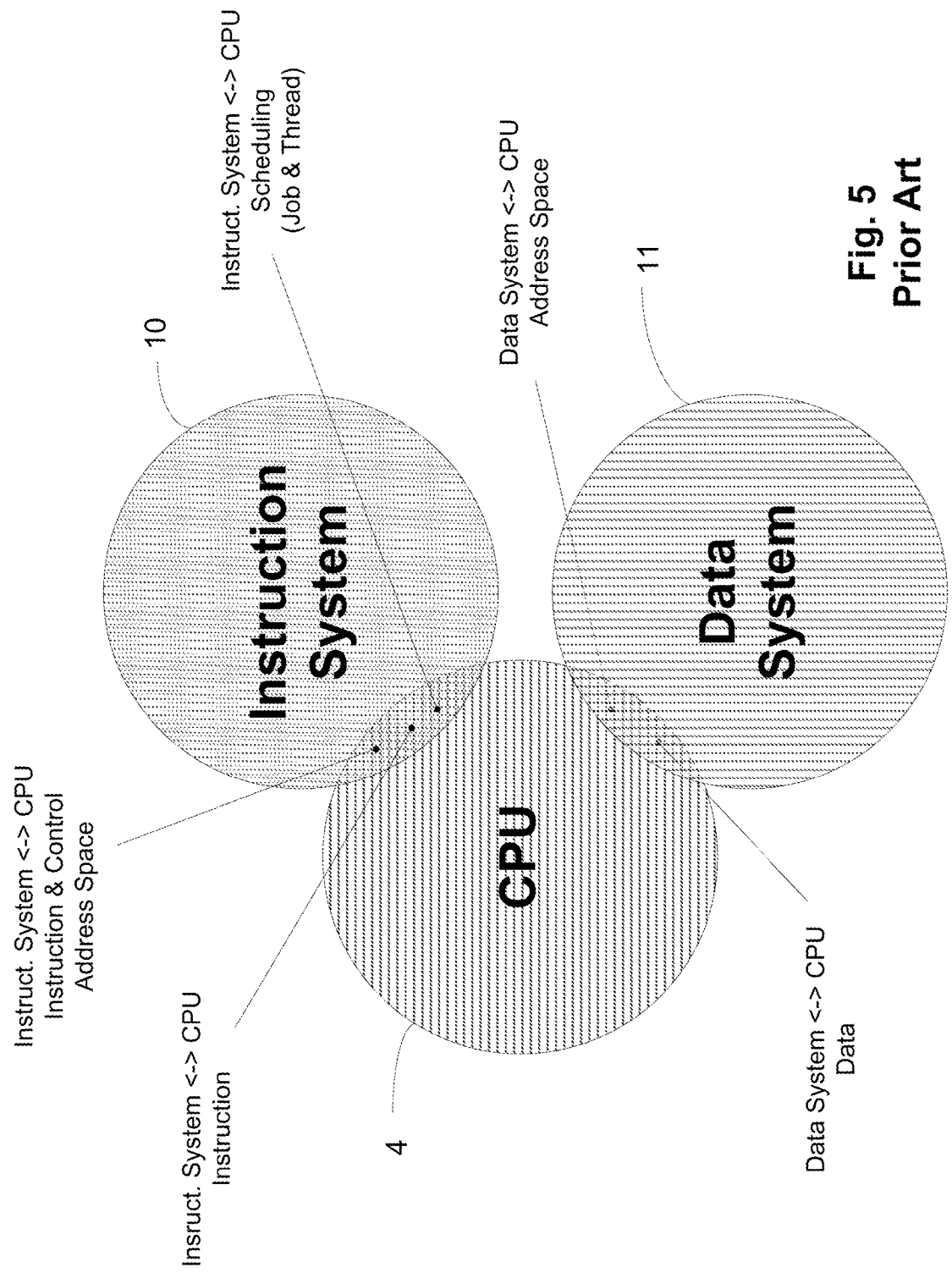
FIG. 5 is a Venn diagram illustrating a conventional Harvard architecture.

As explained before, the Meta Mentor architecture operates in at least two domains. The MM domain is fundamentally address space (e.g. defining, reconfiguring as needed, etc.) and process/thread scheduling, and the slave processors' operate fundamentally in the DID (data and instructions domain). The MM-CH, MHa 72 and MHb work together to create an abstraction for a particular process or hardware device. The MM-CPU and MM-MEM of FIG. 21 are part of the MM domain and contain meta information about the DID processes and system hardware. The meta information has abstraction descriptors about how each process is executed. That is to say, the SPU creates a set of electrical signals on the address bus intended to match a synchronal component in a VN or H architecture, as shown in the Venn diagrams FIGS. 2, 3, and 5. However, in the MM architecture the SPU address is translated into a different address for a component located in the DID domain. Both the SPU and DID component is synchronal with MHa and MM-CH, but the SPU is not synchronal with any DID component. This "maps" the SPU address space into the DID address space. How it is mapped is defined by the abstraction descriptor. It can be noted these buses vary from SPU to SPU. However, each bus carries comparable information on all processors (SPU). In the preferred design data is passed unaltered, although unaltered data in not a requirement in the MM architecture.

The abstraction descriptors are formatted into a hierarchical schema where sets of "objects" (as used in the art of computers) with attributes are attached to events, processes, and address spaces. In this way the meta information stored in MM-MEM includes a master rule set covering all the possible events, processes, address space that could be run by the SPU. As explained above, the rule set establishes invariant limitations designed to protect the DID against faults and malware.

For example, a rule set may comprise categorizing processes by security objects. A popular categorization is based on "privilege", which allows changes to the system in terms of confidentiality, integrity, and availability. A process object contains attributes defining its ability to elevate privilege. The MM domain schedules all processes and assigns address space. An attribute defining what address space the process may access, what privileges the process may operate in, and what types of devices it may access are some attribute examples. Other examples include, if a process is initiated from a I/O device, that process would only be able to access predefined hardware and address space. Enforcement of attributes is assured by the MM domain. This assurance is not possible in a single domain system due to the circular logic of algorithms defining memory address. In the MM architecture, DID algorithms cannot define the address space. In another example, if a process accesses a device, such as a microphone, that process cannot directly access an output port. The list becomes quite extensive.

Referring again to FIG. 21, at run time, the MM-CPU retrieves from its cache (MM-MEM) the appropriate information from its schema including the relevant rule set for a particular process, and then stores the information into memory MHb via Addr CPU2 and Data CPU2. The MHb is then the repository of the relevant rule set pertaining to the selected process. The MM-CH then starts the selected process on the SPU by accessing MHb, interrupting SPU, via Intl, and defining SPU's address space. In this embodiment the MM-CH processor operates in the MM domain and does all the abstraction and virtualization between the SPU, and its DID memory (MEM-DID) and I/O (not shown); the MM-CH also monitors the SPU according to the relevant rule set stored in MHb. The memory MHa is also a part of the MM domain and is basically a buffer memory in the MM switch and is not necessary in all applications. As an alternative embodiment, the functions of MM-CH could be integrated into the MM-CPU but would be less efficient time-wise.

Also shown in FIG. 21 is a PIT-DID 73 block. Conventional legacy computers often incorporate a programmable interval timer, (PIT). In a conventional computer the PIT is connected directly to the computer's CPU, and can be programmed to send an interrupt to the CPU at a given time. For example, it can be programmed to back up a computer at 2:00 am on Monday morning. At 2:00 AM a signal is sent to the CPU that interrupts any process that is currently running. The CPU saves all the information needed to return to the instructions it was executing before the interrupt in a memory location that is called a "stack". The CPU then executes a process that determines the nature and details of the interrupt. Then it starts executing instructions at a predetermined address location for this particular interrupt. The terminology for these instructions is "service routine." In a von Neumann or Harvard style architecture, the PIT interrupts the CPU, the CPU saves all the state information that is needed to perform the instructions in the process it was executing on the stack, determines the type of interrupt, the program counter jumps to the memory address that is the start of the service routine, and starts executing the instruction memory at that address. When it is done with the service routine, it pulls, (sometimes called pops) the information from the stack and returns to executing instructions at a state that it stopped to service the interrupt. There are several methods to perform this basic function. The above description presents a conventional programmable interrupt timer to demonstrate the process of a legacy interrupt.

Referring again to FIG. 21, the MM embodiment according to this invention uses a different approach. The MM-CPU is a processor that is connected to a von Neumann memory MM-MEM and data information memory MHb. The MM-CPU and MM-MEM possess the DID schema. Components PIT-DID and MEM-DID, both operating in the DID, are novel embodiments of components represented in the Control I/O Switch and Memory Control Switch, respectively, of FIG. 17. The system memory connected to the Memory Control Switch of FIG. 17 contains data and instruction information (von Neumann architecture) accessed by the DID. The SPU is a slave processing unit and is a member of the DID and is the same as one of the slave processing units shown in FIG. 17. Components, MM-CH, MHa, MHb, and selector 74 are novel embodiments of items shown in FIG. 17 as the Routing Table and SPU Control Switch. MM-CH is a CPU that enforces the abstraction schema.

Referring again to FIG. 21, the PIT-DID is a programmable interrupt timer that has its interrupt control line (Intl) connected to the MM-CPU. This interrupt is not in the DID domain. Using the same 2:00 AM interrupt example, the MM-CPU is interrupted by PIT-DID and schedules either MM-CH or SPU by placing the starting address for the PIT-DID interrupt service routine. It does this by writing a service routine algorithm into a predetermined address in MHb, the purpose of the algorithm being to determine the nature of the PIT-DID interrupt. Using MM-CH to determine the interrupt as an example, the MM-CPU sends an interrupt signal (Intl) to MM-CH which then fetches the PIT-DID interrupt information from MHb and writes it into memory unit MHa. MM-CH then returns to its previous state.

The MM-CPU then fetches the interrupt information in MHb and determines the process schema that resides in MM-MEM. This meta information contains the abstraction about how each process is executed. It is formatted into a hierarchical schema and is used as descriptors for all of the DID processes. The MM-CPU then transfers the meta information schema into MHb, interrupts MM-CH to execute the schema descriptors virtualizing the path between SPU and MEM-DID for the given PIT-DID service routine. MM-CH loads an instruction cache from DID memory (MEM-DID) into MHa. MM-CH interrupts SPU, via Int3, and then SPU starts executing the PIT-DID service routine from the MHa.

Referring again to FIG. 21, the MM-CPU or MM-CH could handle SPU read/write requests directly, but in this operation MM-CH loads the instruction memory and data memory from MEM-DID into MHb as a type of cache. In any event, MM-CPU and MM-CH define information and separate the data from instruction memory based on rule set from another process domain. The MM-CPU mentors the SPU with its meta data and enforces the meta rule set.

Figure 22:
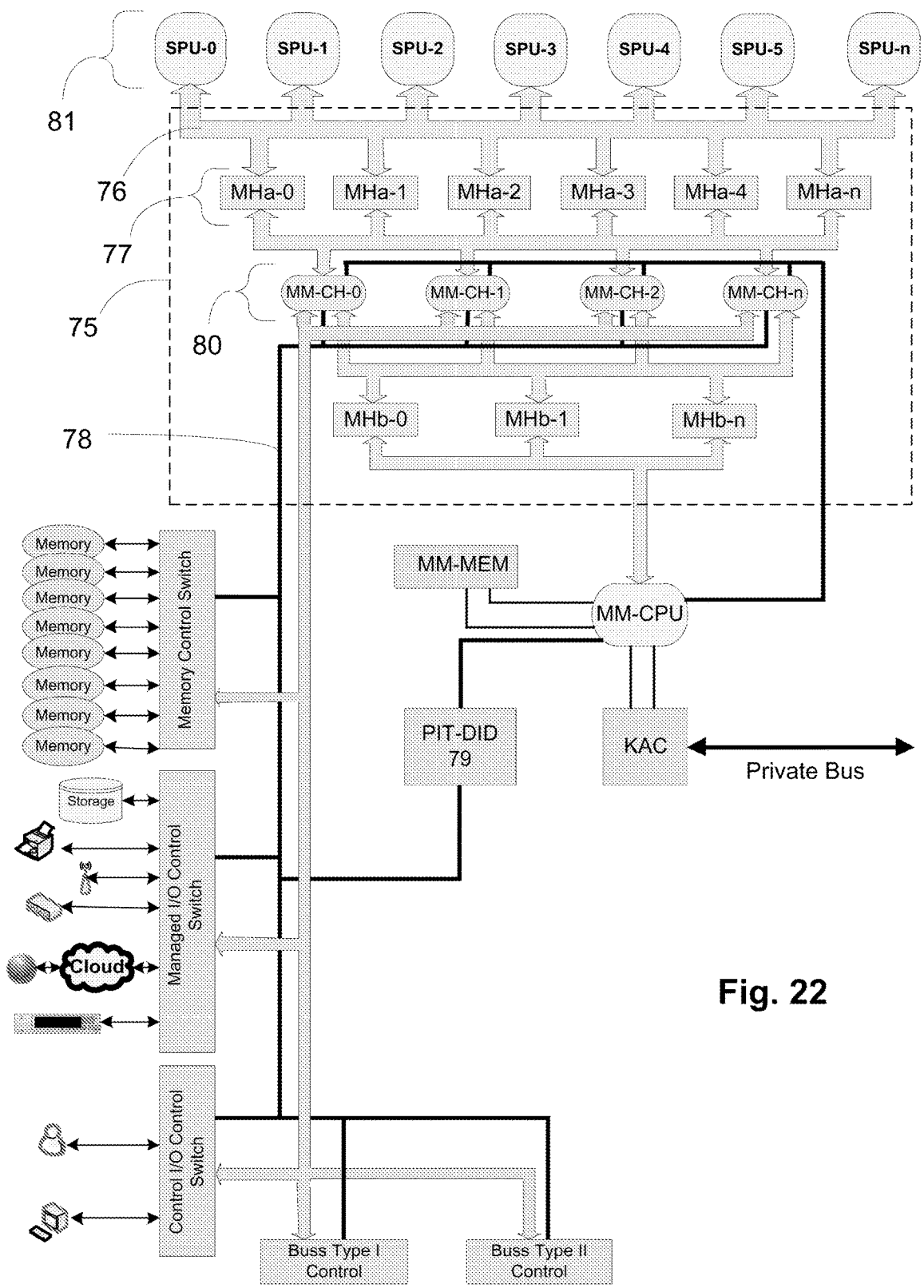
FIG. 22 is a functional block diagram illustrating a Meta Mentor incorporated according to this invention in a computer system including multiple slave processing units (SPUs).

Referring to FIG. 22, illustrated is a Mentor switch with a single MM-CPU. However there are no restrictions on the number of MM-CPUs acting on a Mentor switch. In fact it would probably be advantageous to have two or more MM-CPUs, each having a different instruction set, (different manufacture) so they perform the same function but require different instructions to function to defend against common mode failures.

Referring again to FIG. 22 the Mentor switch 75 is shown with an array of MM abstraction descriptor processors (MMADP) 80, MM-CH-0 thru MM-CH-n. The MMADP array virtualizes the address space of an array of the Slave Processing Units 81, SPU-0 through SPU-n, using the DID previously described virtualization descriptors. The components in FIG. 22 provide the same functionality as the components in FIG. 21. Providing multiple MMADP units increases the information transfer rate between processing units and system components. In addition, multiple MMADP units offer redundant fault tolerance within the MM switch. It can be noted that the array MMADPs are not required to be binary compatible, they are required to perform the same function. This feature is important in protecting the system from common mode failures. A classical development technique known as N-version programming, a method or process in which multiple functionally equivalent programs are independently generated from the same initial specifications is expanded using the Meta Mentor architecture. Using two or more binary incompatible processors at the MMADP and/or the MM-CPU level allows the devices to use state replication by completely independent systems. Each MM-CPU can be uniquely accessed through different communication paths and permission algorithms. A system to create an abstraction descriptor can be made up of available, randomly selected binary incompatible components that are erected by process requirements. Combined, these characteristics make a single error in instruction or hardware difficult to replicate itself over two independent erectable switch systems. It is improbable two concurrent errors can happen at the same time, even if that were the instructional intention. This configuration can be used by a Meta Mentor CPU algorithm that could check a signature on a physical system component for authenticity for example. A unique characteristic or characteristics of a system component is analyzed by binary incompatible CPUs with different identification algorithms.

Referring again to FIG. 22, the novel embodiment of the SPU Control Switch 55 of FIG. 17 is enclosed in dash lines 75. A common information bus 76 connects the slave processing units, SPU-0 through SPU-n (SPU's) and memory components, MHa-0 through MHa-n (MHa's). The MHa's 77 can be permanently assigned to SPU's, or arbitrarily assigned. There is a difference between FIG. 21 and FIG. 22 regarding the method of transferring information from the MHa's to the system components. In FIG. 21 the system components are shown connected directly to the memory device, MHb and MEM-R1. In FIG. 22, system components are connected to the MMADP array. The functions are the same; the difference is, FIG. 21 transfers information via DMA (direct memory access) whereas in FIG. 22 information is transferred via the MMADP's. The single data lines shown in the single unit of FIG. 21 have been replaced by the data buses of FIG. 22. Component control lines in FIG. 22 are on separate buses 78 depicted in a solid line.

Referring again to FIG. 22, the PIT-DID 79 interrupts the MM-CPU in the same method as the previous single case. A single MM-CPU schedules an available or chooses a processing MMADP to fetch the starting address for the service routine. Let us say that, MM-CPU and MM-CH-2 were selected to fetch the PIT-DID service routine address. As in the previous example, the MM-CPU does this by writing the PIT-DID fetch routine starting instruction memory address into, for example, MHb-0. That is, when MM-CH-2 is interrupted by MM-CPU, MM-CH-2 will start executing instructions at the address defined by the MM-CPU; this will cause MM-CH-2 to fetch the PIT-DID service routine address and place it into a predefined location in an available MHb, MHb-1 (for example). After the information is deposited in MHb-1; MM-CH-2 returns to its previous state. The MM-CPU fetches the starting address location of the PIT-DID interrupt and uses the starting address to fetch meta information about the service routine that resides in a look-up table in MM-MEM. The meta information contains the same type of information in the previous case, information on what type of access the service routine will have and relevant rules. The MM-CPU writes this information into MHa-3. MM-CPU places another interrupt service routine in MHa-2 that will allow MM-CH-3 to start SPU-3 to process the PIT-DID service routine.

If a processor, in this case an SPU, writes a software interrupt or polling process from a SPU writes information, in accordance with the rule set laid out by the MM-CPU, that interrupts the process executing on the SPU, the executing process state is saved in system memory before starting a new process. Conventional systems store the information in the central memory. In the MM architecture the process information may be stored in the MHa memory. In practice, block transfers of data between peripheral devices, such a memory, for example an MHa level memory, acts as a cache, called the L4 cache, and the SPU will only communicate with the L4 cache. Fault tolerance, check point cache storage can take place in the L4 cache and be written out the memory, disk, printer, or other peripheral device at a separate time or immediately, depending on the storage algorithm. It should be noted that the L4 cache level is relative to where the MM-CPU is placed within the system. The Meta Mentor architecture can easily be placed at the L1, L2, or L3 level.

Dataflow Architecture

Figure 23:
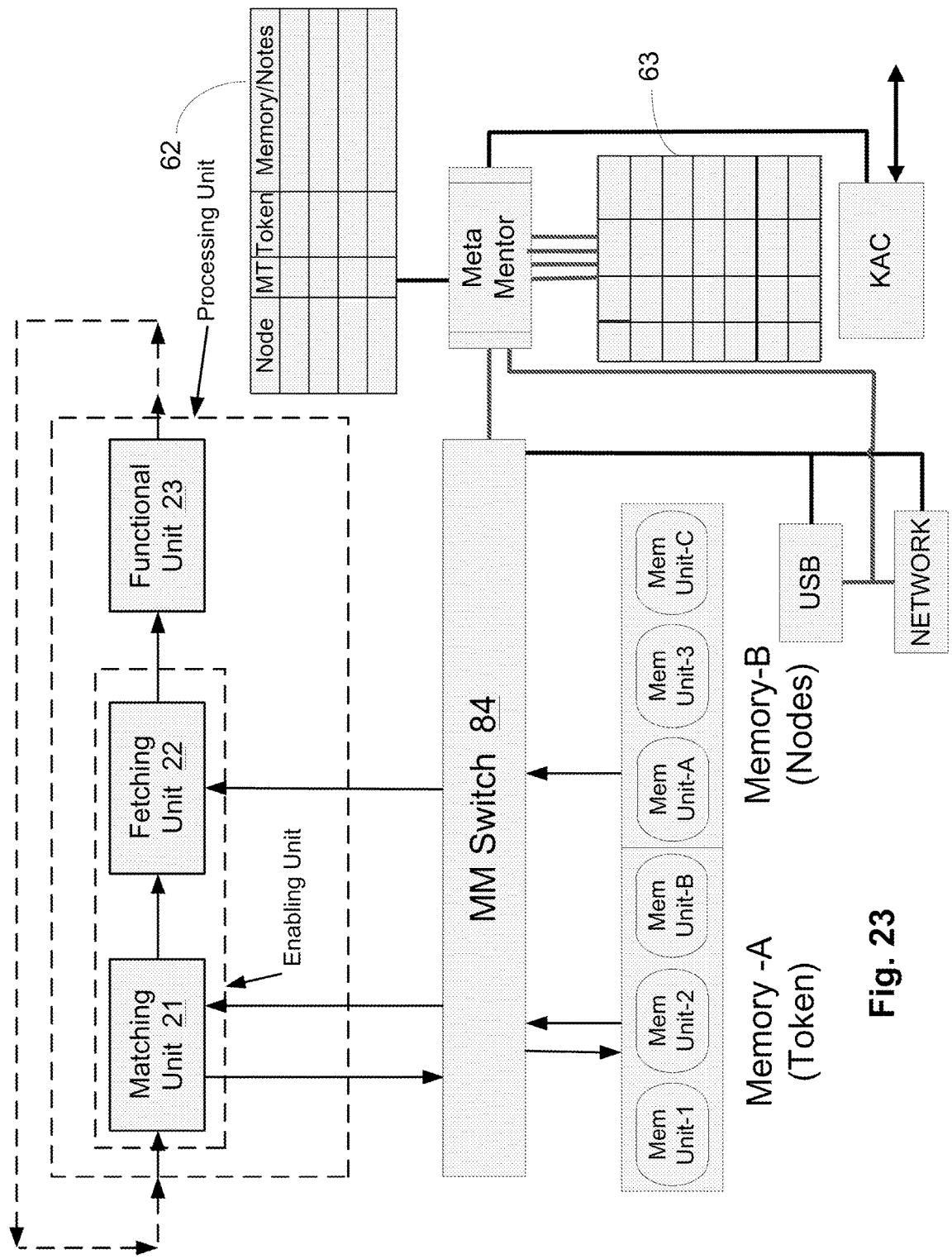
FIGS. 23 and 24 are functional block diagrams illustrating, in the case of a dataflow architecture, a Meta Mentor and Meta Mentor switch incorporated according to this invention and interposed between processing units and memory and related memory and peripherals.
Figure 24:
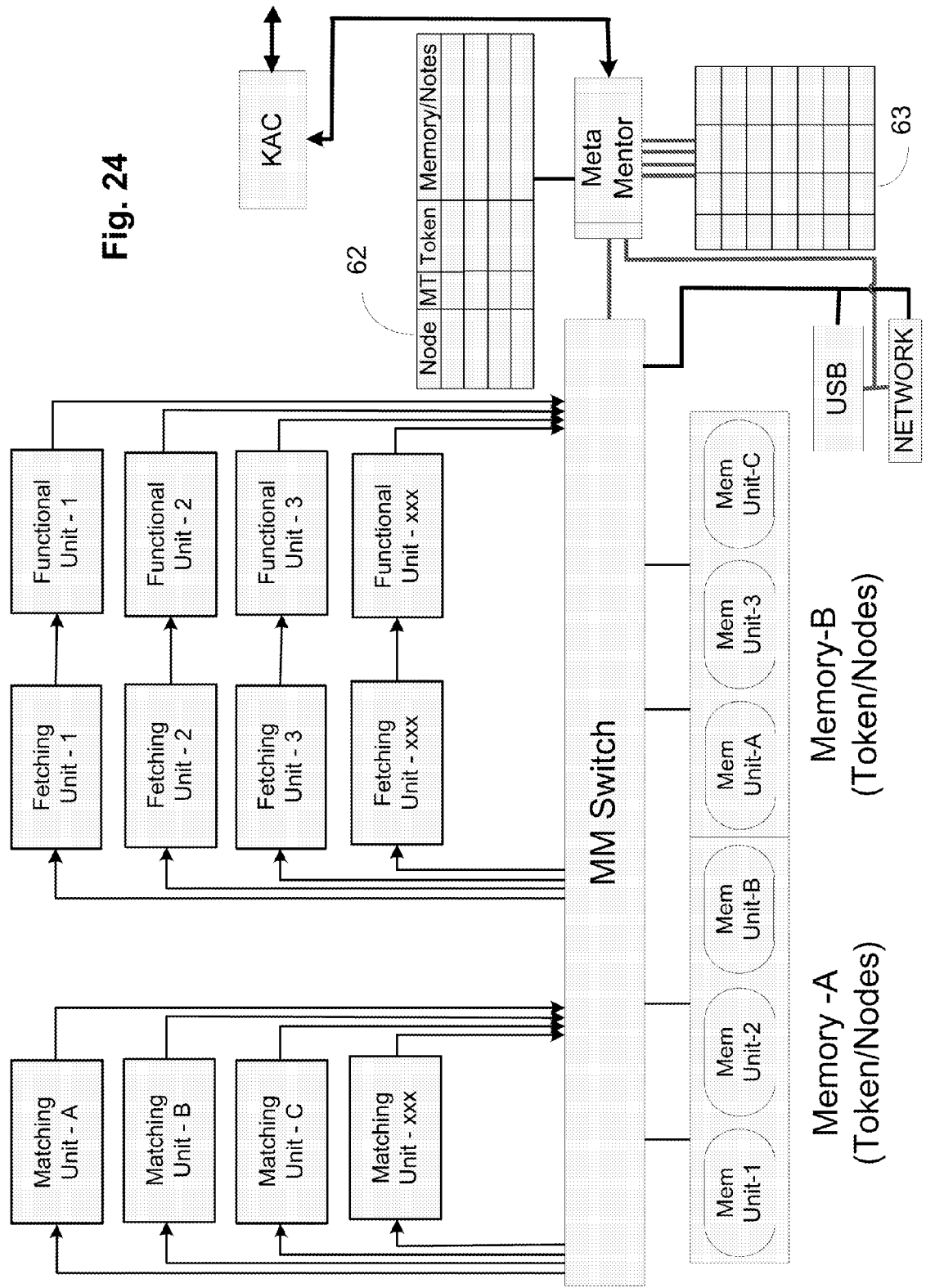

Referring to FIGS. 23 and 24 show the case of the dataflow architecture. A Meta Mentor is placed between the processing units and memory and related peripherals. The MM virtualizes the abstraction layer and facilitates the process scheduling.

Figure 6A:
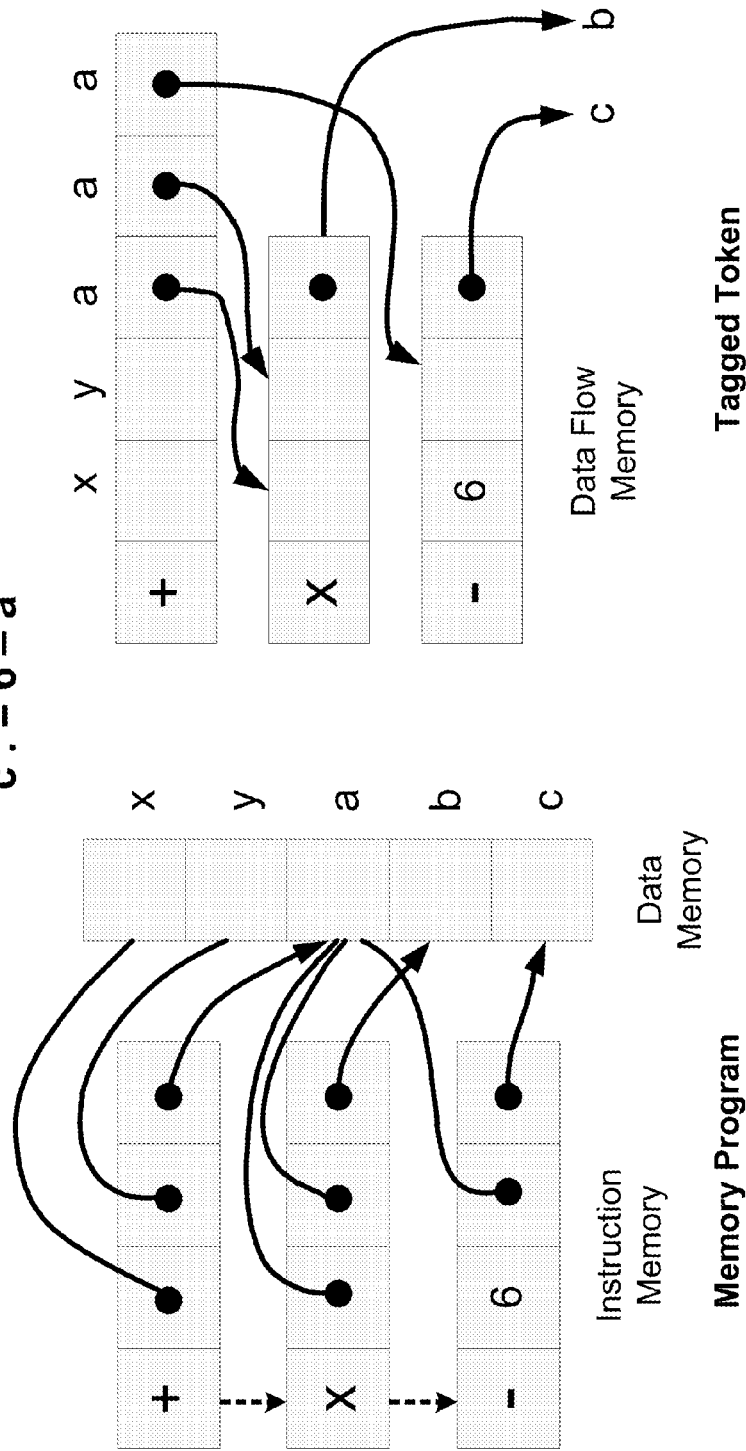
FIG. 6A is flow diagram illustrating differences between a control flow program and a tagged token program.
Figure 6B:
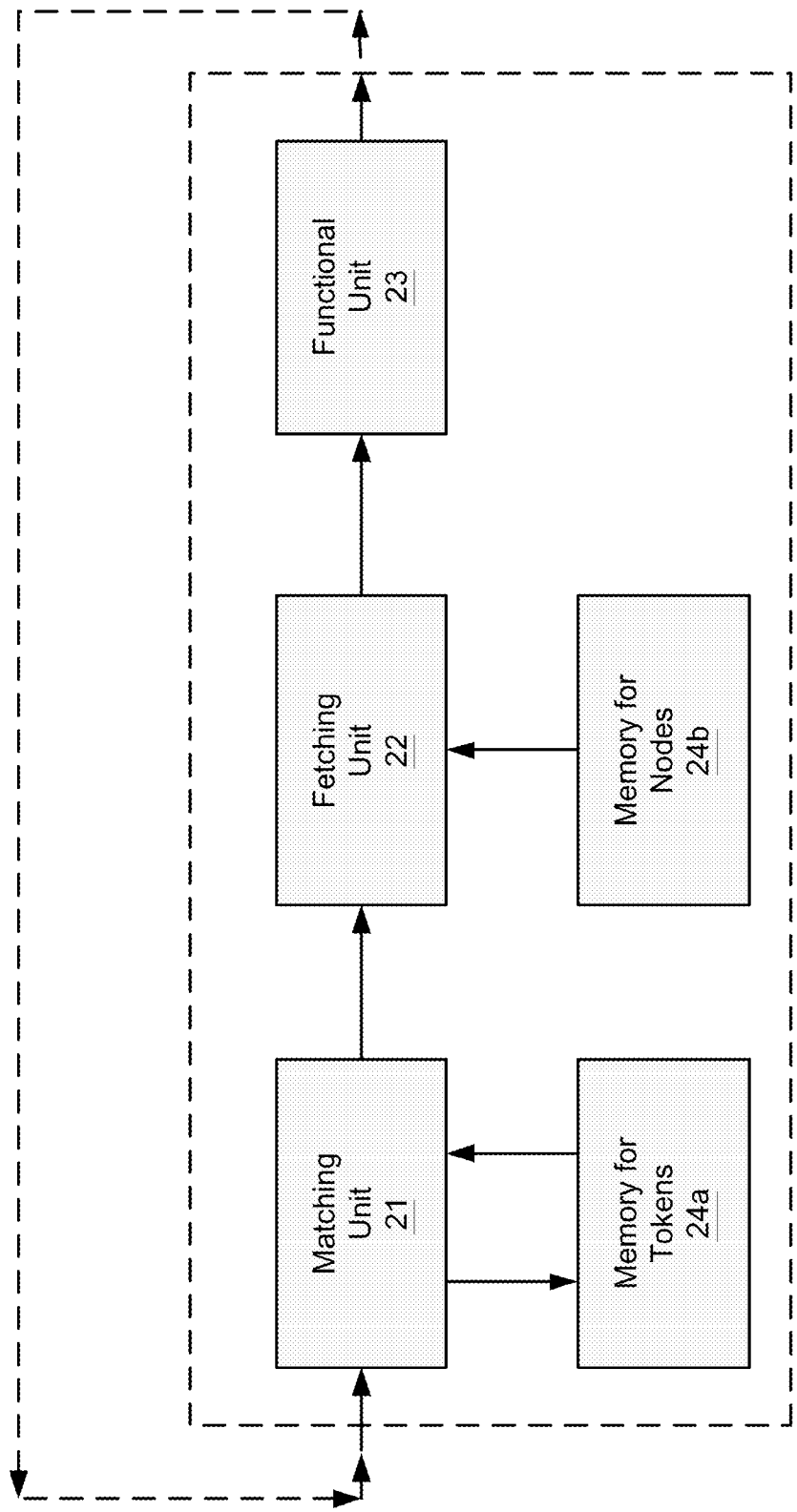
FIG. 6B is a functional diagram of a conventional tagged token architecture.

Referring to FIG. 23, illustrated is a Meta Mentor incorporated in dataflow architecture. The MM switch 84 is a type of physical and logical wrapper around the "Enabling unit" creating an MM domain to regulate the memory information and process node control. This configuration shows how the MM architecture is adaptable. The MM architecture provides fault tolerance through virtualization, duplication, and scheduling similar to a von Neumann or Harvard architecture, and the legacy dataflow function remain the same as shown in FIG. 6B.

Referring again to FIG. 23, input to the matching unit 21 is supplied the same as the conventional system. These tokens or ["tagged operands" are stored in memory by means of the MM Switch 84 and are stored in redundant locations that are virtualized by the MM algorithms. When all of the tagged operands of an instruction become available (that is, output from previous node functions or instructions and/or user input), the function is ready for and the MM schedules the fetching unit 22 to execute the function per the node description. This is the same process known as activating or firing the instruction. The node description and tokens information is loaded into the fetching unit via the MM and is forwarded to the functional unit 23 to complete the transaction. Once an instruction is completed by an execution unit, its output data is stored (with its tag) in the matching unit and subsequent memory location via the MM. Any functions that are dependent upon this particular information (identified by its tag value) are then marked as ready for execution and scheduled by the MM. In this way, subsequent instructions are executed in proper order, avoiding race conditions. This order and memory storage is different from the sequential order envisioned by the human programmer. A function, along with its required data operands, is transmitted to an execution unit as a packet, also called an instruction token Referring to FIG. 24, illustrated is a parallelized dataflow architecture including a fault tolerant MM architecture showing multiple matching, fetching, and functional units. The matching unit tokens are placed in a virtualized memory via the MM's algorithms and the MM determines the availability and schedules of all destination nodes. FIG. 24 also shows the fetching units directly connected to the functional units, for brevity, but the fetching and functional units may also be virtualized by the MM, thus all virtual information of the destination addresses and process tags are determined by the MM.

Referring again to FIG. 24, tokens are stored in the memory connected to the matching units by the MM. This tagged-token system functions the same as a single system. When all of the tokens for a process instance are assembled they are sent to an available fetching unit by the MM, where they are combined with a node description. This description is stored by the MM in memory and the node description forwarded onto an available fetching unit where the process is executed. As noted above, this process between the fetching unit and functional unit could also be virtualized by the MM, but is not shown in FIG. 24. The functional units' output is placed in memory for tokens if the output is a token for input to a matching unit and/or placed in memory for post processing.

Figure 25:
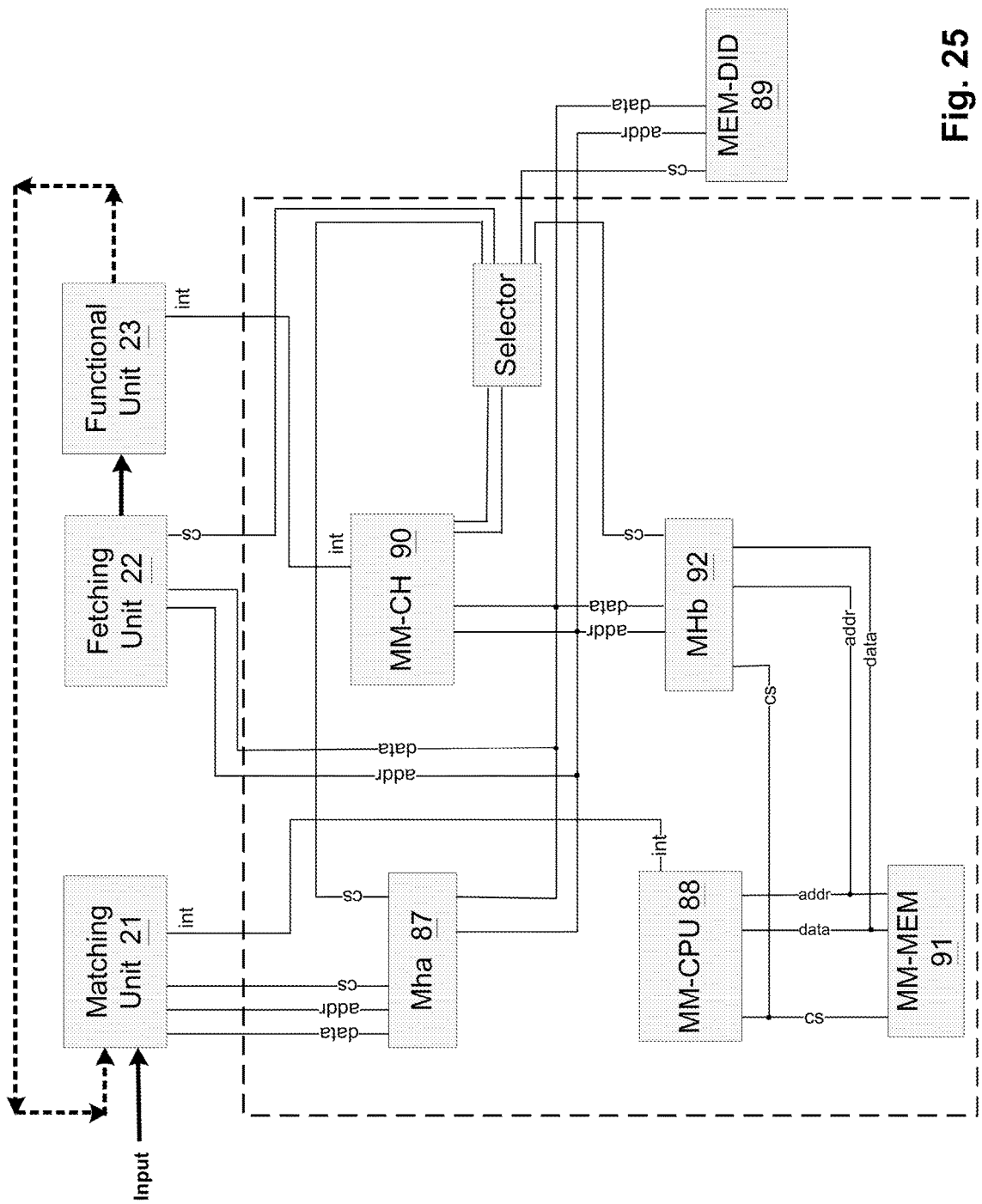
FIG. 25 is a functional block diagram illustrating a Meta Mentor and Meta Mentor switch incorporated according to this invention in a tagged-token dataflow architecture.

Referring again to FIG. 25, the MM Switch that is incorporated in the tagged-token dataflow architecture is illustrated therein, and is functionally the same von Neumann/Harvard switch as shown in FIG. 21. When the matching unit 21 receives input in the form of a tagged operand, it is stored in MHa 87 directly after which the MM-CPU 88 is interrupted. The service routine for this interrupt copies all information regarding the tagged operand to redundant memory (either MHa or MEM-DID 89) and queues the fetching unit 22 information. Node creation information, including rule sets, meta and functional configuration are passed from MM-CPU to MHa directly. After the information is passed to the memory, MM-CH 90 is interrupted by MM-CPU and MM-CH starts executing the information in MHa. When all of the tagged operands become available, MM-CH schedules the fetching unit to execute the function. The fetching unit and functional unit 23 are collectively called a "node". When the node is finished its operations it passes its output to MM-CH, where the information is forwarded to the Matching Unit, if the output is a tagged operand for any pending functions or passed onto MEM-DID, which represents a general purpose system. As in the embodiment of FIG. 21, the MM-CPU retrieves from its cache (MM-MEM) 91 the appropriate information from its schema including the relevant rule set for a particular process, and then stores the information into memory MHb 92. The MHb is then the repository of the relevant rule set pertaining to the selected dataflow process.

Figure 26:
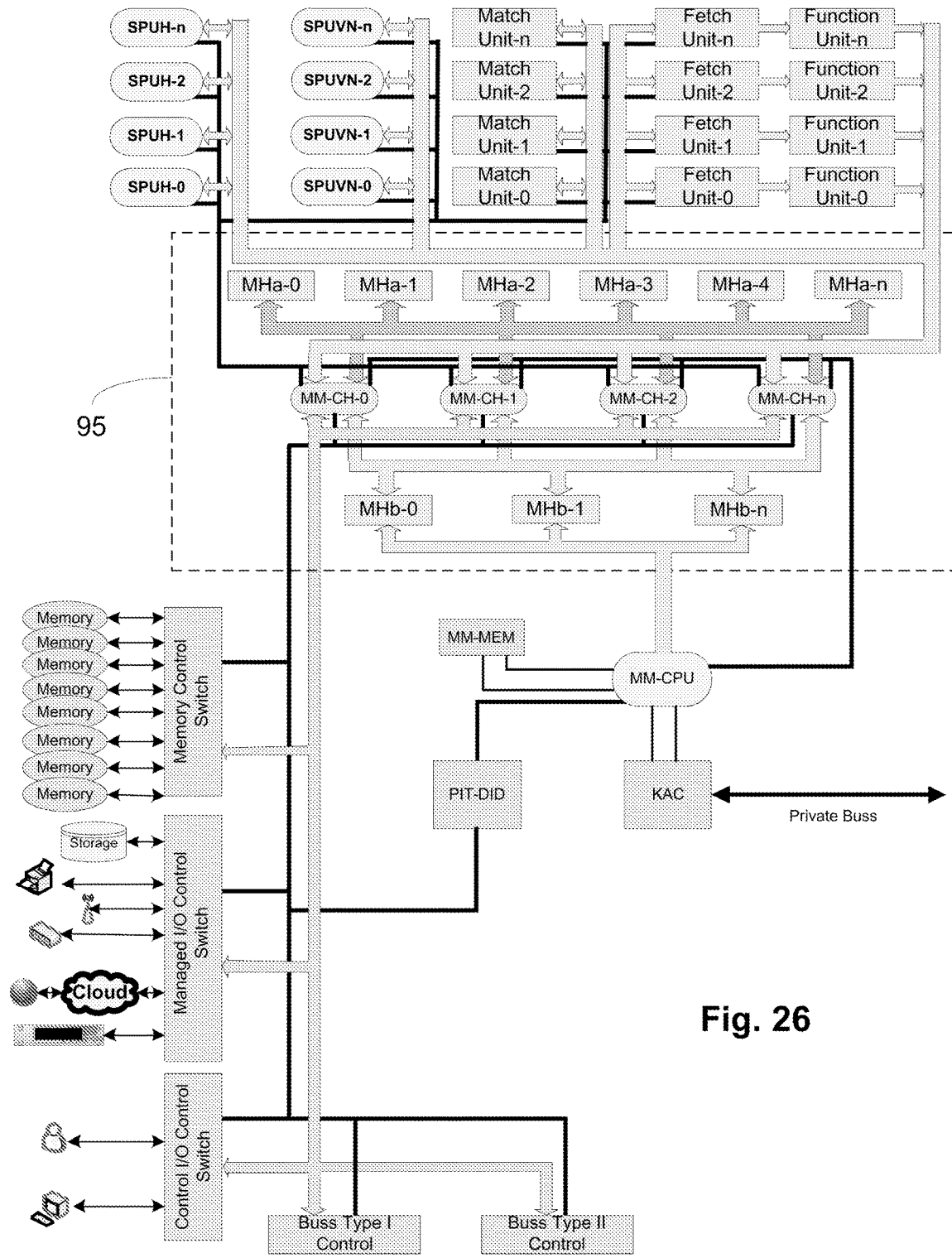
FIG. 26 is a functional block diagram illustrating a Meta Mentor and Meta Mentor switch incorporated according to this invention in a multiple CPU heterogeneous architecture.

Referring to FIG. 26 illustrated is a parallelized MM switch 95 configured with heterogeneous CPUs and architectures. The switch features a parallelized dataflow, von Neumann (SPUVN-n), and Harvard architecture (SPUH-n) configured in a fault tolerant Meta Mentor architecture. Referring to the dataflow portion of the switch, the Matching Unit tagged operands are scheduled and place into a Matching Unit, in a manner similar to the process in FIG. 23, however in a parallelized tagged token architecture. The MM schedules the matching units in addition to the fetching units. When the matching unit processes the function and determines the tagged operands they are placed in a virtualized memory via the MM's algorithms. These operands or tokens are stored in the memory connected to the matching units by the MM. When all of the tokens for a process instance are assembled they are sent to an available fetching unit by the MM, where they are combined with a node description. This description is stored by the MM in memory and the node description forwarded onto an available fetching unit where the process is executed. The functional units output are placed in memory for tokens if the output is a token for input to a Matching Unit and/or placed in memory for post processing.

Inside the CPU

Figure 7:
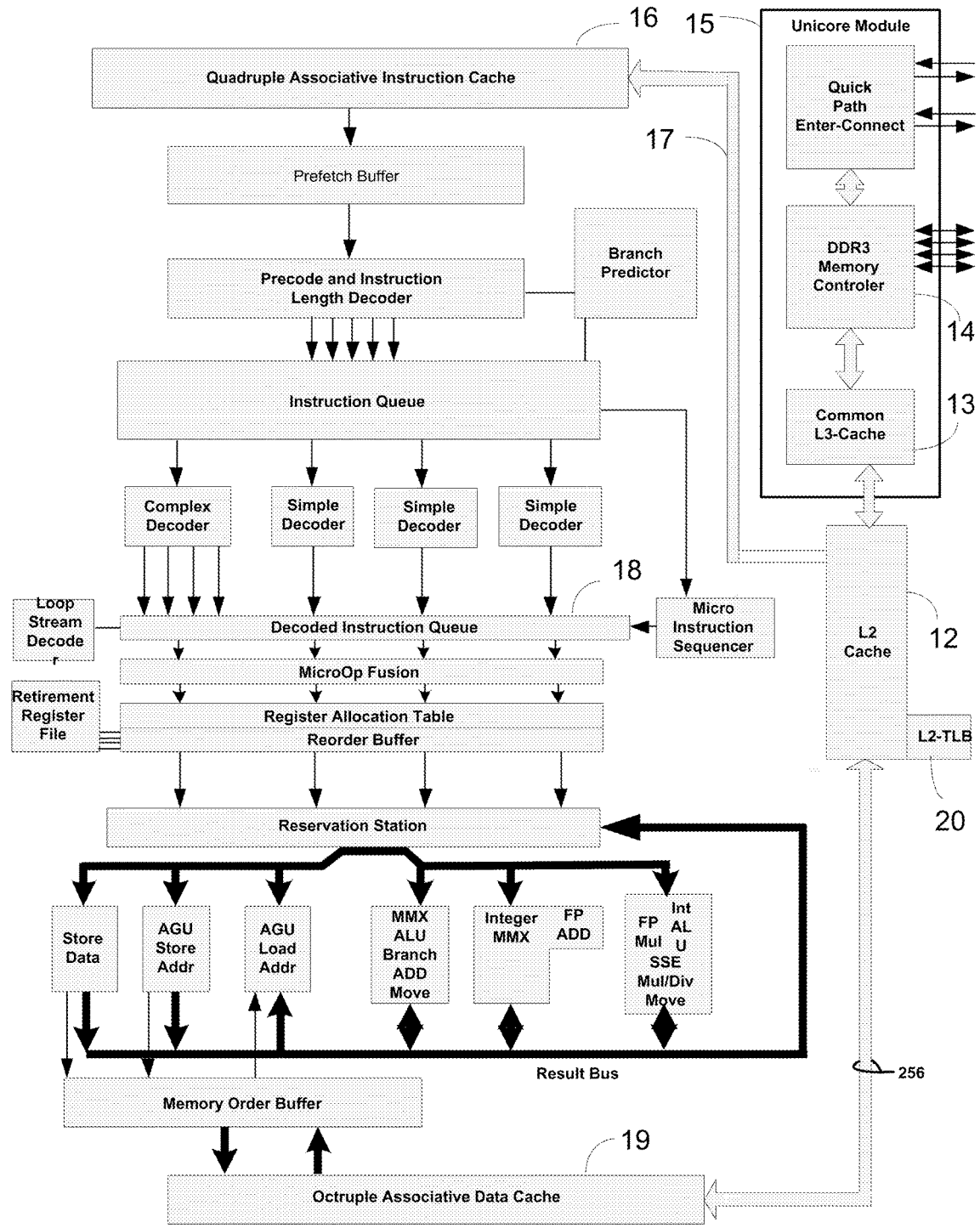
FIG. 7 is a functional diagram illustrating a conventional microprocessor architecture.
Figure 27:
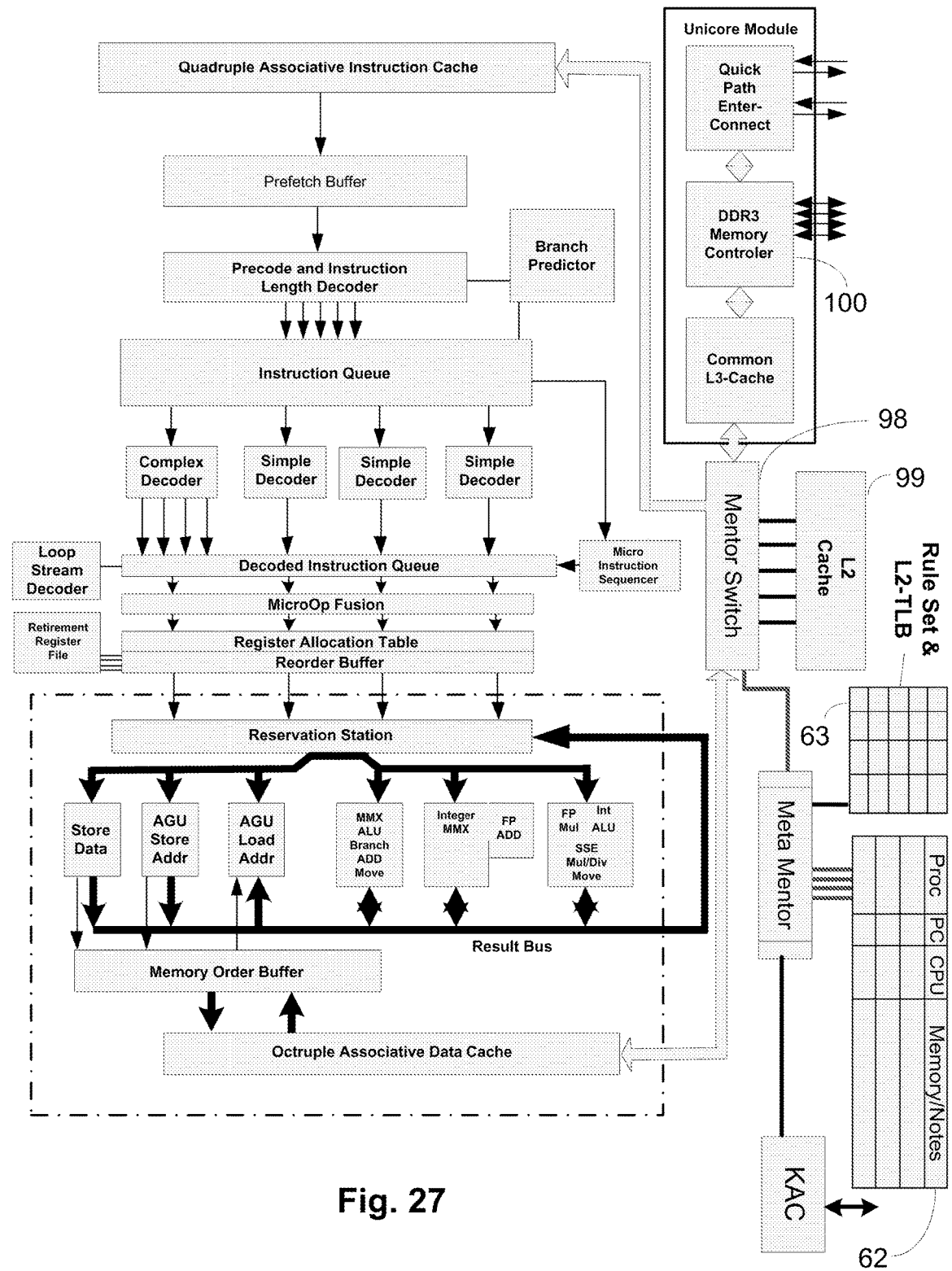
FIG. 27 is a functional block diagram illustrating a Meta Mentor incorporated according to this invention in the computer system of FIG. 7.

As stated previously the representative CPU of FIG. 7 is called von Neumann architecture because its domain references a combined data and instruction memory, however internally it is configured to utilize Harvard architecture. The Meta Mentor architecture eliminates the distinction between von Neumann and Harvard architecture and can function in any system. FIG. 27 illustrates a Meta Mentor architecture incorporated within a conventional microprocessor as previously illustrated in FIG. 7.

Referring to FIG. 27, illustrated is a meta mentor incorporated in the conventional microprocessor architecture of FIG. 7. In FIG. 7 an L2 cache 17 communicates directly with the Quadruple Associative Instruction Cache 16, the Octruple Associative Data Cache 19, and the Unicore Module 15. In this embodiment an MM switch 98 communicates directly with the Quadruple Associative Instruction Cache 16, the Octruple Associative Data Cache 19, and the Unicore Module 15, and the L2 cache 99 communicates only with the MM switch. The Quadruple Associative Instruction Cache transfers instruction information from the L2 cache and the Octruple Associative Data Cache transfers data information to and from the L2 cache via the MM switch. Also, the L2-TLB 20 of FIG. 7 has preferably been integrated with the rule set memory 63. The introduction of the MM does not impact the function of the CPU other than how it transfers information to and from the L2 cache. In this embodiment, the MM Switch 98 virtualizes information in the same manner as previously described. The L2 cache can be duplicated as well as multiple instruction and data portions of the CPU to increase fault tolerance. Also because the MM is charged with virtualizing the information, the CPU instruction set can be reduced to alleviate the overhead of maintaining its domain. Dual pathing memory information via the DDR3 memory controller 100 is accomplished within the MM shown in FIG. 27 or external to the CPU as shown in FIGS. 17 and 19. In the latter configurations an external MM communicates with the internal MM to facilitate and bias information to and from the CPU. Although FIG. 27 shows a single CPU comprising of a single arithmetic/logic and control unit, the concept shown in FIG. 26 can easily be integrated into the architecture of FIG. 27 to include multiple arithmetic/logic and control units in addition to the SPUH-n, SPUVN-n, and the tagged token regimes shown in FIG. 26.

Figure 28:
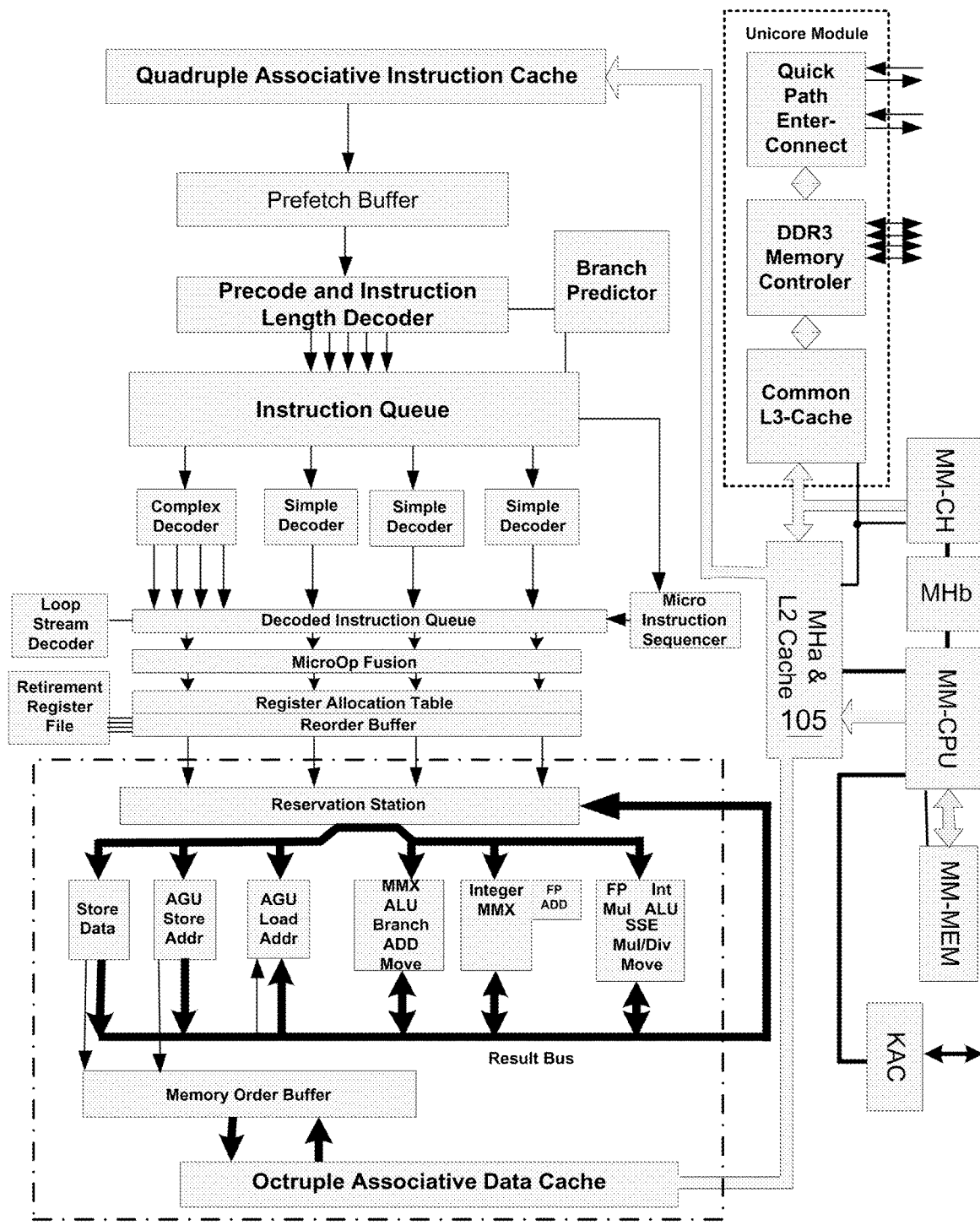
FIG. 28 is a functional block diagram illustrating a Meta Mentor incorporated according to this invention in the computer system of FIG. 7, but in a different manner.

Referring to FIG. 28, the MM Switch can also function within a conventional microprocessor. Illustrated in the MM's simplest form are components Quadruple Associative Instruction Cache, (QAIC) and Quadruple Associative Data Cache, (CADC). Both the QAIC and CADC are connected to MHa 105. In this embodiment, MHa operates in the same capacity as the L2 Cache in FIG. 7. The Meta Mentor's algorithms virtualize the L2 cache address space and divide it into at least two parts. This creates an active and backup partition of the L2 cache space. In operation, the active and backup L2 memory partitions exchange functions as CPU interrupts occur; such as cache misses. As these interrupts occur, the active cache partition becomes a backup cache partition. The new active partition duplicates its information to the new backup partition. Both partitions contain the same information defining the state of the CPU at the time of the interrupt. In practice, partitioning could be accomplished by manipulation one or more bits of the MHa address. During the initial cycle, real time character transfers from the active partition to the backup partition duplicate both partitions until the first CPU interrupt. After the initial cycle, the MM transfers the primary to backup cache information as previously described. When software fault such as a cache problem occur the MM restarts the process from the backup. After a predetermined number of process faults, the process would be killed and the error message sent to an operator. The CPU would then be available to for other processes. After a predetermined number of CPU failures, another type of error message is sent to the operator and the CPU is blacklisted. A CPU recovery only occurs if there is another QAIC and/or CADC available. Other MM information such as the separation of instruction and data information further subdivides. The MM-CH, MHb, MM-CPU, and MM-MEM components function generally as previously described for FIGS. 21 and 26, i.e., the MM-CPU being the rule set server, the MM-MEM being the repository of the master rule set, the MHb being the repository for the relevant rule set, and the MM-CH enforcing the rule set including rule sets concerning the data virtualization and instruction scheduling in MHa (L2 cache). Moreover the MM is biased by the communication with other MMs through the KAC.

The information in MHa is, at a minimum, the same information as the traditional L2 cache and the translational lookaside table (TLB). However, the TLB is not static as in the legacy TLB, the MM maintains and communicates to the TLB and can change how the TLB is configured. Shown in FIG. 28 are QAIC and CADC communicating directly with MHa, although this is not a requirement. When the QAIC and CADC communicate directly with MHa there is no performance difference between a traditional L2 cache and a Meta Mentor MHa memory. The active and backup partitions are determined by the masking or unmasking of the address lines by MM-CH.

Traditionally the TLB has only static block address information. In Meta Mentor architecture the MM-CPU and MM-CH have the ability to change translation lookaside table which adds one layer of fault tolerance.

In operation, the MM Switch functions in the same manner as previously described. For example, when a call is issued for a change due to a cache miss, the MM-CH initiates an exchange of active and backup partitions and creates a duplicated in MHa (L2 cache) backup partition.

How the MM-CH functions during the exchange is determined by information written from the MM-CPU to MHa. This information is defined by the relevant rules set forth by the MM-CPU when a new SPU (QAIC and CADC) process initiates. When a new function is started, the MM-CPU transfers information into MHb and interrupts MM-CH to a function defined by the MM-CPU. MM-CH then defines the SPU (QAIC and CADC) address space and rules sets using the information the MM-CPU transferred into MHb. The integrity of the SPU and/or MM-CH can be checked while the rule sets and data transfer between MM-CPU and MHb is performed. The integrity check of a SPU and MM-CH is accomplished by monitoring the communications between the MM and the SPU; such that when sufficient time elapses when there is no communications between SPU entities, the SPU is blacklisted. Methods of determining component faults will be discussed latter. Another blacklist event can occur when a process on a SPU fails several times or when a SPU fails and integrity check. In the event of a SPU failure, another SPU (QAIC or CADC) can be scheduled to process the state information located within the L2 cache. The MM can reschedule another processor or can request the transfer of the L2 cache to another MM domain.

Reconfigurable CPU

Figure 1:
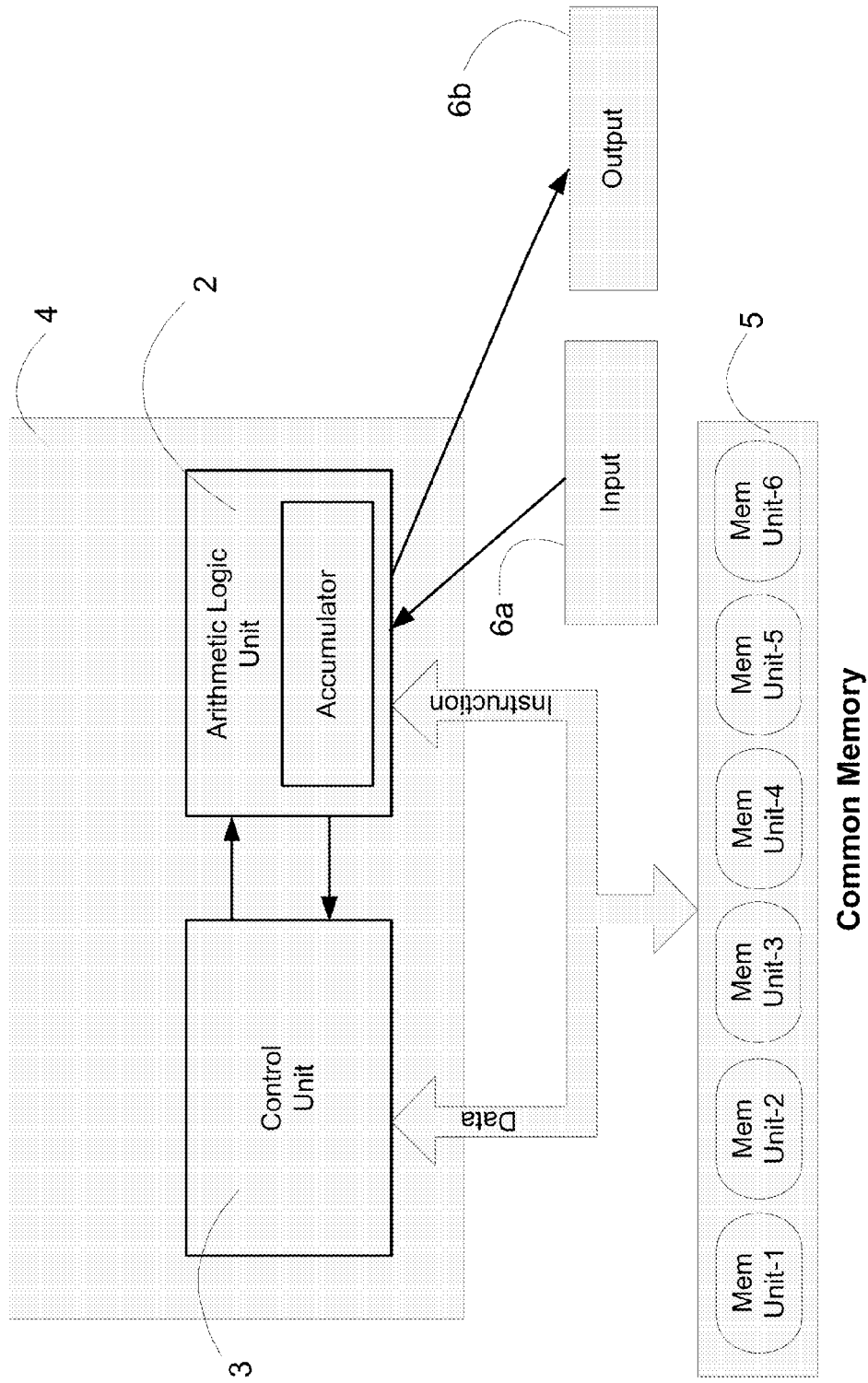
FIG. 1 is a functional diagram of a conventional von Neumann computer system.
Figure 4:
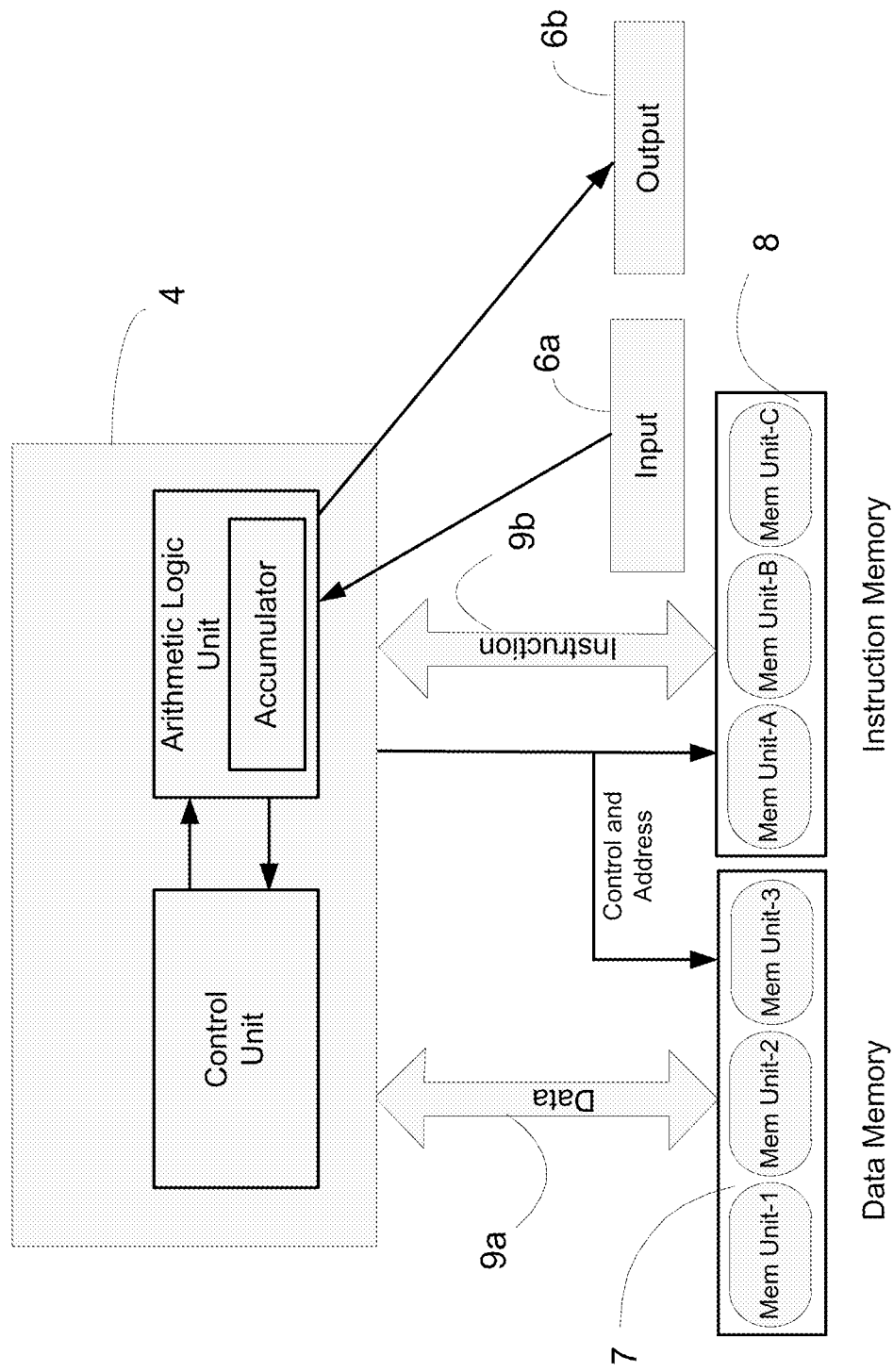
FIG. 4 is a functional diagram of a conventional Harvard computer system.

The classical definition of a CPU is shown in FIGS. 1 and 4 where a control unit (CU) is associated with an arithmetic logical unit (ALU). The extension of this type of CPU includes multi-core CPUs each core consisting of a CU and an ALU. The MM has a different approach.

Figure 29:
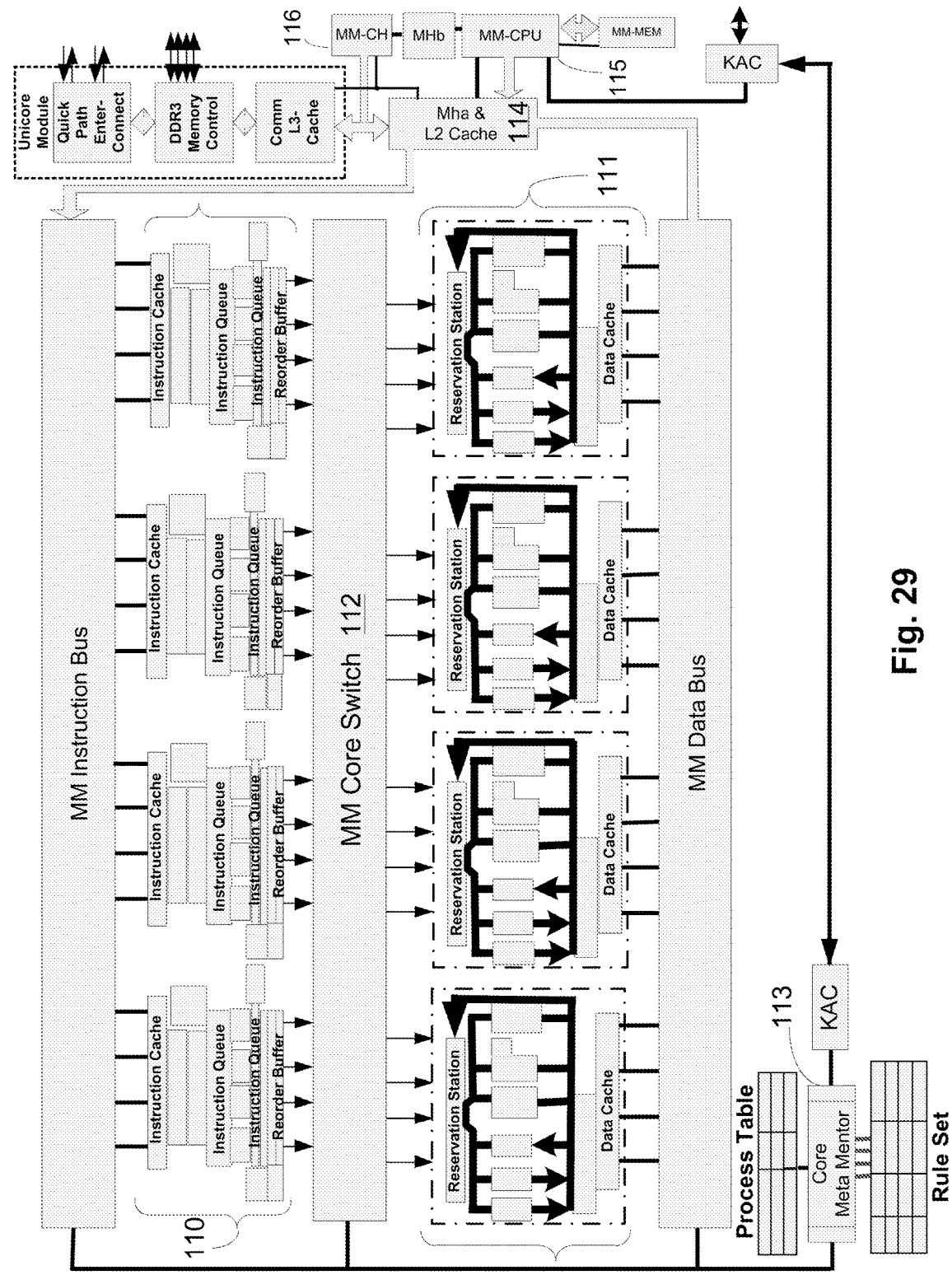
FIG. 29 is a functional block diagram illustrating a Meta Mentor with a dynamically reconfigurable CPU.

Referring to FIG. 29, the Meta Mentor architecture is incorporated with a plurality of CUs 110 and ALUs 111. Each CU is independent of the each ALU, but they are connected by the MM Core Switch 112, (MMCS), MM timing clock (not shown), and the rule set of the Core Meta Mentor (CMM) 113. Instruction information from the L2 cache 114 is connected to the MM Instruction Bus by the same QAIC procedure described in FIG. 28, which routes the instruction information from the MM instruction bus to an Instruction Cache in one of the CUs 110. Which instruction cache is the recipient is determined by the CCM algorithms. The MMCS connects the CU instruction unit with an available ALU and coordinates the data cache with the instruction cache process in accordance with the CMM rule set and algorithms. The MM Data Bus is analogous to the QADC in FIG. 28. Its purpose is to distribute data information to and from the L2 cache and the Data Cache units in ALUs 111. Information to and from the L2 cache 114 is mentored by MM processors 115 and 116 as explained for FIG. 28. How data information is distributed is determined by the algorithms in the CMM and coordinated with the processes in the CU and connections of the MMCS. The MMCS is similar to the device shown in FIG. 21 with MHb and MM-CH replaced with a dataflow configuration shown in FIGS. 23 and 24. The configuration shown in FIG. 29 allows flexibility in several areas within the CPU, including fault tolerance among CPU components 110 and 111, efficient cache coherency, and optimization of ALU/CU component usage. Operations between the cache MM (comprising MM-CPU 115, MM-CH 116 and associated memories) and the core MM 113 are coordinated by means of communications between respective KACs.

Dual CPU Configuration

Figure 8B:
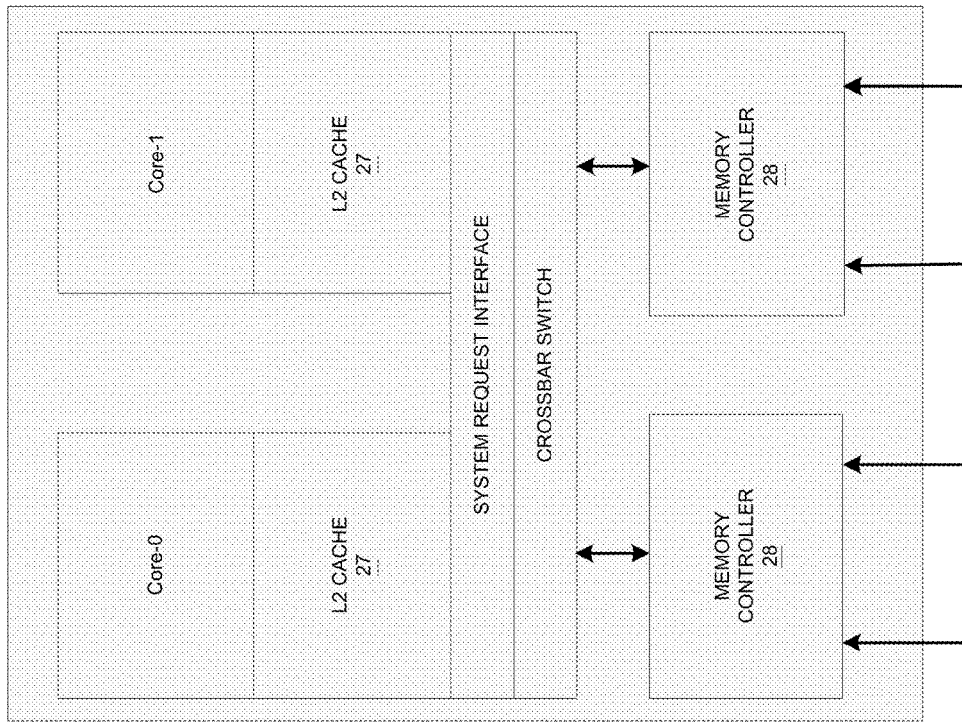
FIGS. 8A and 8B are functional diagrams illustrating conventional dual core CPU architecture.
Figure 8A:
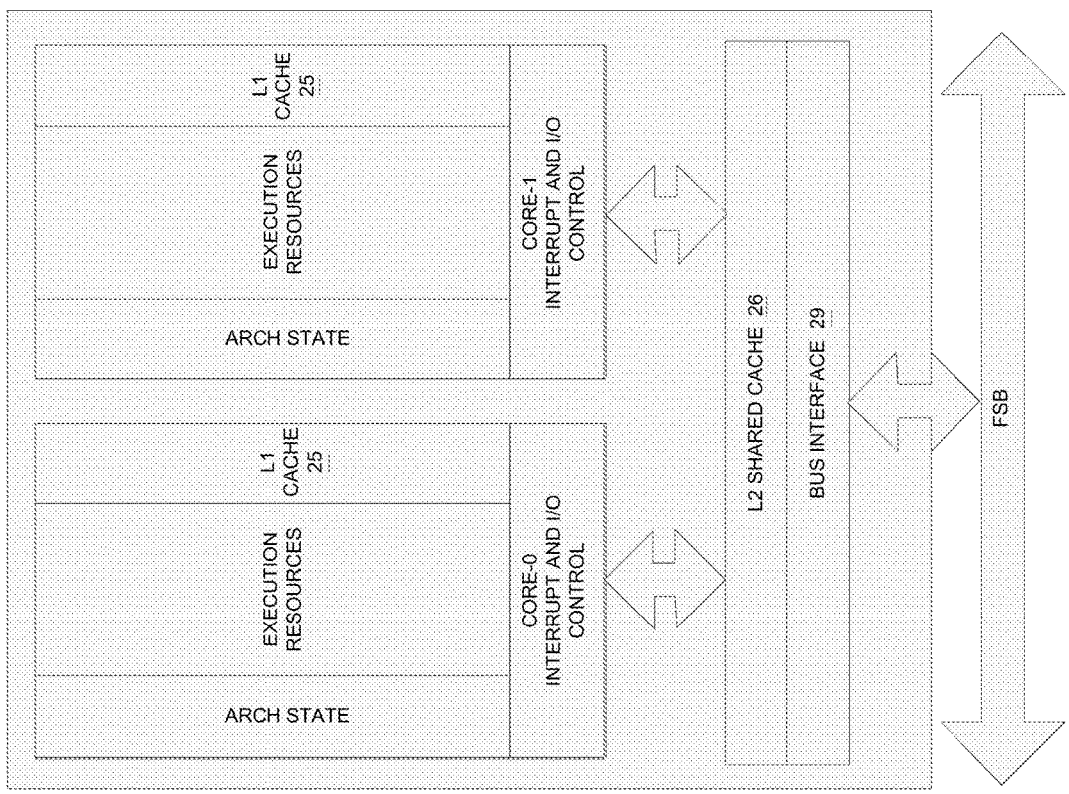
Figure 9:
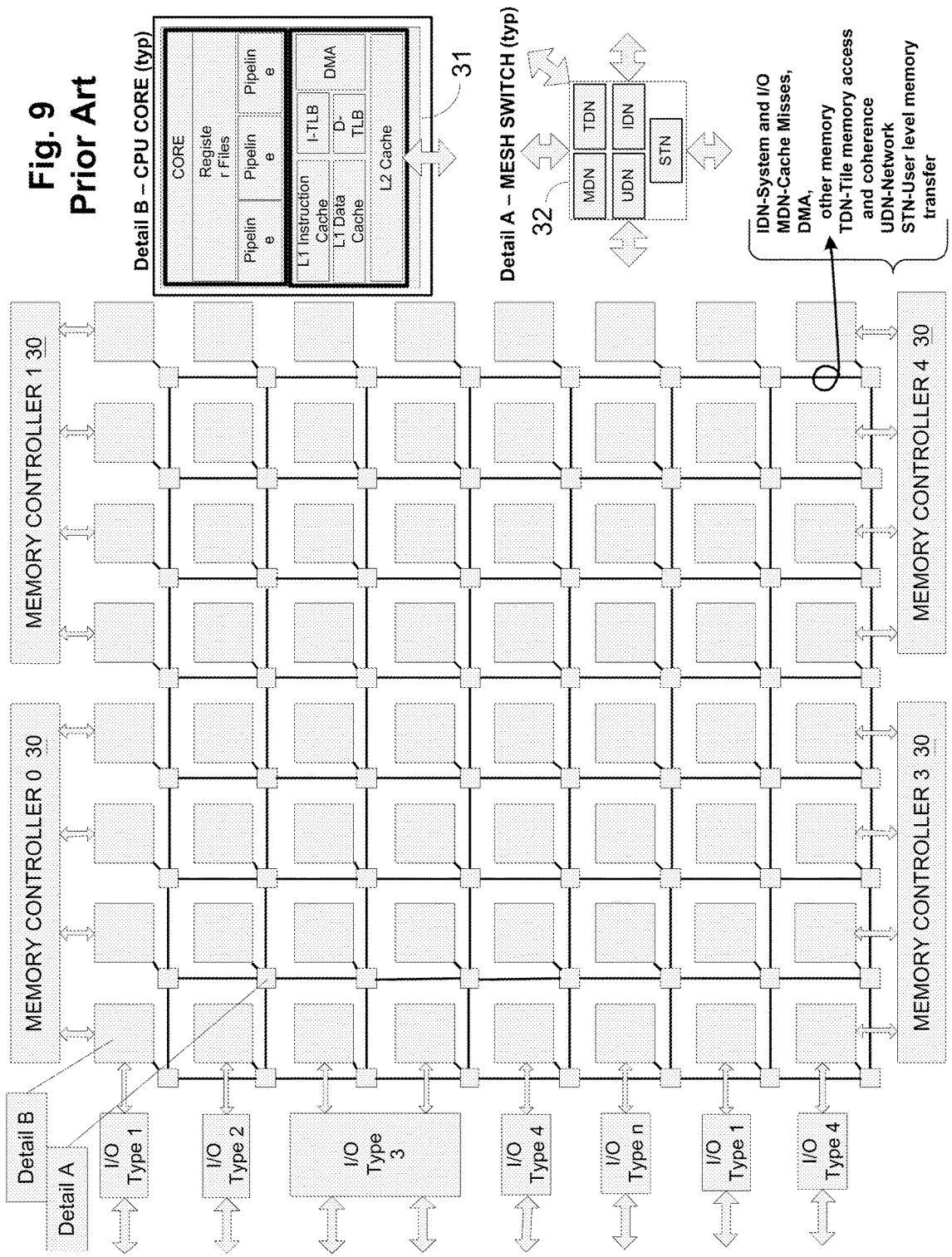
FIG. 9 is a functional diagram illustrating a conventional sixty-four core CPU architecture.
Figure 30A:
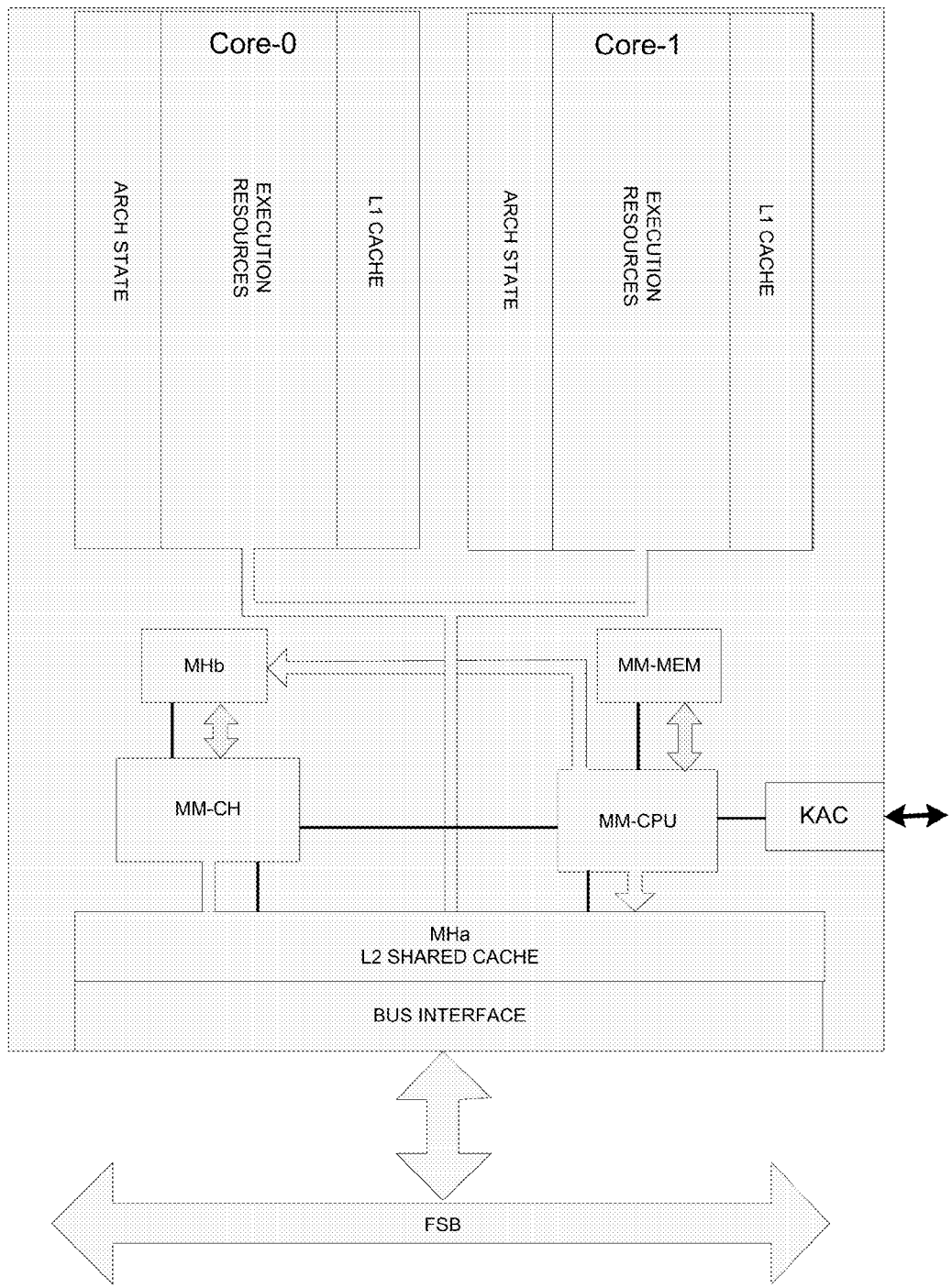
FIGS. 30A and 30B are a functional block diagrams illustrating a Meta Mentor incorporated according to this invention in a computer system with one and two CPU cores, respectively.
Figure 30B:
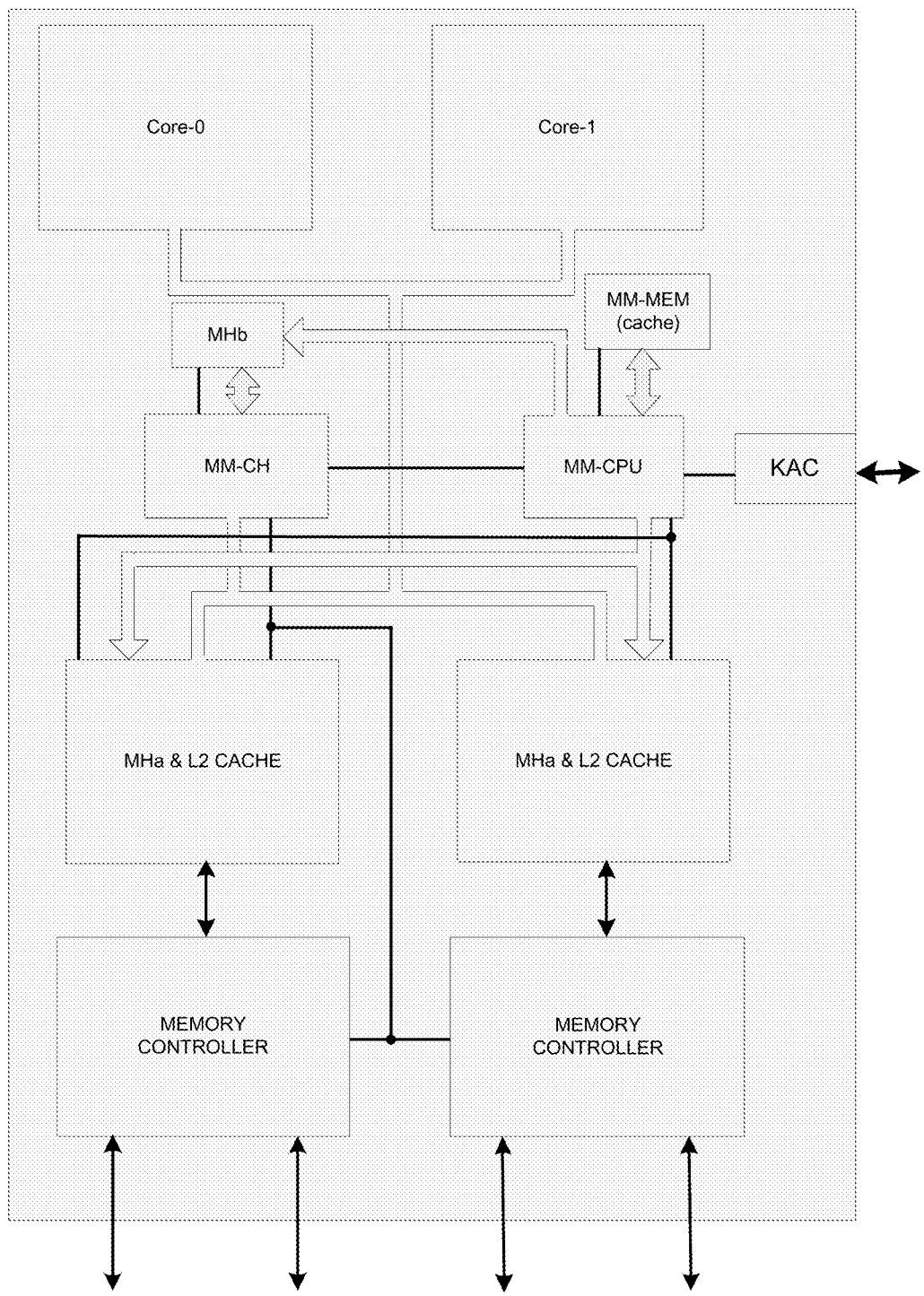

Referring to FIGS. 30A and 30B, the Meta Mentor architecture is incorporated with more than one CPU (QAIC and CADC). Dual core CPU configurations were previously described using FIGS. 8A and 8B, and show shared and dedicated L2 caches along with their support structures. Different manufactures of MM and CPU insure integrity. Illustrated in FIGS. 30A and 30B are the comparable shared and dedicated L2 cache with MM supports structures. It can be seen that given sufficient control of MHb by the MM-CPU algorithms and MM-CH execution there is no deference between the shared and dedicated memory configuration. The MM uses logical algorithms to create a CPU system and the architectures of 8A and 8B use static physical design. The MM replaces the physical support structure and virtualizes the scheduling and information address space.

One advantage the MM architecture has over static dual CPU designs is its ability to reschedule processes when a component fails. Should a component fail, the MM's algorithm will reschedule the process that was using the failed component to a working component; and the overall unit continues functioning without interruption. In dual CPU design the MM functions like the representative single CPU example with the MM's algorithms divide MHa (L2 cache) into active and backup partitions. In the case of a dual CPU/core design the MM's algorithm in to L2 cache into active and backup partitions for each CPU/core. This creates a minimum of four partitions. The L2 cache in FIG. 30B shows two distinct L2 cache modules having a common connection to either Core-0 or Core-1. This configurations allows the MM to arbitrarily assign and designate a partition and either Core-0 or Core-1. Likewise, the information in a partition can be arbitrarily assigned to any core or (QAIC and CADC). The Interrupt and I/O control; and System Request Interface and Crossbar Switch in FIGS. 8A and 8B have been replaced with the MM's algorithms, interrupt and I/O control scheme shown in FIG. 30B.

Multiple Core Processors

Figure 31:
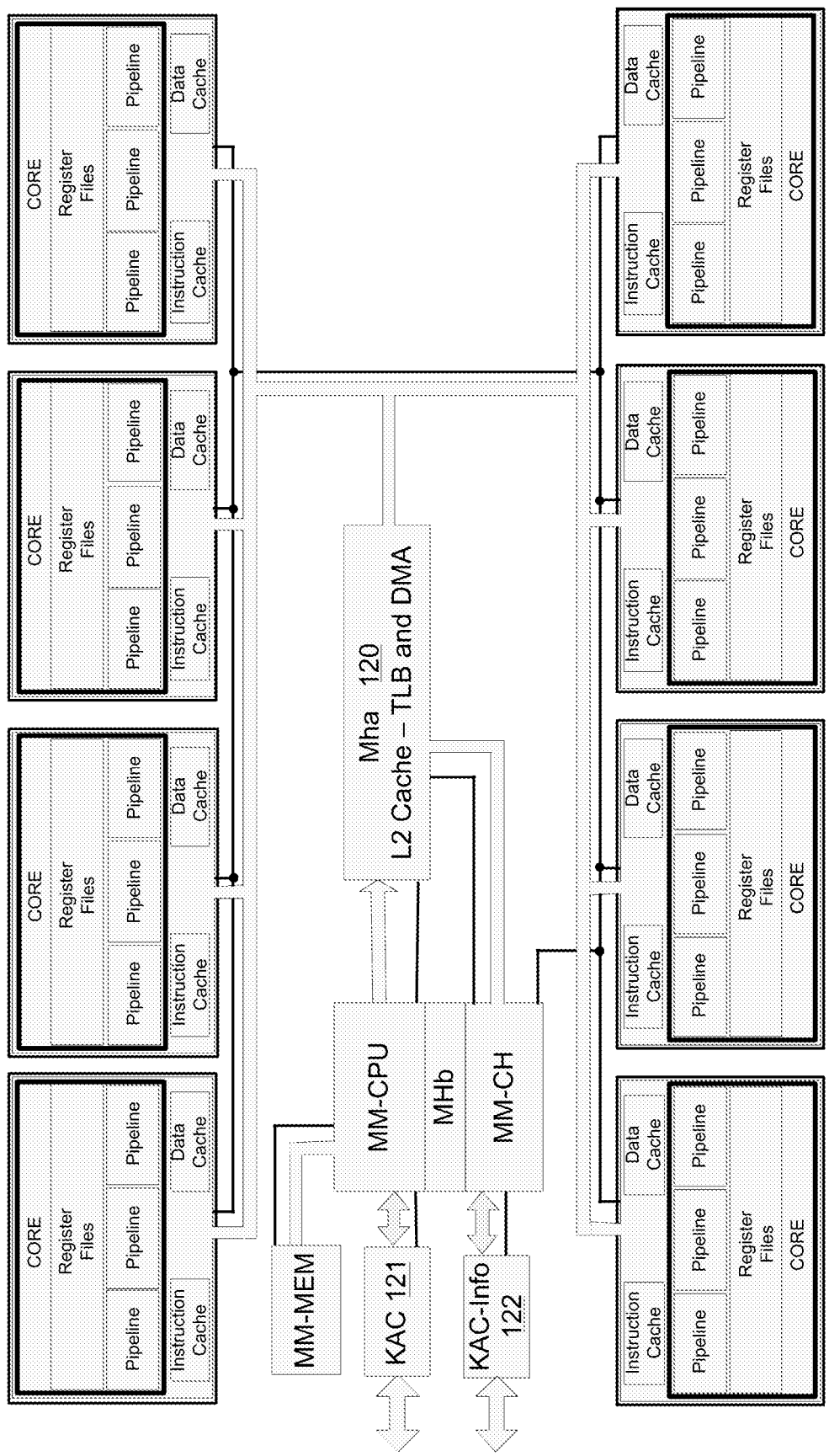
FIG. 31 is a functional block diagram illustrating a Meta Mentor incorporated according to this invention in a computer system with eight CPU cores.

FIG. 31 illustrates the Meta Mentor architecture within a multi-core CPU. The MM Switch configuration is similar to the one shown in previous examples. Each core is shown with an Instruction Cache (QAIC) and Data Cache (DACD). The memory module, in this example, MHa (L2 cache) 120 is divided into 16 virtualized partitions, two for each core, with additional memory address space MHb devoted to the function as the relevant rules set which describes how MM-CH processes core information. As with the previous example in FIG. 28, each core partition has an active and backup partition. In operation, the active partition of a core's MHa is copied to the backup partition creating a check point. A portion of this information is transferred to the Instruction Cache and another portion is transferred to the Data Cache. The core utilizes this information until either the data or instruction is consumed at which time the core requests information to be transferred from MHa partition to either cache. Should a core fail at any time, the MM-CH scheduling algorithm reschedules another core to process the information from the last check point. In the event the information in the L2 cache is consumed, the active partition is populated with new information, which is copied to the backup partition; creating a new check point and the core continues processing the information. A feature of the MM is that it is able to bias the information in the L2 and Instruction and Data Caches such that new information is pulled into the L2 cache before it is completely drained, thus eliminating wait times for the information to be saved and fetched from main memory. The MM-CH, MHb, MM-CPU, and MM-MEM components function generally as previously described for FIGS. 21 and 26, i.e., the MM-CPU being the rule set server, the MM-MEM being the repository of the master rule set, the MHb being the repository for the relevant rule set, and the MM-CH enforcing the rule set including rule sets concerning the data virtualization and instruction scheduling in MHa (L2 cache).

If the MM-CPU is interrupted to service a device such as the PIT-DID of FIG. 21, the MM-CPU algorithm uses MM-CH which first attempts to schedule an unused core. If all cores are busy the MM-CH will schedule an interrupt to a core that will service the system request. When this happens the L2 cache is saved in MM system memory as previously described in the PIT-DID interrupt fault tolerant process manner and the service routine process is loaded into MHa and started on the core using the similar algorithm as the biased active and backup partition division of the L2 cache with respect to FIG. 28. In this manner, the interrupt process is integrated into the fault tolerant L2 cache. The process that has been swapped out by the interrupt to run the service routine may be restarted on any available core.

Figure 32:
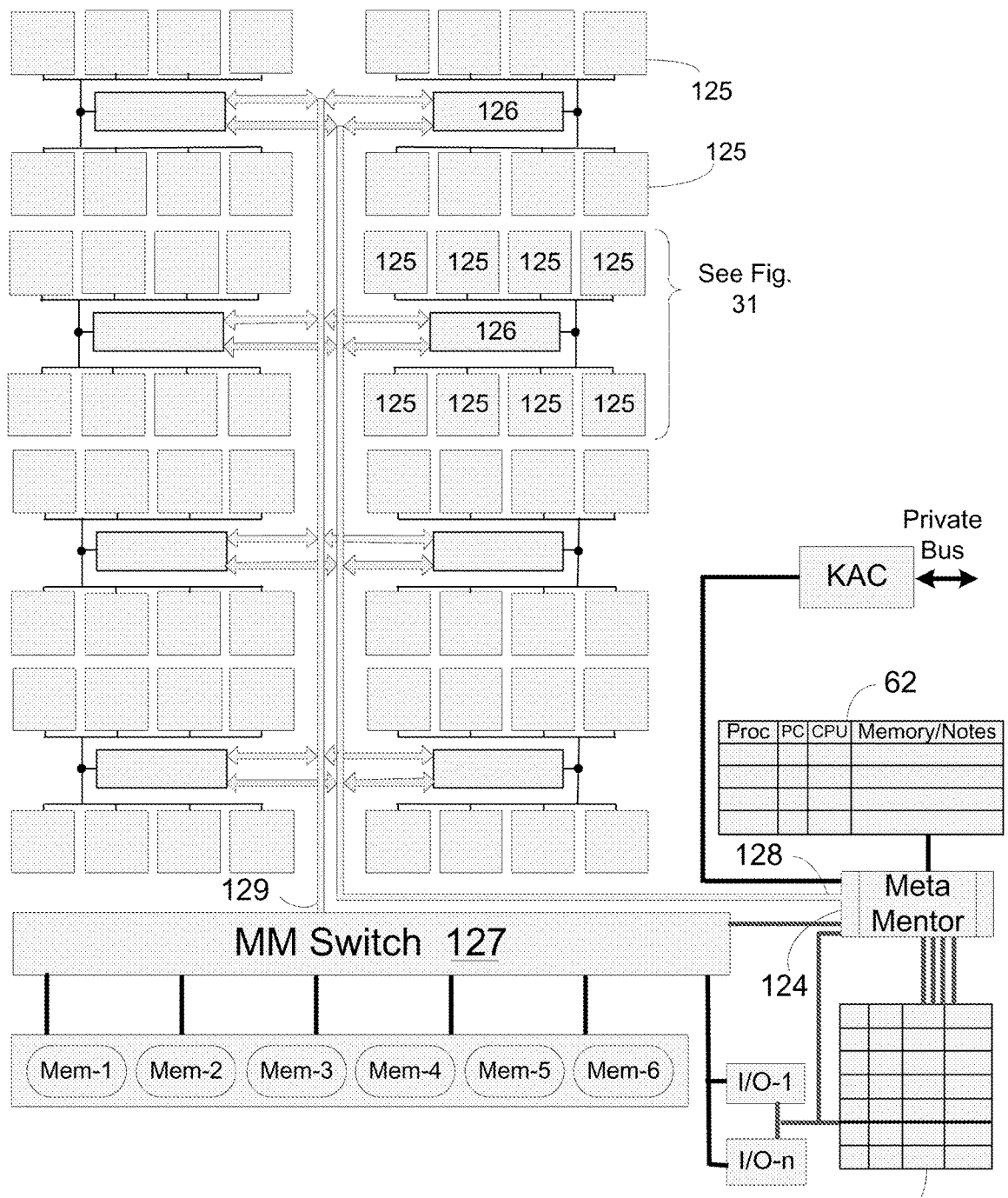
FIG. 32 is a functional block diagram illustrating a Meta Mentor incorporated according to this invention in a computer system with multiple CPU cores but with the Meta Mentor being external to the cores.

Referring again to FIG. 31, information sent to and from the MM is divided into two streams, KAC 121 and KAC-Info 122. The KAC stream is a private stream whose communications are limited to other MM-CPU within the system. The KAC-Info information is instruction, data, and control information that communicates with other non-MM-CPU components in the system. For example, when the MHa 120 swaps out a partition with main system memory it uses the KAC-Info stream to transfer the information. These two streams are divided for security reasons and one stream cannot contaminate the other stream. The KAC stream also keeps track of redundant information located on other Meta Mentor modules via the private bus as shown in FIG. 32 where eight MM modules are combined into a 64 core CPU.

Memory Coherence

Microprocessor technology is trending towards multi-core processing where a single CPU package contains several CPU "cores". The multiple cores usually consist of Harvard architectures that share common von Neumann style resources, such as a coherently shared memory in the L2 cache. Because the von Neumann resources are shared among the cores, the strategy and algorithms to access the information in the von Neumann resources are markedly different than a single core processor. Caches in a multi-core distributed system create improved core performance, but multi-core configurations introduce cache coherence problems. There are several types of cache coherence configurations.

1. Direct Cache Coherency (DirCC)

Multiple copies of information are shared on fixed partitions of cache memory. Information is updated by cascading new information to partitions within the cache. Information is read by fixed local connections that are determined at time the device is built.

2. Remote Cache Access (RMA)

The technique uses one large virtual non-uniform cache access (NUCA) cache. Each core is assigned a home address space where information is accessed. If a core requires information not in the home address space, it references another device that will perform the memory operation on its behalf.

3. Execution Migration Machine (EM2) Memory is assigned to cores rather than cores assigned to memory.

4. Directory-Based Coherence (DBC)

In a directory-based system, the data being shared is placed in a common directory that maintains the coherence between caches. The directory acts as a filter through which the processor must ask permission to load an entry from the primary memory to its cache. When an entry is changed the directory either updates or invalidates the other caches with that entry.

5. Library Cache Coherence (LCC)

Library replicates data to multiple local cores. Information is checked-out from a central library of cached information and a copy is placed on a read only local directory. Information is updated on a time-out basis.

Snooping is the process where the individual caches monitor address lines for accesses to memory locations that they have cached. When a write operation is observed to a location that a cache has a copy of, the cache controller invalidates its own copy of the snooped memory location.

Snarfing is where a cache controller watches both address and data in an attempt to update its own copy of a memory location when a second master modifies a location in main memory. When a write operation is observed to a location that a cache has a copy of, the cache controller updates its own copy of the snarfed memory location with the new data.

All of these cache schemes have a dedicated architecture. The MM uses a dynamic memory approach where virtualized cache schemes are matched to the process algorithm to increase cache efficiency. For example, when multiple caches need to updated at the same time the MM can create a multiple writes for a particular variable, similar to the redundant writes in memory. LCC schemes are either checked out or virtualized. Updates to local caches can be virtualized to address spaces that are not affected by other local nodes or they can be global. This combines the DirCC, RMA, and LCC approaches into one schema.

Referring to FIG. 32, illustrated is a sixty-four core CPU partitioned into blocks of eight, and a MM 124 controlling an MM switch 127, external to the cores. The external MM 124 schedules the processes that will be used by the cores 125. Each block of eight cores contains an instruction and data cache and is mentored by an MM 126, i.e., each block includes block meta information, a block MM memory functioning as a virtualized L2 cache for the instruction and data caches, a block mentor domain processor, and a block mentor switch, as previously described with respect to FIG. 31; however coordination with other MMs 126 within the CPU managing the cores allows fault tolerance to the core level. Coordination is done at two levels. First information KAC 121 shown in FIG. 31 permits communication between MM 126 devices similar to that shown in FIG. 39, which allows checkpoint and process information to be exchanged among the MM 126 via the 128 bus. Second MM 126 devices communicate with MM 124 for scheduling, hardware competence and validation, binary compatibility, and process efficiency. For example, MM 124 has the option of defining the type of cache coherency MM 126 provides to maximize the performance of individuals processes and threads. MM 126 device request data and instruction information from MM 124 and may be biased to prefetch information from DID memories (Mem-1-Mem-6) via bus 129.

A feature of the system shown in FIG. 32 is that the cores are not restricted to a particular type or binary compatibility, controlflow or dataflow. This type of heterogeneous environment can be seen in FIG. 26 and can also be seen to be extendable to a multi-heterogeneous core CPU. Preferably the L2 cache for each block, as shown in FIG. 31, is virtualized into at least multiple partitions for each block by the block mentor domain processor in cooperation with the block mentor switch according to the block meta information. In addition this embodiment includes a set of DID memories (Mem-1-Mem-6) virtualized by the MM 124 which includes overall meta information pertaining to all blocks, an overall mentor domain processor (not shown) with access to the overall meta information, the overall mentor switch 127 providing communication between all the blocks and the set of DID memories (129), and a communication link between the MMs 126s and the overall mentor switch (128).

Figure 10:
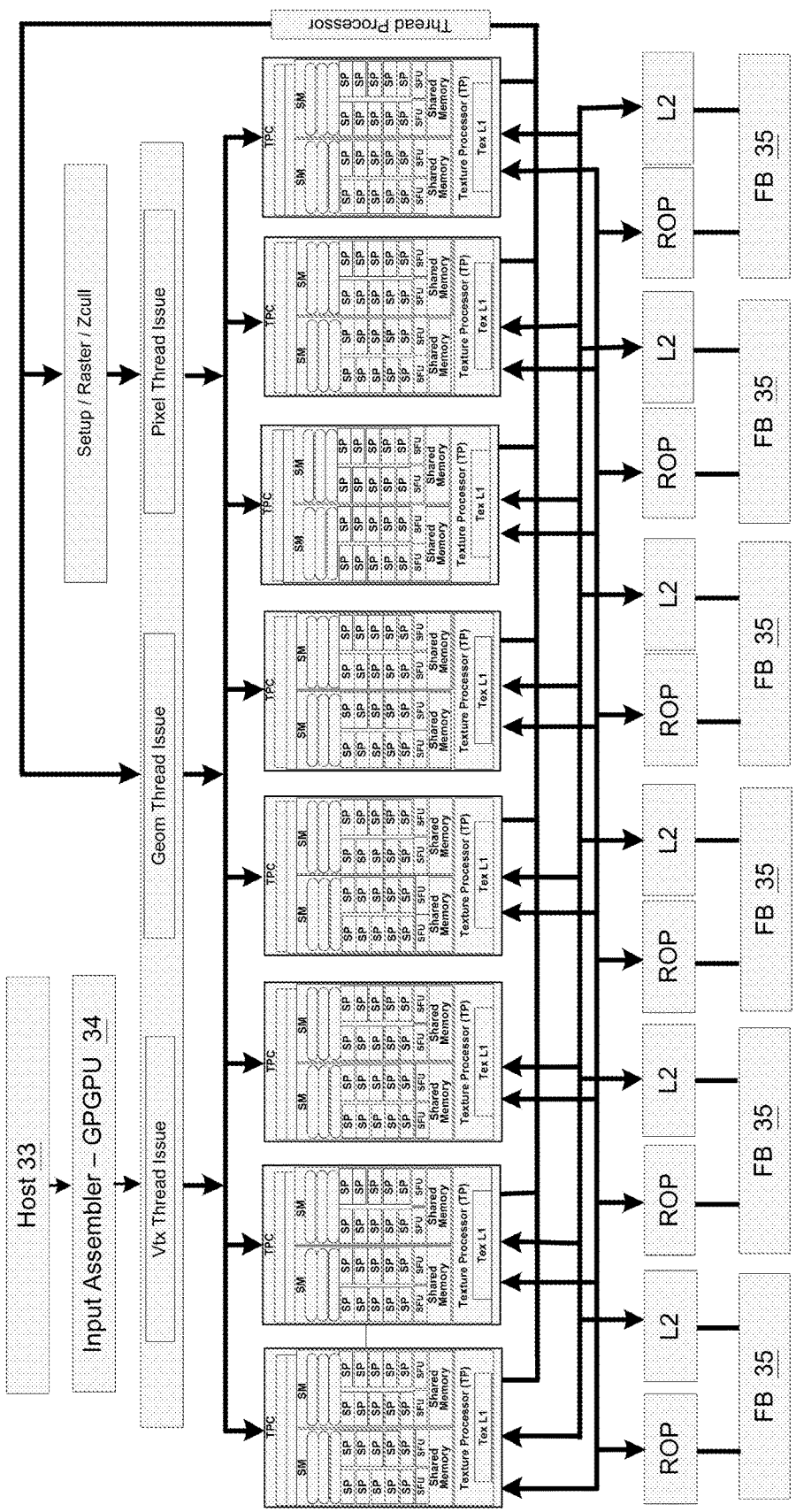
FIG. 10 is a functional diagram illustrating a conventional GPGPU architecture.
Figure 11:
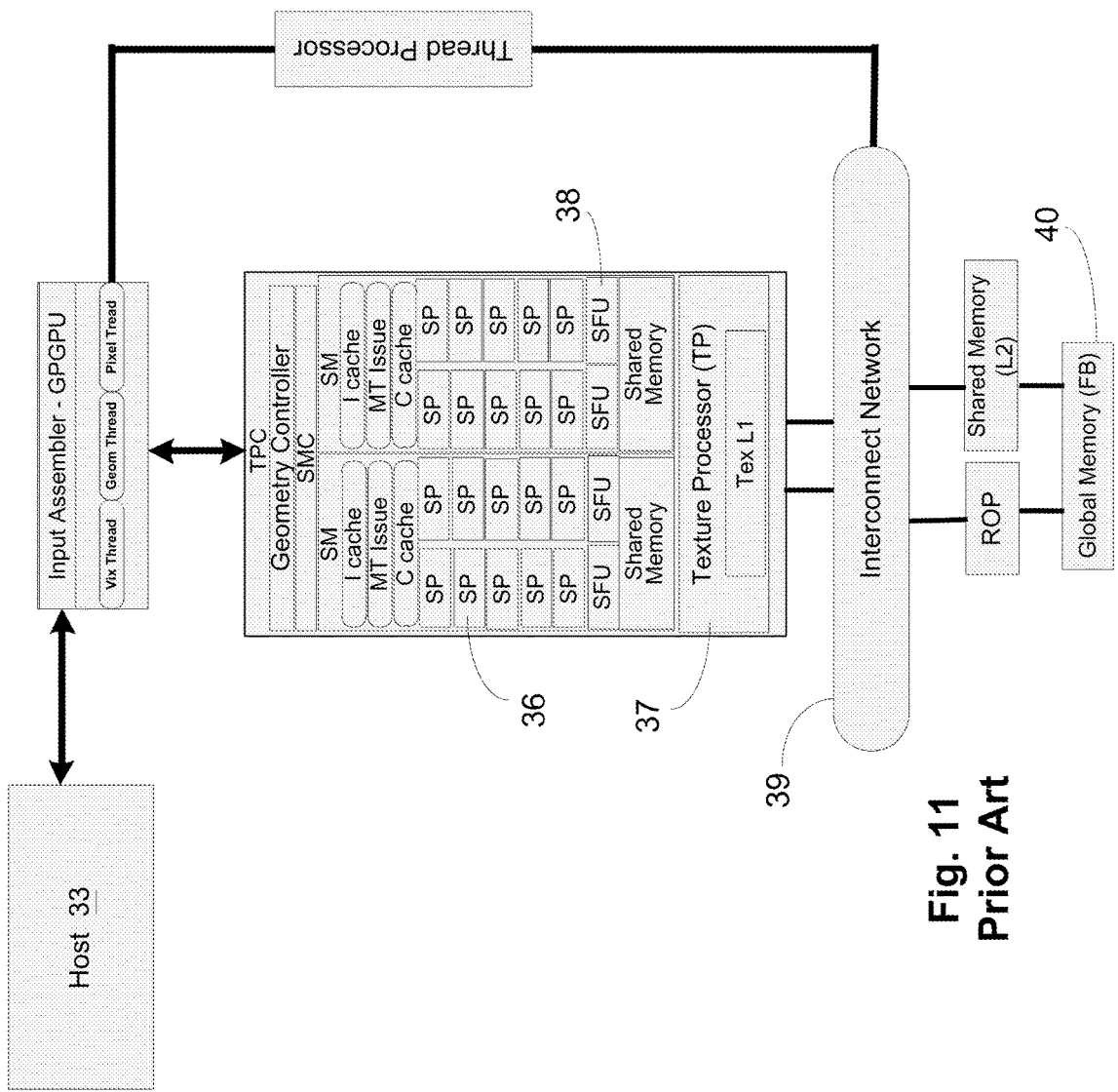
FIG. 11 is a flow diagram illustrating a conventional GPGPU processing flow.
Figure 12:
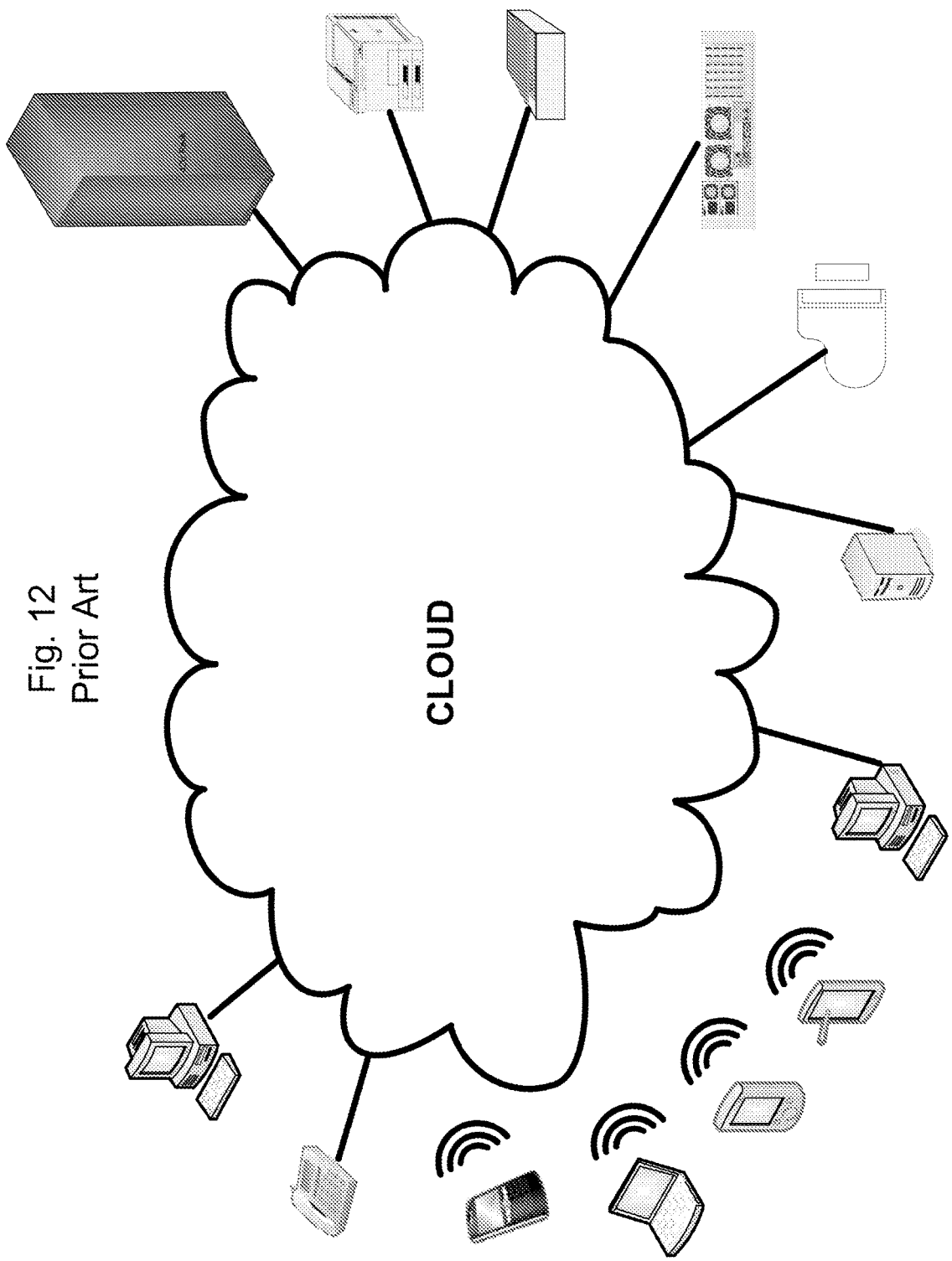
FIG. 12 is a flow diagram illustrating a conventional cloud system architecture.
Figure 33:
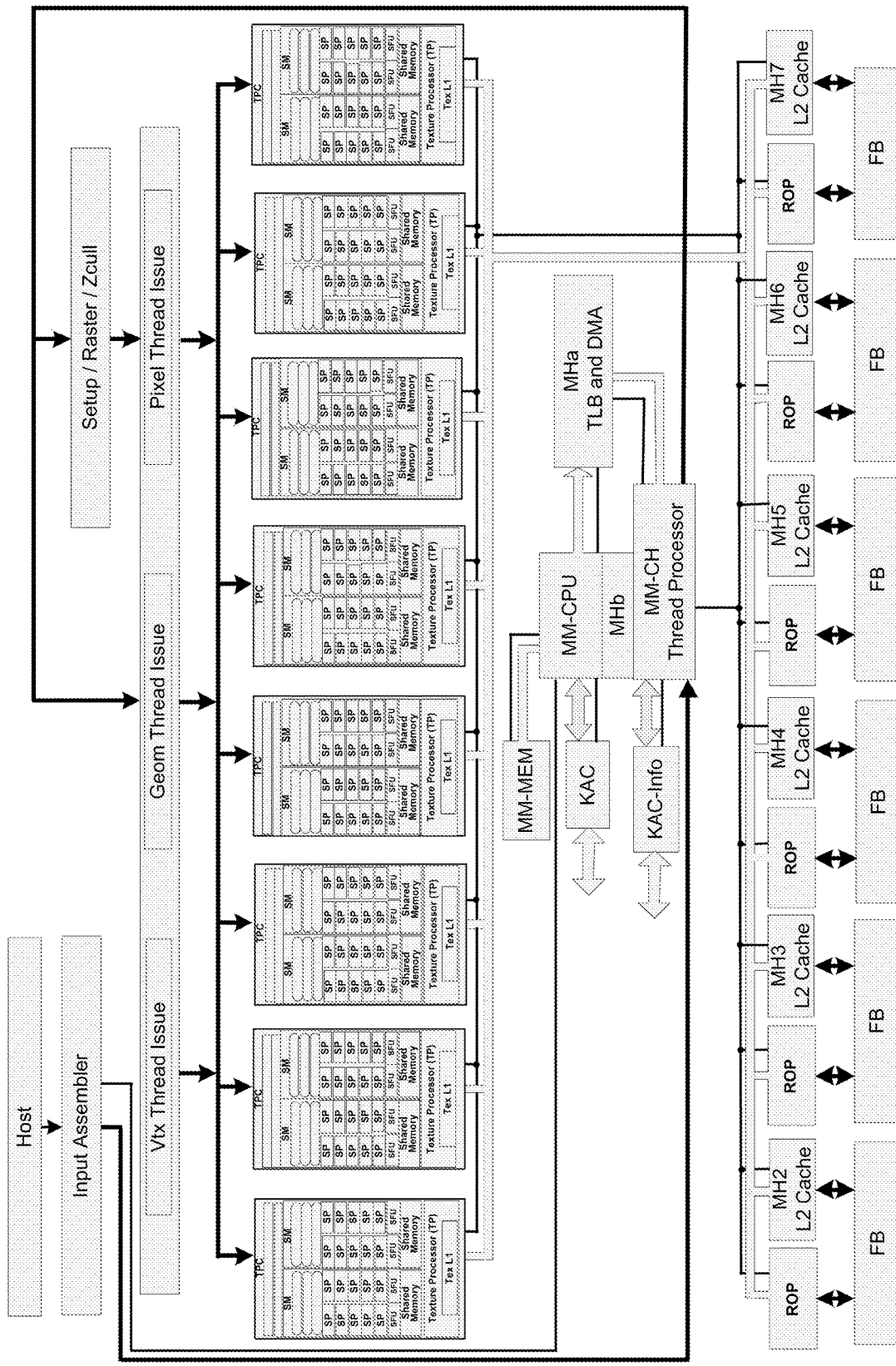
FIG. 33 is a functional block diagram illustrating a Meta Mentor incorporated according to this invention in A GPU context.

Referring to FIG. 33, illustrated is a MM incorporated in a GPU context. In this configuration the MM is servicing and virtualizing multiple L2 caches, labeled MH2 through MH7. In the conventional GPU model each SP/TP array is loaded with an operating system that provides a predetermined set of functions that can operate on a process. By incorporation of a MM the GPU is not limited to one operating system or a predetermined set of functions. Each SP/TP array may have a unique operating system and function capability that can be changed dynamically. The MM can also be placed between the L1 cache (labeled Tex L1) and TPC in a TPC process module reducing the MM system to FIG. 32 in a heterogeneous environment. Such a heterogeneous environment could include a combination of SP/SPU/TP/GPU and a tagged token system for example. Placing the frame buffer address space under an MM provides a fault tolerance to the frame buffer along with all of the other features of an incorporated MM. It can be shown that inserting a MM in a different place within this system defines how the system reacts to faults and how flexible its functionality. As an example of this flexibility, MM-CH doubles as the relevant rule enforcer whose rules include how to perform as a "Thread Processor" shown in FIG. 10.

Grid Computing

Figure 34:
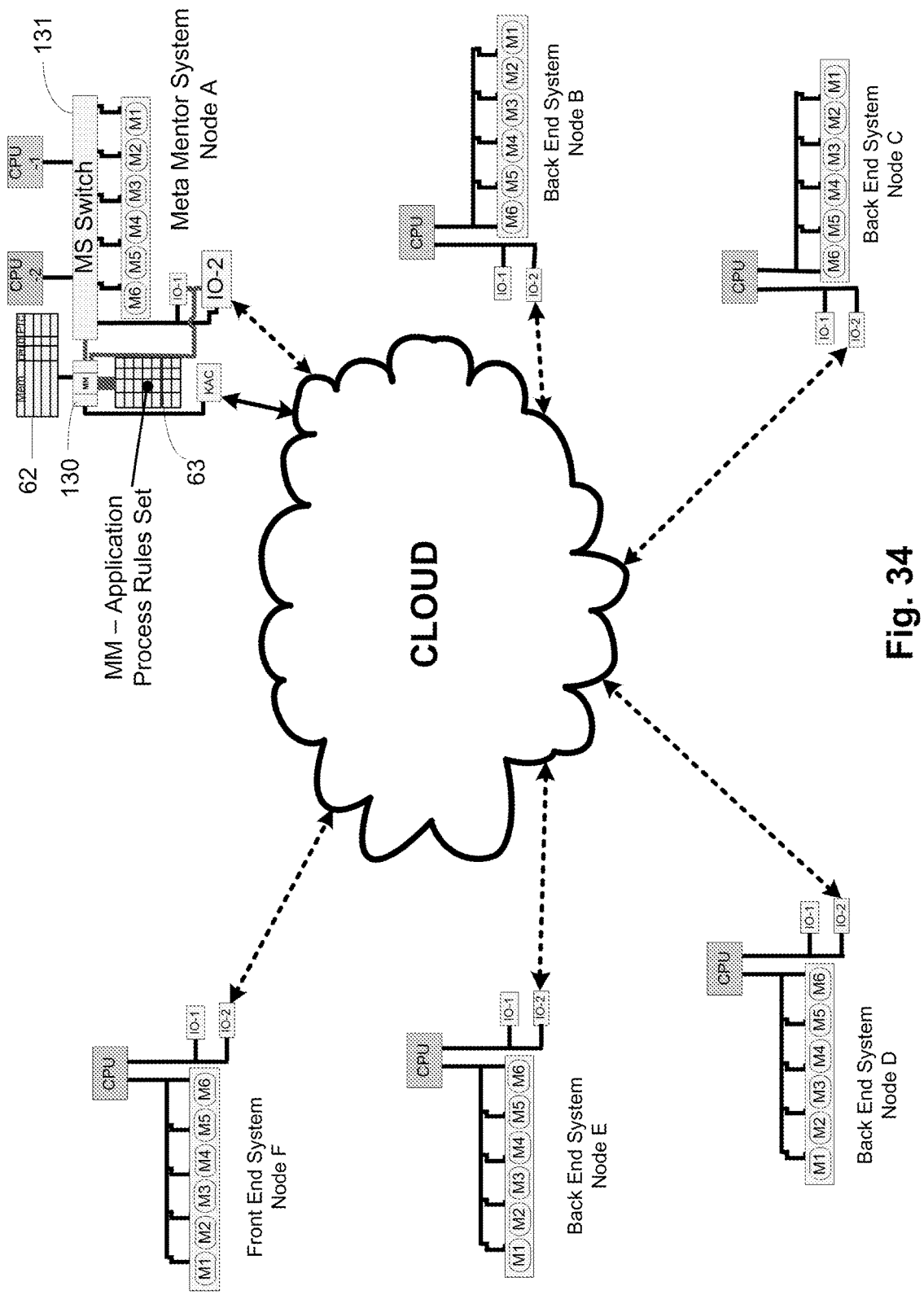
FIGS. 34, 35 and 36 is a functional block diagram illustrating a Meta Mentor incorporated according to this invention in a grid computing system.
Figure 35:
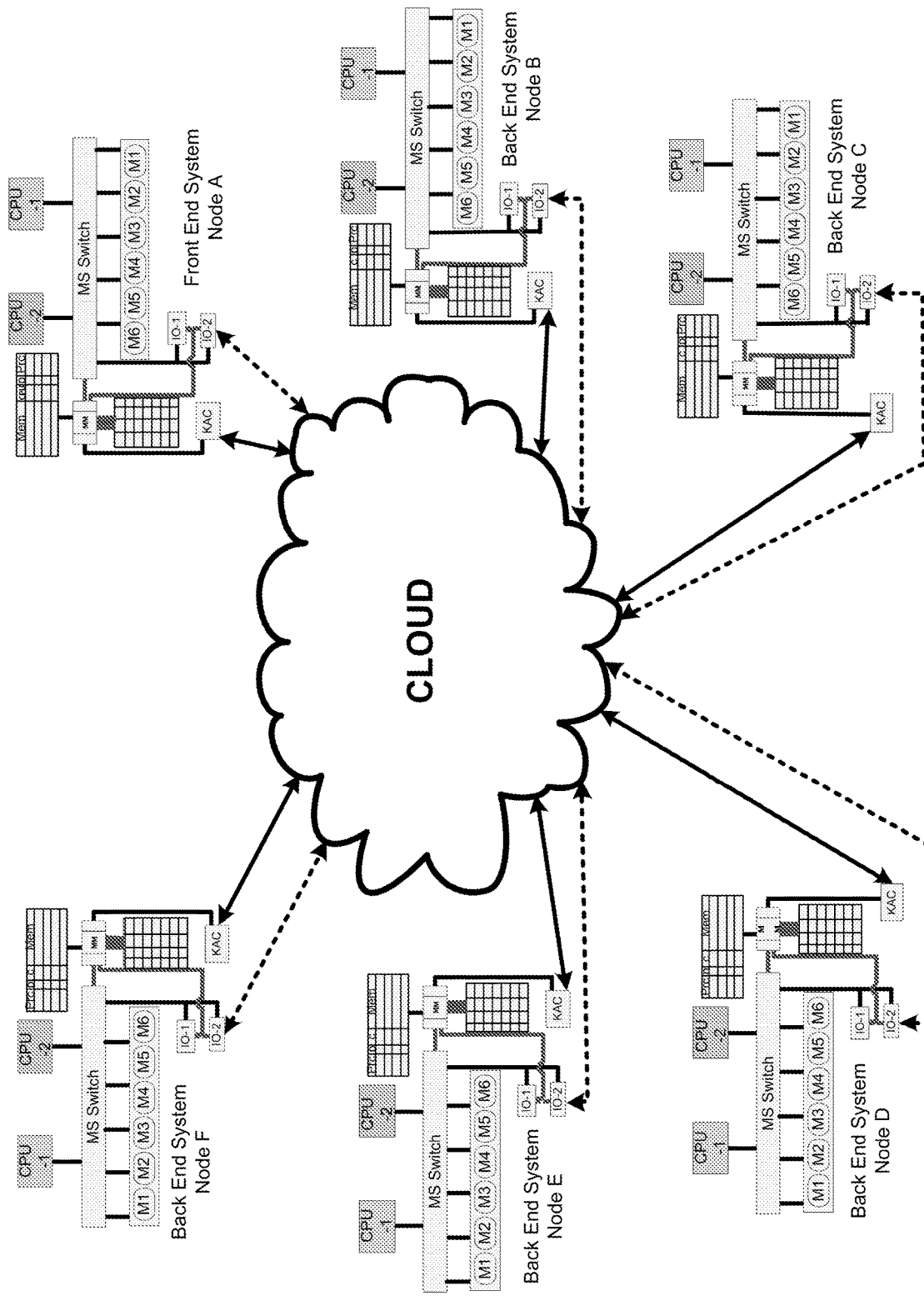
Figure 36:
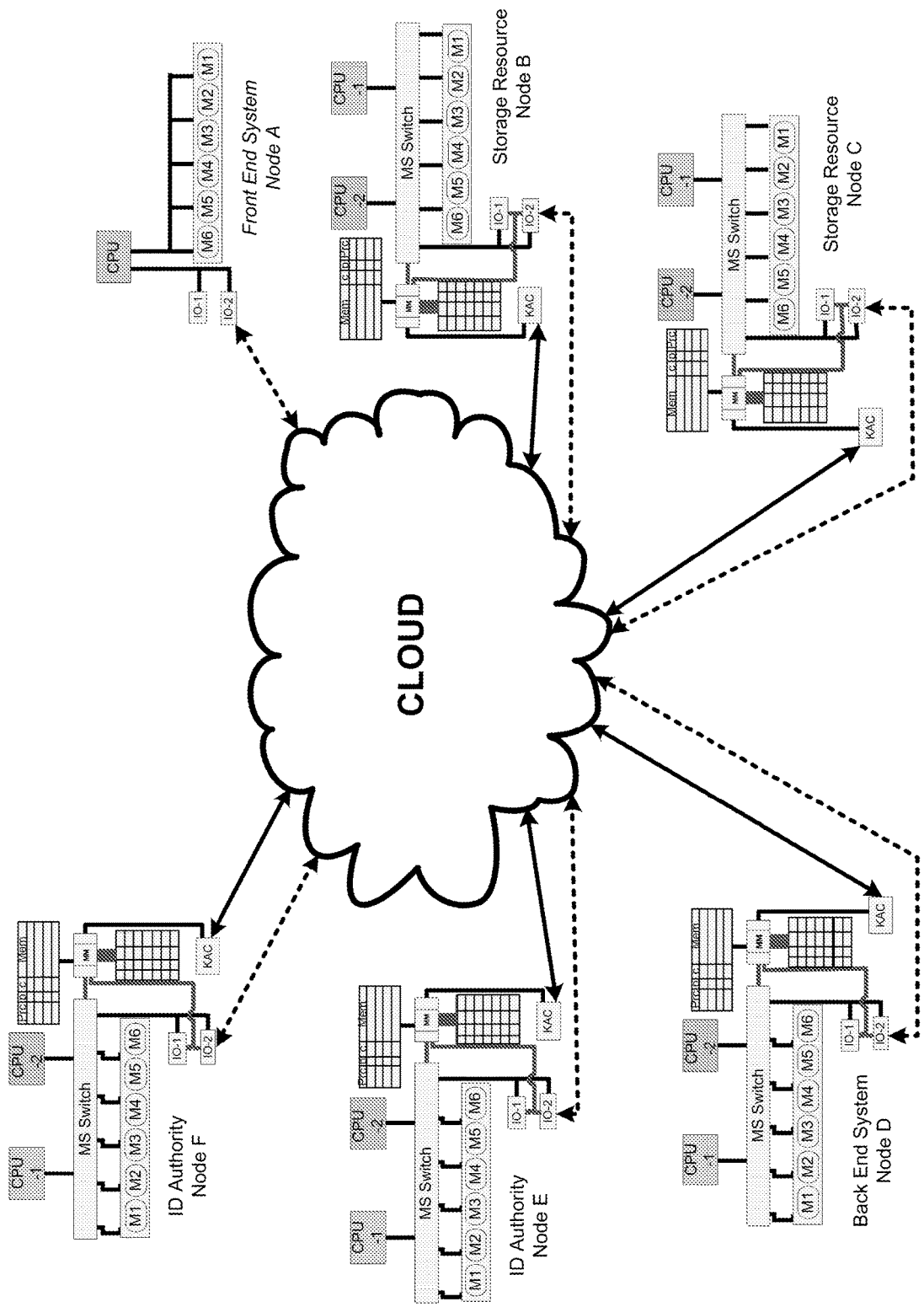

Referring to FIGS. 34, 35, and 36, each figure illustrates incorporation of Meta Mentors according to this invention in grid computing systems. There are no restrictions by the type of the previously mentioned cloud systems on the functioning of MMs; and additionally cloud system with MMs can interact with non-MM cloud systems as well. As previously described, a grid system can generally be divided into a frontend and backend systems. A MM can operate as a frontend or backend system, or it can operate in both frontend and backend systems. A frontend MM system is shown in FIG. 34 with a non-MM backend.

Referring to FIG. 34, illustrated is the communication process between the non-MM cloud and MM system, including a MM 130 and a MM switch 131, designated as Node A. Suppose an electronic signal, called a datagram, created from a system outside the Node A MM system sends a message to a Node A I/O port, e.g. IO-2. The arrival of the datagram triggers Node A's programmable interrupt timer (not shown) to interrupt the MM by the same or similar process sequence described above in connection with FIG. 21. The communication may be from a web browser application, for example. The relevant rule set that is available on how to process this type is located in the MM-Application Process Rules Set 63 stored at Node A. The relevant rule set was previously stored by the MM 130, e.g., by MM-CPU (not shown), in a relevant rules cache, e.g., MHb (not shown), as explained in connection with FIG. 21. For this particular engagement, the relevant rule set information enables an abstraction/virtualization processor, e.g. an MM-CH (not shown) to virtualize non-MM pieces of the computing system. The non-MM system component's web browser service routine's address is placed into an appropriate virtualized memory location located in memory units M1-M6. The web browser process is started by interrupting either CPU-1 or CPU-2, say CPU-2 and the web browser service routine is started on CPU-2, conforming the MM process rules of engagement.

The communications continue until the web browser process attempts to start a sub-process. The Node A MM determines if the process can be started by consulting the MM Process Rules of engagement. If the rule set allows processing, the processing is virtualized and the information from CPU-2 continues by starting the virtualized sub-process to at a predetermined process starting address. If the MM rule set disallows processing or processing at the requested address, the web browser processing is ceased. This may be causes by application errors. There can be several retries but as previously described, eventually the parent process, the web browser application is terminated and CPU-2 can be interrupted to process another task. An error function is executed and the state information from the last checkpoint is point of the failure is transferred to more permanent location. This information can be scheduled on CPU-2 and is started, stopped, and replayed the states from the last checkpoint to the failure and beyond until the parent process was terminated. The information obtained from analyzing these states will provide forensic information about the fault.

If the fault is caused by software; an alert signal is sent and the software is blacklisted if needed. If the fault is caused by a hardware malfunction the failed component is isolated by means of any number of algorithms and the system continues to function normally using other components that serve the same function as the failed component or software. These components and software to not have to be binary compatible with the failed items, the only requirement is they provide the same functionality.

Processes sent into the cloud by the MM system are processed like any other process within its domain, and the process can be restarted in the event of a cloud failure. The MM retains control over its domain and its fault tolerant properties while functioning in a non-MM cloud environment.

Referring to FIG. 35, illustrated is a Meta Mentor based cloud system. All the systems are MM systems although there are no restrictions on having a both non-MM and MM systems as part of a cloud network. There are several advantages to a MM cloud system. One advantage is security and cloud identity. Node A is a front end node and requests backend resources from the cloud. The request is in the form of broadcast datagrams for disk storage resources to the backend nodes. A minimum of two nodes respond, say e.g. Nodes B and C. Nodes E and F act as authority/certificate servers. There are several scenarios that are unique to the MM architecture, the following is an example.

When Node A broadcasts for resources within the cloud, authority/certify Node E receives the broadcast and assigns B and C to respond and also dynamically assigns a header sequence to the datagram stream and places a unique key on Node A for this process. This creates a unique identification key and sequence of information that is ordered by the algorithm in E. The key and sequence information is transmitted on the private MM KAC (keep alive controller) network from Node E to Node B, Node C, and Node A. Since the MM domain is disjoint from the DID, a user or process in the DID cannot affect the MM domain keys or sequence. Likewise, MM domain cannot change the DID's data or instructions. Node A scheduler executes the sequence routine to be transmitted through the network connection. Node E's KAC contacts Node A's KAC and communicates to expect this sequence from Node B. Simultaneously, Node F contacts Node C and specifies a sequence for transmission between Node C and Node A. These could be different sequences and could be transmitted encrypted over standard communication port. So at this point there is confidence that Nodes B and C are communicating with Node A, beyond certificates exchanges between all parties.

Node A is authenticated with two paths and an algorithm from Nodes E and F. Node A communicates with Nodes B and C by means of unique sequences. At any time during the transaction the sequence can be modified, IP numbers can be dynamically assigned, and tokens exchanged for verification. Nodes B and C can determine Node A authenticity by a queue transaction of nodes E and F. Likewise Nodes B and C can do a queue server transaction with Node A.

Cloud nodes using Raid 5, Raid 6, or stripping prevent one node from containing information that would compromise the information. If the Node A was requesting processes, the processes would be assigned in a spread spectrum arrangement such that no one node would have enough information to guess the process or result. These are all locally fault tolerant systems and should Node A fail, the processes and data can be restored to Node C or D.

Referring to FIG. 36, illustrated is a Meta Mentor back end cloud with a non-Meta Mentor front end. This configuration functions the same as the system shown in FIG. 35, except communication with the front end is limited by a single domain. This means the Node A's communication sequence and certificate information is channeled only through an I/O port. Communications of Node A verifying the authenticity of other nodes in the cloud are limited to one domain and a static I/O port. The communication of the MM back end cloud is the same as in FIG. 35 and the combination of the private network KAC and IO channels determine sequencing and authenticity of each node in the cloud.

The verification of Node A is accomplished by one of the backend nodes, i.e., Node D requests Node F to verify the authenticity of Node A. Node F algorithms verify the communication path and certificates of Node A, and transmits the information sequence to Node A. The algorithm continues with communication of the verification and the information sequence order to Node D who then communicates directly with Node A.

The same type of process can continue with the spread spectrum approach in the Meta Mentor backend cloud. The sequence and rhythm on the spread spectrum is defined by a canonical MM node, which relays the information to the compute nodes and the front-end node. Likewise, data storage is defined by a canonical node that contains information about the striping and timing of the data. This information is retained by the front end node, or the canonical node, for further storage information communication.

In all cases, a Meta Mentor maintains control over the virtualization and process scheduling within its own domain and only allows processes to start from a preapproved address area and devices, according to a relevant rule set pre-stored in a relevant rules cache in the MM's Mentor switch, as more fully explained above in connection with FIG. 21. An MM can communicate with other MMs via a private network separate from the network using the I/O communications. The fault tolerant aspects of the Meta Mentor architecture allows a process to be restarted from a check point similar to the process describe above, or time out a process after a series of failures.

Cluster Computing

Figure 13:
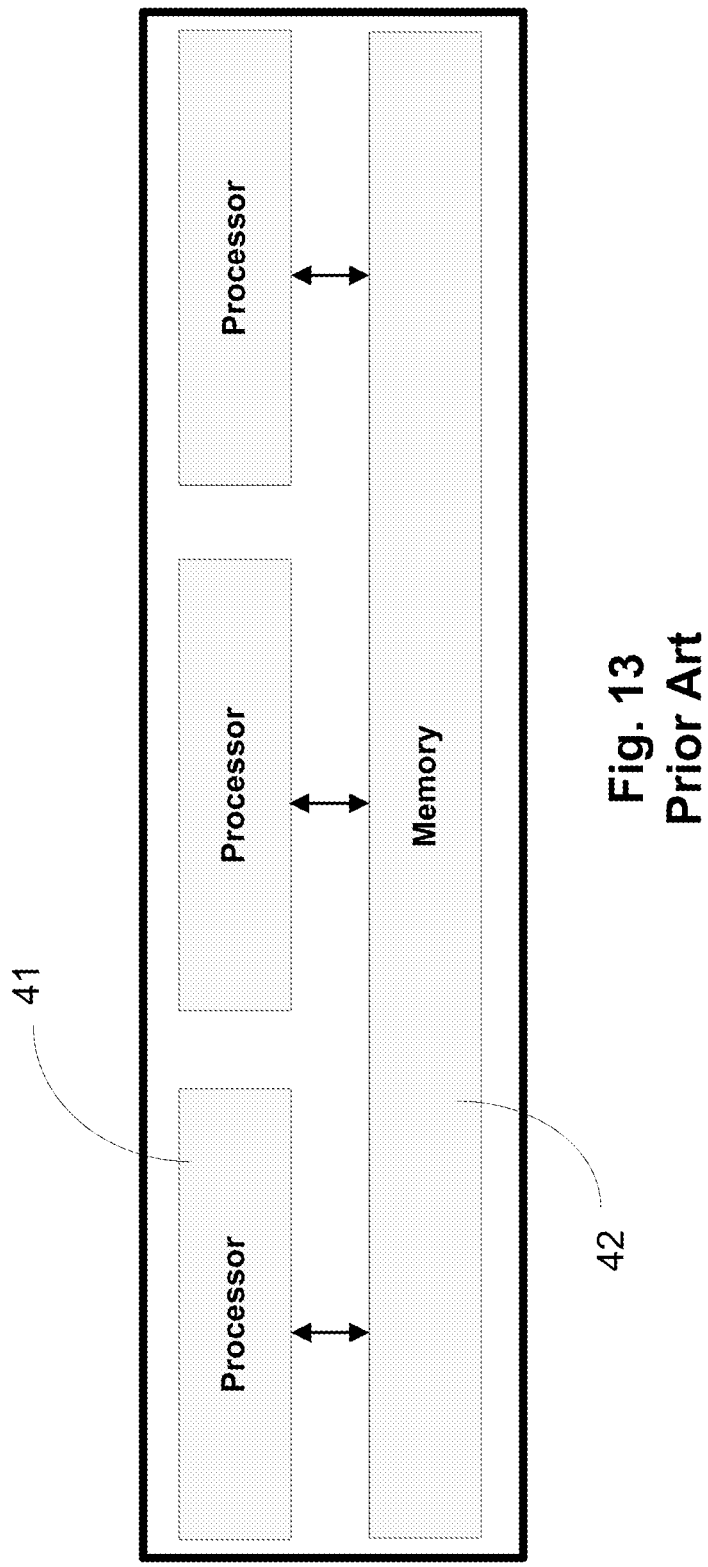
FIG. 13 is a functional diagram illustrating a conventional parallel cluster memory architecture.
Figure 37:
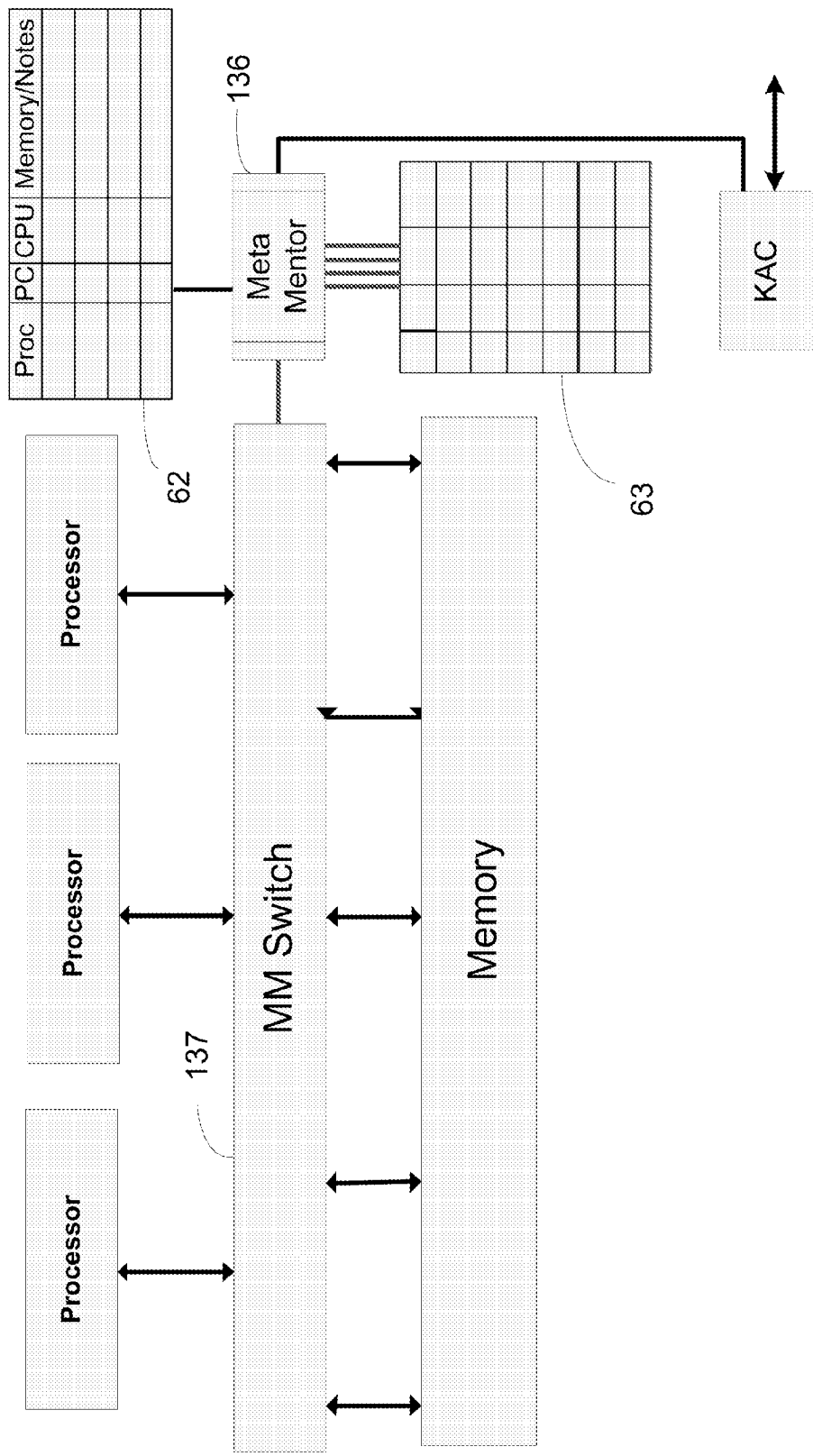
FIG. 37 is a functional block diagram illustrating a Meta Mentor incorporated according to this invention in a cluster computing system.

Referring to FIG. 37, as describe above cluster computing can be configured in parallel or distributed memory models, and illustrated is a Meta Mentor cluster with a common memory model, including a MM 136, a MM switch 137, a process table 62, and a rules set memory 63. This model is analogous to FIG. 13, however information needed to perform a common task is meted by the MM and its algorithms. The MM can allow inter-processor communication or require segregating each processor into separate domains by controlling the virtualized address space of each processor. This can involve dedicating a processor to an individual task and memory space or dynamically assigning components to multiple processes and operating systems.

Figure 14:
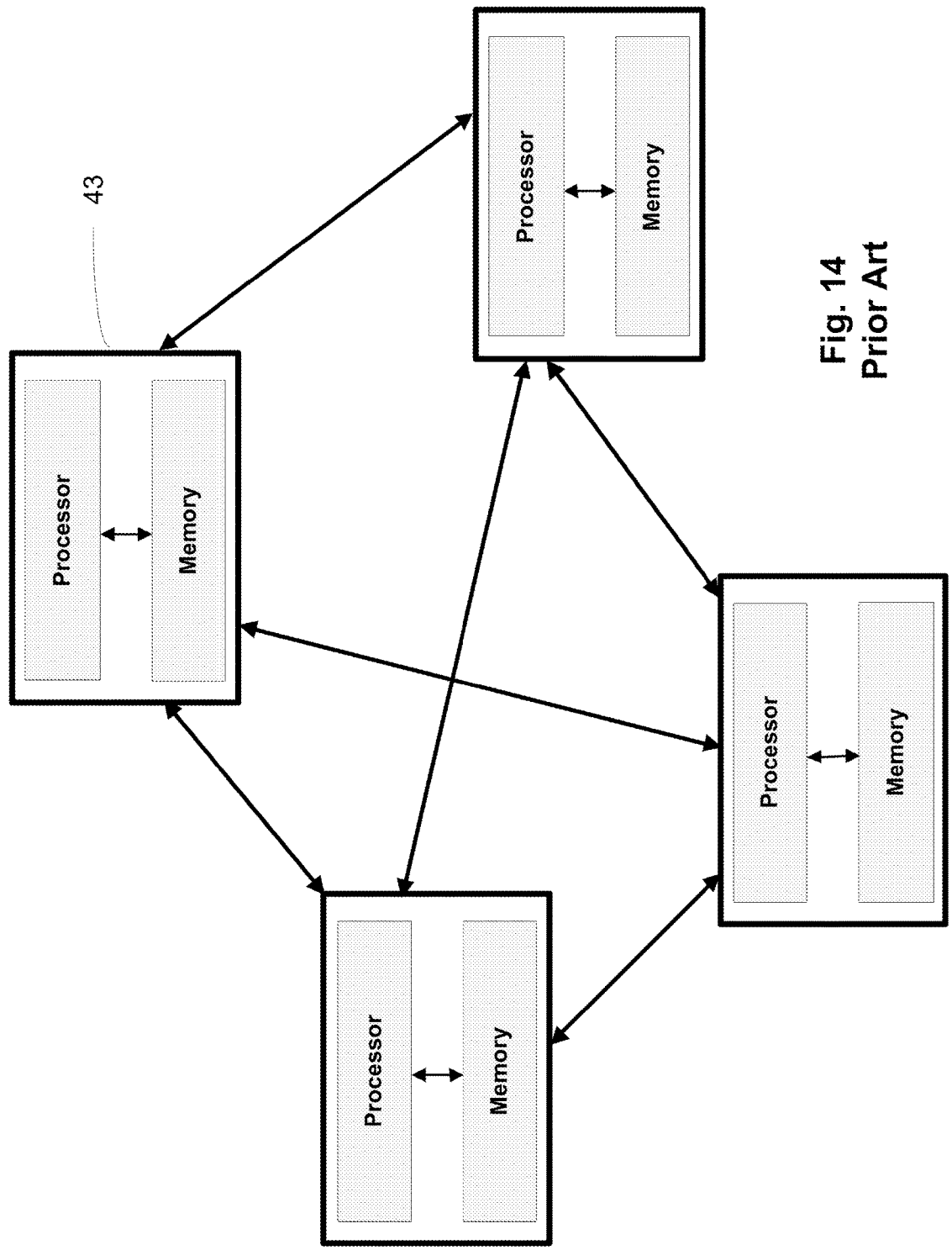
FIG. 14 is a functional diagram illustrating a conventional distributed cluster memory architecture.
Figure 15:
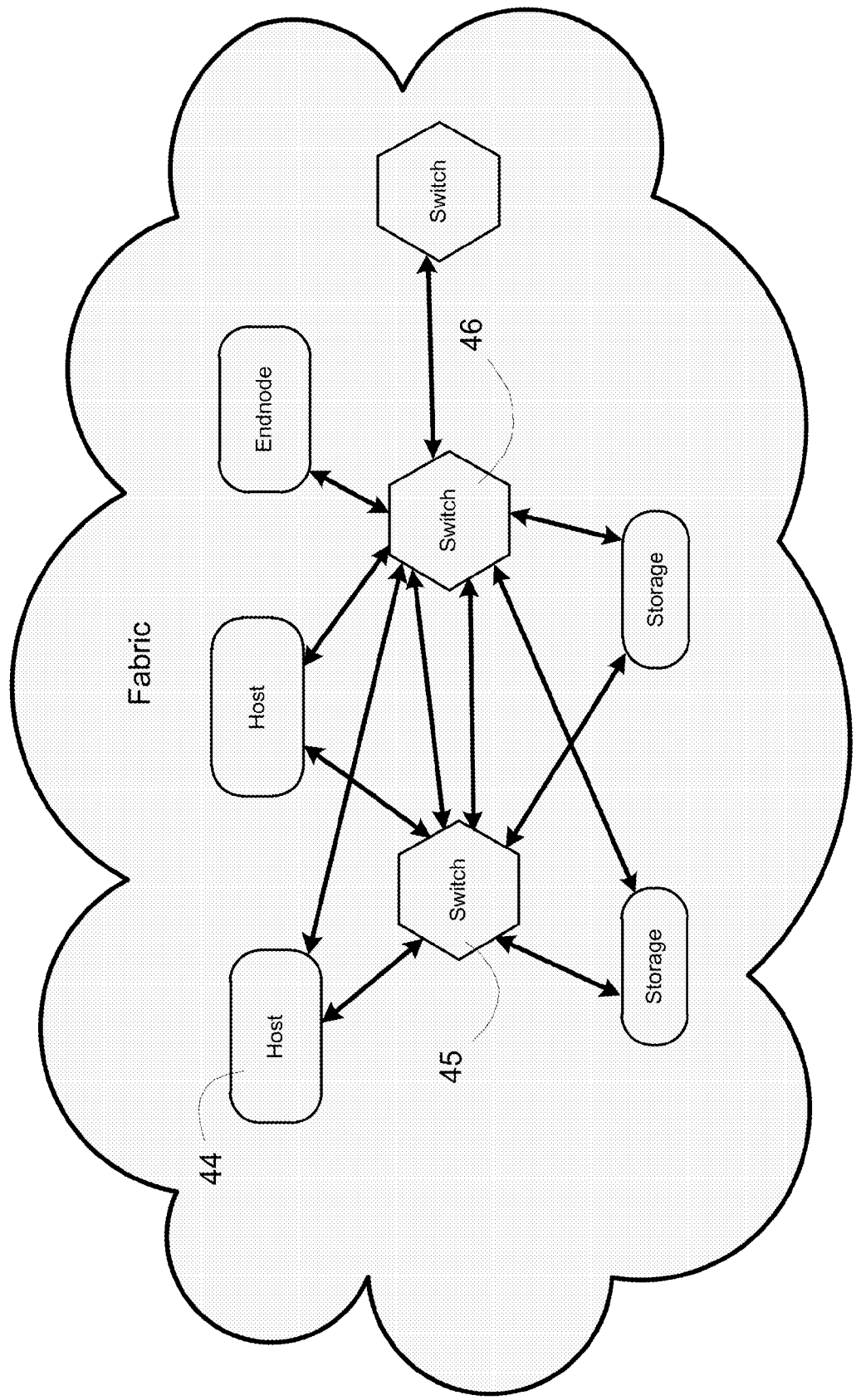
FIG. 15 show a functional diagram illustrating a conventional switched fabric architecture.
Figure 16:
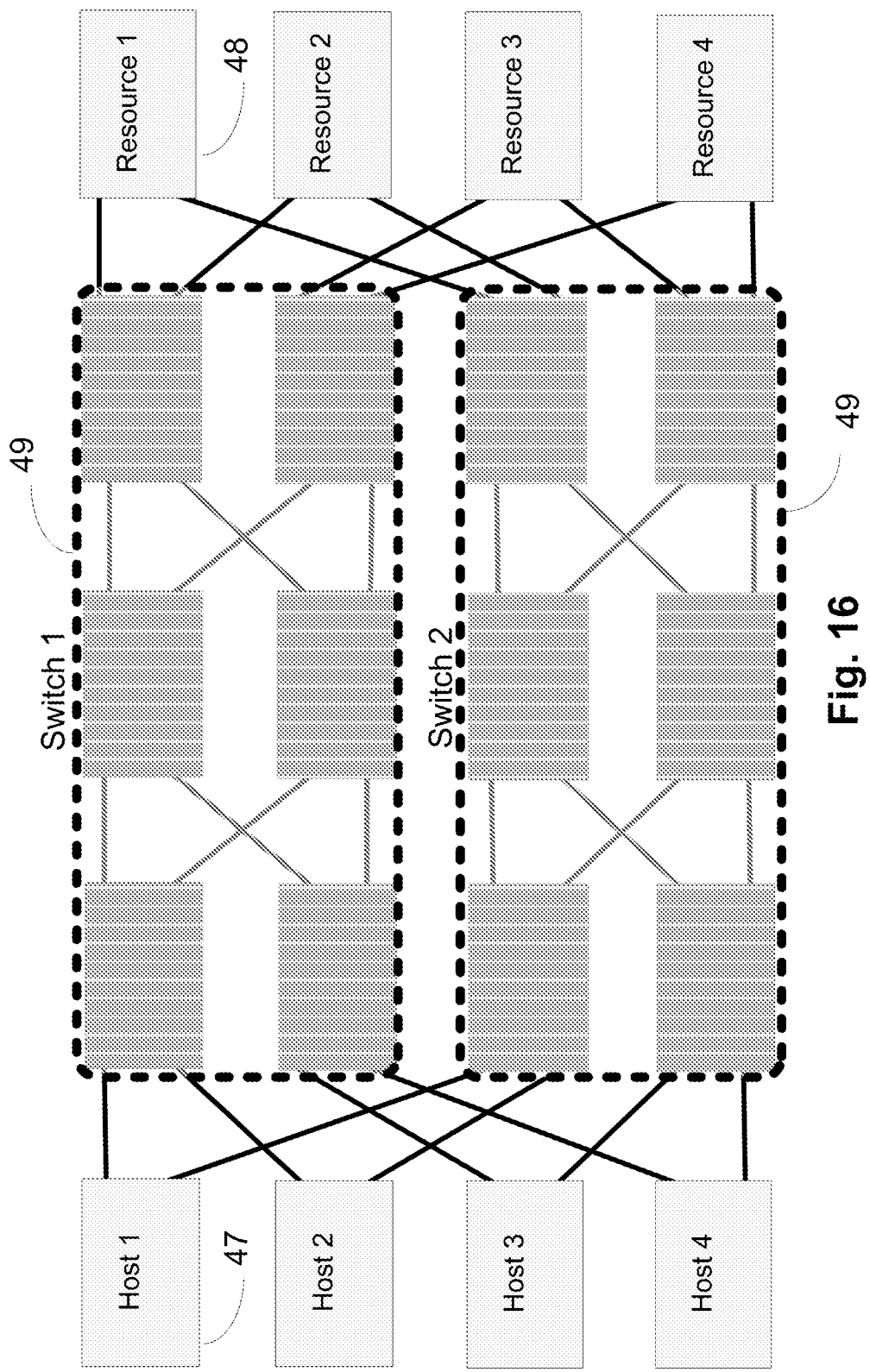
FIG. 16 is a functional diagram illustrating a Clos network decision block.
Figure 38:
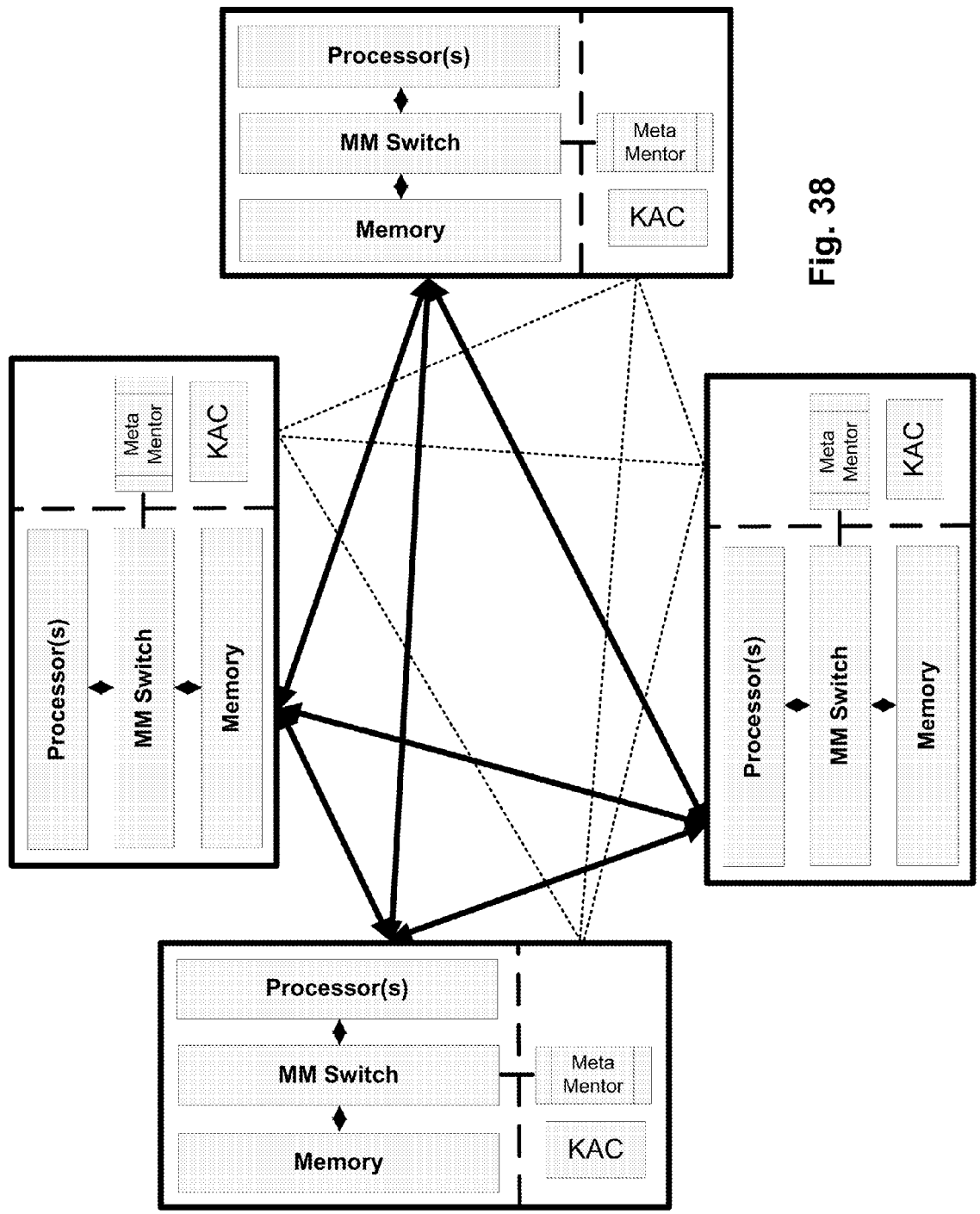
FIG. 38 is a functional block diagram illustrating Meta Mentors incorporated according to this invention in a parallel configuration.

Referring to FIG. 38, illustrated is a Meta Mentor in parallel configuration. This scenario is similar to MM cloud computing, however in cluster computing the network between nodes is localized and not distributed across a wide area network. The MM configuration in FIG. 38 is analogous to the cluster configurations in FIGS. 14 and 15, and grid configurations of FIGS. 34, 35, and 36.

Figure 39:
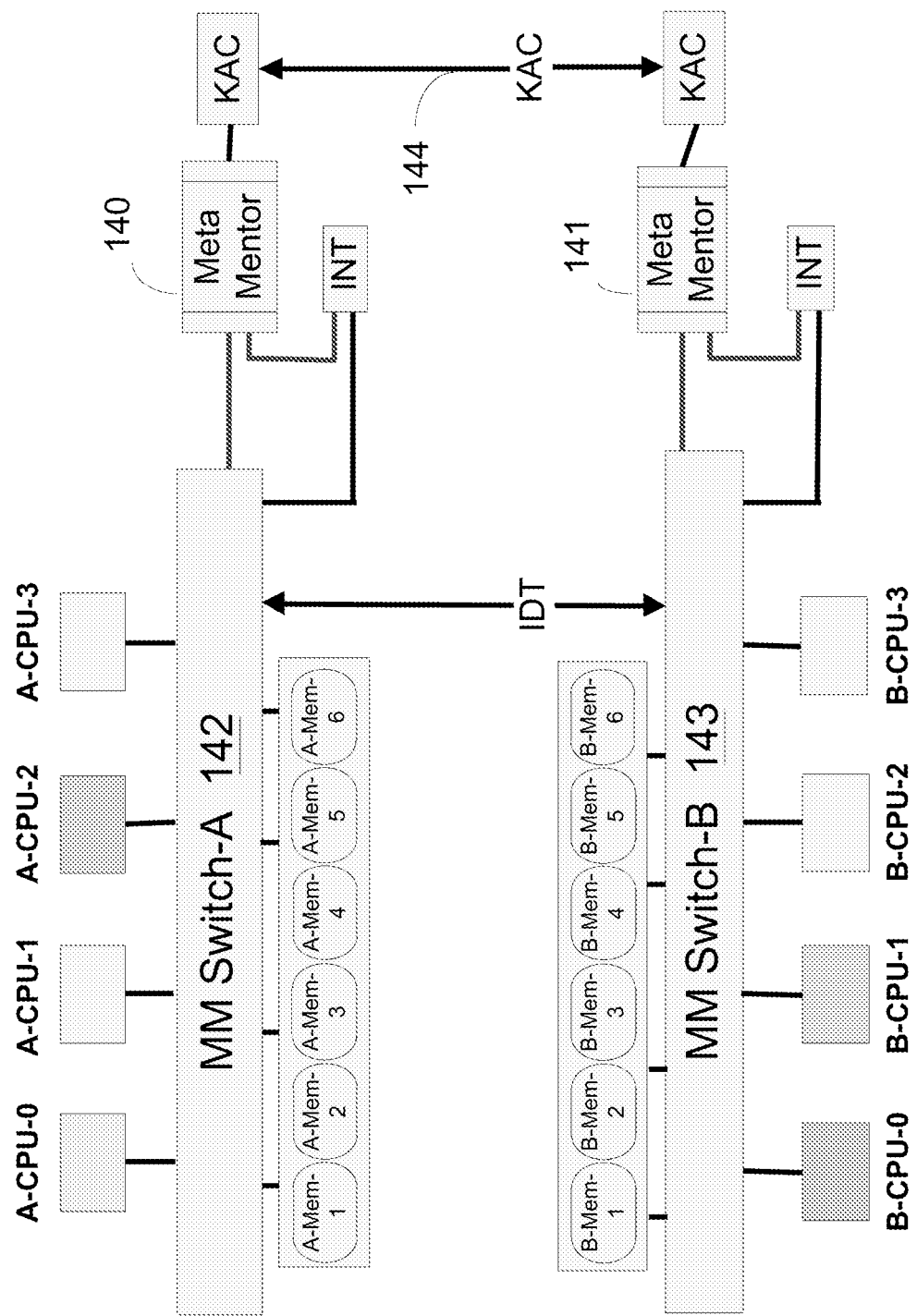
FIG. 39 is a functional block diagram illustrating Meta Mentors incorporated according to this invention simultaneously in both parallel and distributed models (PDM).

Referring to FIG. 39, illustrated are two distributed processor systems, A and B, each controlled by respective MMs, 140 and 141, which communicate with each other.

System A comprises four CPUs, A-CPU-0 through A-CPU-3, communicating with system A memory units, A-Mem-1 through A-Mem-6, via MM switch 142, and system B comprises four CPUs, B-CPU-0 through B-CPU-3 communicating with system B memory units, B-Mem-1 through B-Mem-6, via MM switch 143. This is an example of individual computer systems configured simultaneously in both parallel and distributed models (PDM). In PDM, instructional information and data are transferred between the system A's DID and system B's DID via inter domain transfer connection labeled IDT, and the scheduling and I/O information such as interrupt information is transferred via the KAC connection 144 which provides communication between A's and B's respective MM domains. For simplicity networking switches located external to the MMs are not shown although a network switches of any type can be inserted between MM system domains.

Because the MM domain schedules processes and defines address space, a process assigned to one system, e.g. A-CPU-3, using instruction information found in a system memory, e.g. A-Mem-1, is able to store data information on the other system, e.g. memory B-Mem-4. An alternative scenario is a process using instruction information found in A-Mem-1, assigned to A-CPU-1, is able to replicate and retrieve data information from devices A-Mem-3 and B-Mem5, or any combination of devices. Another combination can start two or more identical processes at the same time on both systems, one on system A and one on system B; then measure and compare the performance of each system. Using this technique the performance of hardware and software components may be analyzed by permutating the components among the systems.

As explained previously, the MM domain can dynamically define memory areas as instructional areas or data areas. This ability to dynamically define memory areas is expandable, depending on specific applications, to classifying memory and processes by other categories and definitions. In classical von Neumann, Harvard, and dataflow architectures types of memory are limited to instructional and data. Although instructional information can define memory as an input/output port, it can also define the same memory as regular memory, or regular memory as input/output ports. In a single domain it is not possible to define an invariant memory space due to the circular logic of algorithms defining memory address space. In a MM domain instructional information does not define the address space. This means the MM defines a particular type of input/output port that cannot be changed by instructional information. The MM can record memory access and apply rules and conditions to which processes may read or write information to memory.

For example a popular input/output port is called a Universal Serial Bus port (USB). A USB device is designed to transfer information bi-directionally between an external source and the system DID. This device has a history of executing instruction information that was not intended to be executed. This can be accomplished by executing instructions from a device itself or transferring instruction information from the device into a system DID.

In the case of executing instruction information from the device, prevention of this can be a simple matter of the MM rule set not allowing a connection or scheduling processes that emanate from a USB device. Since the MM defines the address space, there can be rules such as: any device that is executed from a USB device may only access an output device such as a display; this process may only access a restricted region of memory and cannot start another process or child process. Such rules can be simple or quite extensive.

Transferring information from a USB device into an MM domain can be classified into four types. Type 1 is transferring USB data information to the MM domain as data information. The MM stores this transfer type into a data memory address. Type 2 transfers USB instruction information masquerading as data information. This condition can be employed in single domain systems to execution instruction information that is mean spirited and is referred to as malware. However, in the MM domain this information is designated as data and cannot be scheduled for execution. If a process or device should attempt to start a process of any type with the data information, an error would be generated and alerts be raised. Conversely, a Type 3 transfers instruction information from the USB device into instruction memory location within this MM system. Should a process attempt to use the instruction information as data, the MM rule set would prevent the operation, identify it as an error, and raise an alert. A Type 4 transfer is instruction information from a USB to the instruction memory location within the MM domain. In a Type 4 transfer, instruction information may execute under the same rule set as the instructions from the USB device itself. A transferred Type 4 process may be promoted to another rules set. Promotion may be limited to conformation such as encryption and cyphers that are inputted from hardware devices receiving information from a non-system source, for example a keyboard or fingerprint reader, scheduled by the Meta Mentor. These devices cannot be spoofed in a MM domain since the MM schedules the device and defines all information transferred within the system.

Transferring information to the USB device is subject to the MM rule set. The rule set may define the quantity, type, and/or owner of the information transferred to the USB device. Changing this rule set may require the same conformation process using encryption and cyphers that are scheduled by the MM.

As previously explained, elements in the MM domain define memory addresses and schedules processes for the DID, and elements in the DID execute the processes using the instructional and data address space defined by the MM domain. This feature allows the MM domain to permutate and analyze individual components and processes of the system.

Figure 40:
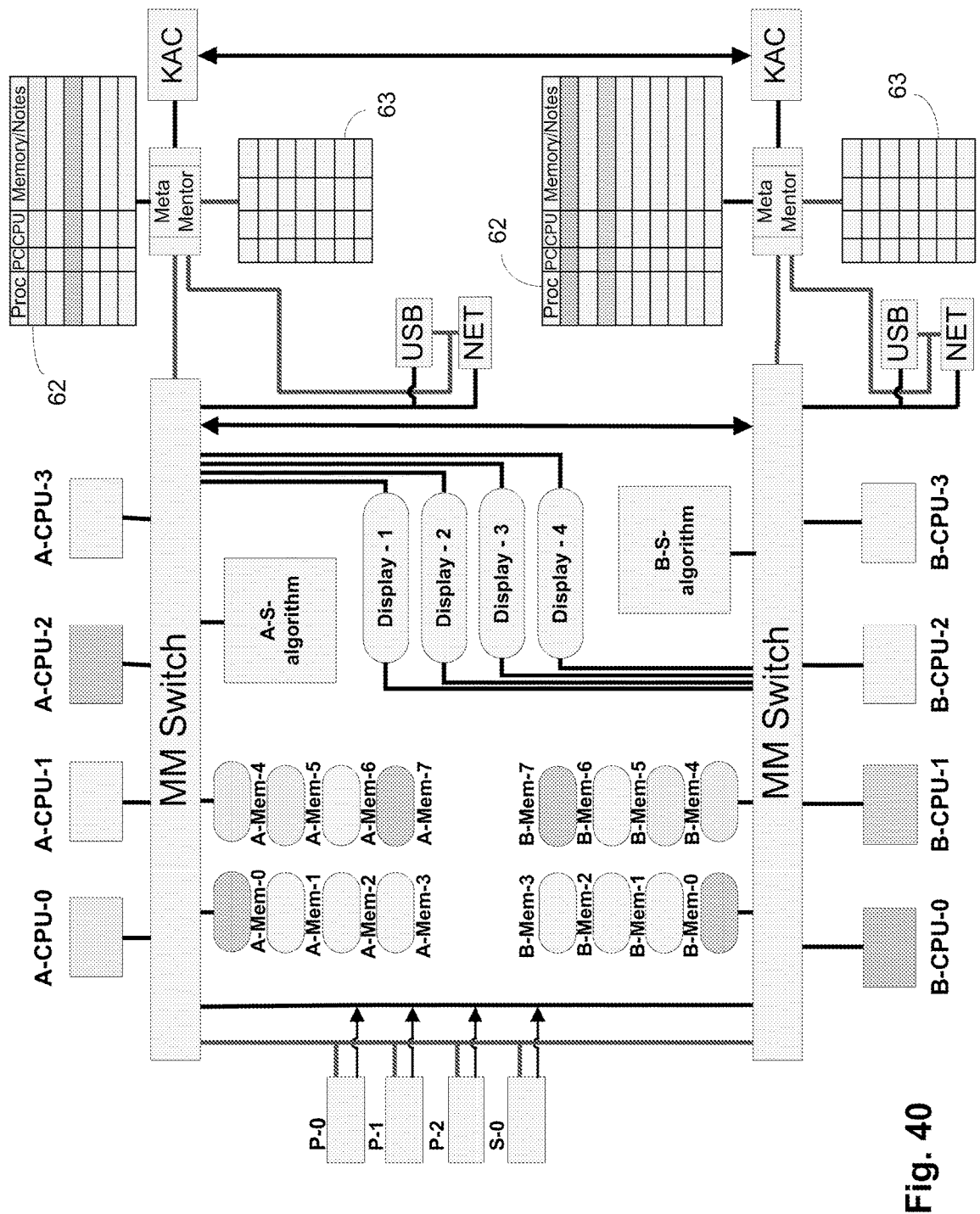
FIG. 40 is a functional block diagram illustrating two Meta Mentors incorporated according to this invention connected to common components.

Referring to FIG. 40, illustrated are two MM systems connected to common components P-0 through P-4, S-0, and Display-1 through Display-4. The two MMs are connected by their respective keep alive controllers (KAC). The components P-0, P-1, P-2, and S-0 are sensors units, referred as the sensors, that display their output on Display-1, Display-2, Display-3, Display-4 respectfully. These components are representative components of the MM system. The raw readings from sensors P-0, P-1, P-2 are converted to meaningful, display ready, values by using a lookup table that resides in data information memory devices A-Mem-0 through A-Mem-7 and B-Mem-0 through B-Mem-7. Sensor unit S-0 using an algorithm to transform the raw reading into a meaningful display using instructional information memory labels A-S-algorithm and B-S-algorithm. Component performance will compare values without interaction of other components within the system using Euler squares or Graeco-Latin squares. Although this analysis uses a square, the analysis can be configured in a rectangular form using replaceable components within the system.

The basic method using the sensors P-x (where x is represents 0, 1, 2); CPU-y (where y represents A-CPU-0 through A-CPU-3 and B-CPU-0 through B-CPU-3); and xx is any number 0, 1, 2, 3, 4, 5, 6, 7.
  a. Assign CPU-y to start the Analog-Digital Conversion (A-D) of P-x
  b. Read the output
  c. Use a lookup table to convert the value
  d. Display the value The basic method using the sensor S-0 is:
  a. Assign CPU-y to start a new reading on the S-0 sensor
  b. Read the output
  c. Use the S-algorithm to calculate a value
  d. Display the value The first cycle (1-1) starts with Meta Mentor A assigning A-CPU-0 to start the A-D of P-0. Meta Mentor B assigning B-CPU-0 to start the A-D of P-0.

Step 1-2; MM-A assigns A-CPU-2 to start the A-D of P-2 and MM-B assigns B-CPU-1 to start the S-0 conversion. Also in this step, A-CPU-0 reads the output of P-0 and B-CPU-0 reads the output of P-1.

Step 1-3; A-CPU-0 performs a lookup to convert the raw output of P-0 to a meaningful number using memory A-Mem-xx to a meaningful number. B-CPU-0 performs a lookup to convert the raw output of P-1 using B-Mem-xx to a meaningful. A-CPU-2 reads the output of P-2 and B-CPU-1 read the raw output of S-0.

Step 1-4; A-CPU-0 displays its result on Display-1. This completes the process assigned to A-CPU-0 and A-CPU-0 is put into a wait state. B-CPU-1 displays its result on Display-2. This completes the process assigned to B-CPU-1 and B-CPU-1 is put into a wait state. A-CPU-2 performs a lookup to convert the output of P-2 into a meaningful number. And B-CPU-1 starts the B-S-Algorithm to compute a meaningful number from the raw output of S-0.

Step 1-5; A-CPU-2 displays its result on Display-3. This completes the process assigned to A-CPU-3 and A-CPU-3 is put into a wait state. B-CPU-1 displays its result on Display-4, which completes its process and B-CPU-1 is put into a wait state.

Figure 41:
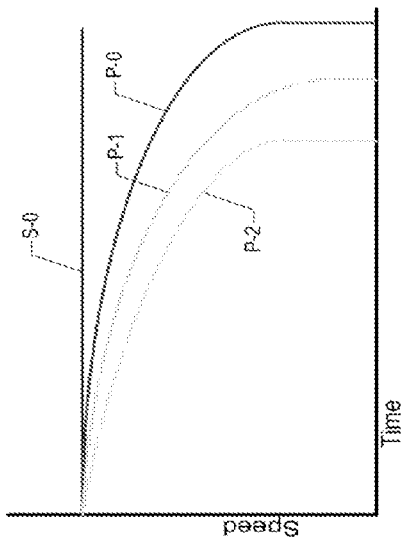
FIG. 41 are tables and a graph illustrating output of the Meta Mentor system according to FIG. 40.

Referring to FIG. 41, the output of the sensors display is shown in Table A. All display should have close to the same value and one may observe the reading of P-2, A-CPU-2 is significantly different from the other readings. In a classical computer quorum the entire system would be disabled at this point. The MM system will determine which component failed and the computer system will be able to reconfigure itself and continue to function, blacklisting the failed component or process.

The second cycle, 2-1 can be started as soon as A-CPU-0 and B-CPU-0 are available. Meta Mentor A assigns A-CPU-0 is assigned to start the A-D of P-1. Meta Mentor B assigning B-CPU-0 to start the A-D of P-2.

Step 2-2; MM-A assigns A-CPU-2 to start the A-D of S-0 and MM-B assigns B-CPU-1 to start the P-0 conversion. Also in this step, A-CPU-0 reads the output of P-1 and B-CPU-0 reads the output of P-2.

Step 2-3; A-CPU-0 performs a lookup to convert the raw output of P-1 to a meaningful number using memory A-Mem-xx to a meaningful number. B-CPU-0 performs a lookup to convert the raw output of P-2 using B-Mem-xx to a meaningful. A-CPU-2 reads the output of S-0 and B-CPU-1 read the raw output of P-0.

Step 2-4; A-CPU-0 displays its result on Display-2. This completes the process assigned to A-CPU-0 and A-CPU-0 is put into a wait state. B-CPU-1 displays its result on Display-3. This completes the process assigned to B-CPU-1 and B-CPU-1 is put into a wait state. A-CPU-2 starts the A-S-Algorithm to compute a meaningful number from the raw output of S-0. B-CPU-1 performs a lookup to convert the output of P-0 using B-Mem-xx into a meaningful number.

Step 2-5; A-CPU-2 displays its result on Display-4. This completes the process assigned to A-CPU-3 and A-CPU-3 is put into a wait state. B-CPU-1 displays its result on Display-1, which completes its process and B-CPU-1 is put into a wait state.

The third cycle, 3-1 can be started as soon as A-CPU-0 and B-CPU-0 are available. Meta Mentor A assigns A-CPU-0 is assigned to start the A-D of P-2. Meta Mentor B assigning B-CPU-0 to start the A-D of S-0.

Step 3-2; MM-A assigns A-CPU-2 to start the A-D of P-0 and MM-B assigns B-CPU-1 to start the P-1 conversion. Also in this step, A-CPU-0 reads the output of P-2 and B-CPU-0 reads the output of S-0.

Step 3-3; A-CPU-0 performs a lookup to convert the raw output of P-2 to a meaningful number using memory A-Mem-xx to a meaningful number. B-CPU-0 starts the B-S-Algorithm to compute a meaningful number from the raw output of S-0. A-CPU-2 reads the output of P-0 and B-CPU-1 read the raw output of P-1.

Step 3-4; A-CPU-0 displays its result on Display-3. This completes the process assigned to A-CPU-0 and A-CPU-0 is put into a wait state. B-CPU-0 displays its result on Display-4. This completes the process assigned to A-CPU-0 and B-CPU-0 is put into a wait state. A-CPU-2 performs a lookup to convert the output of P-0 into a meaningful number using A-Mem-xx. B-CPU-1 performs a lookup to convert the output of P-1 into a meaningful number using B-Mem-xx.

Step 3-5; A-CPU-2 displays its result on Display-1. This completes the process assigned to A-CPU-3 and A-CPU-3 is put into a wait state. B-CPU-1 displays its result on Display-2, which completes its process and B-CPU-1 is put into a wait state.

The fourth cycle, 4-1 can be started as soon as A-CPU-0 and B-CPU-0 are available. Meta Mentor A assigns A-CPU-0 is assigned to start the A-D of S-0. Meta Mentor B assigning B-CPU-0 to start the A-D of P-0.

Step 4-2; MM-A assigns A-CPU-2 to start the A-D of P-1 and MM-B assigns B-CPU-1 to start the P-2 conversion. Also in this step, A-CPU-0 reads the output of S-0 and B-CPU-0 reads the output of P-0.

Step 4-3; A-CPU-0 starts the A-S-Algorithm to compute a meaningful number from the raw output of S-0. B-CPU-0 performs a lookup to convert the raw output of P-2 to a meaningful number using memory B-Mem-xx to a meaningful number. A-CPU-2 reads the output of P-0 and B-CPU-1 read the raw output of P-1.

Step 4-4; A-CPU-0 displays its result on Display-4. This completes the process assigned to A-CPU-0 and A-CPU-0 is put into a wait state. B-CPU-1 displays its result on Display-1. This completes the process assigned to A-CPU-0 and B-CPU-0 and they are put into a wait state. A-CPU-2 performs a lookup to convert the output of P-0 into a meaningful number using A-Mem-xx. B-CPU-1 performs a lookup to convert the output of P-1 into a meaningful number using A-MM-xx.

Step 4-5; A-CPU-2 displays its result on Display-2. This completes the process assigned to A-CPU-3 and A-CPU-3 is put into a wait state. B-CPU-1 displays its result on Display-3, which completes its process and B-CPU-1 is put into a wait state.

Referring again to FIG. 41, the outputs of all four cycles are shown in Table B. Since all of the expected output are known and should have the same value, it is deduced that sensor P-2 in error and is blacklisted from further use. The remaining components in the system are functional and available for use. Table C shows a pattern for A-Mem-xx lookup failure. Table D shows a problem with B-CPU-0 process, since a B-CPU-0 failure would not register a value. Table E shows a failure of all P series sensors. Graph-A shows how all three P style sensors might failure in a real-world condition. Since each sensor would fail at a different rate it could be deduced that the P series sensors failed and the S series sensor is the correct reading.

Referring to FIG. 42, illustrated is this type of analysis when applied to the processes of a Meta Mentor system. Using the aforementioned four step example, the top process in each step is the P sensor processing which represents seventy-five percent of the computing capacity. This is shown in Table F. Table G shows what happens if a process changes in the B-CPU-0 algorithms. This change may come from errant components, errant instructional information, and/or additional processes unintended processes such as malware.

Since the MM schedules all processes, these processes can be recorded by the MM's accounting systems and flagged as problematic. Mathematical techniques such as, Fuzzy Logic, Analysis of Variance or neural networks, shown in FIG. 43, may be used to define the MM system. In FIG. 43, a neural network is depicted for each Euler square in FIG. 42. Each CPU is considered an input neuron and System Resources are the output neurons. In this example, S and P algorithms neurons fire to system resources. The Mem-Data output neuron represents the P algorithms and Mem-Proc 1 represents the S algorithm. Network A shows the system in normal operation and "fires" the P neuron three times and the S neuron fires one time for each CPU per cycle. This is analogous to FIG. 42 Table F. Network B show a change in the system operation where A-CPU-0, A-CPU-2, and B-CPU-1 fire the same as in Network A, however, B-CPU-0 is firing a new neuron, neuron X, that is a different hidden layer configuration. Neuron X is using two new system resources, Mem-Proc 2 and I/O resource. In this way the Meta Mentor architecture can easily identify errant processes and component allocation.

The foregoing description and drawings were given for illustrative purposes only, it being understood that the invention is not limited to the embodiments disclosed, but is intended to embrace any and all alternatives, equivalents, modifications and rearrangements of elements falling within the scope of the invention as defined by the following claims.

The invention claimed is:

1. A dynamically erectable computer system comprising:
   a. a data and instruction domain comprising:
      i. a plurality of slave processors operating only in the data and instruction domain, and
      ii. a set of memories operable in the data and instruction domain;
   b. a meta mentor domain comprising:
      i. meta information comprising algorithms and a master rule set;
      ii. a mentor domain memory containing the meta information;
      iii. a first processor functioning as a rules server;
      iv. a plurality of secondary processors, each secondary processor mentoring one or more slave processors and enforcing a subset of the master rules served by the first processor, said subset of the rules being relevant to processes being run by said one or more slave processors; and
      v. a set of mentor switches providing communication between the slave processors and the set of memories in the data and instruction domain, the set of mentor switches cooperating with the secondary processors for mentoring all said communications according to the meta information.

2. The computer system according to claim 1 wherein the mentor domain memory comprises:
   a. a first memory containing the master set of rules accessible by the first processor; and
   b. a set of secondary memories corresponding to one or more of the secondary processors, each secondary memory containing a subset of rules relevant to the mentoring being done by said one or more secondary processors.

3. The computer system according to claim 1 wherein the plurality of slave processors operating only in the data and instruction domain includes parallelized processors each having a Von Neumann, Harvard, modified Harvard, or dataflow architecture.

4. A dynamically erectable computer system comprising:
   a. a set of processor cores operating only in the data and instruction domain partitioned into blocks, each core of each block containing an instruction and data cache;
   b. for each block, block meta information;
   c. a block memory operating in the meta mentor domain, the block memory functioning as a virtualized L2 cache for the instruction and data caches;
   d. a block mentor domain processor;
   e. a block mentor switch, the L2 cache being virtualized into at least multiple partitions for each block by the block mentor domain processor in cooperation with the block mentor switch according to said block meta information; and
   f. further comprising:
      i. a set of memories operating in the data and instruction domain;
      ii. overall meta information pertaining to all blocks;
      iii. a mentor domain memory containing the overall meta information;
      iv. an overall mentor domain processor including access to the overall meta information;
      v. an overall mentor switch providing communication between all the blocks and the set of memories operating in the data and instruction domain; and
      vi. a communication link between all the blocks and the overall mentor switch.

5. A dynamically erectable computer system comprising:
   a. a plurality of computer sub-systems, each comprising:
      i. a data and instruction domain comprising:
         1. a set of processors operating only in the data and instruction domain, and
         2. a set of memories operable in the data and instruction domain;
      ii. a meta mentor domain comprising:
         1. meta information;
         2. a mentor domain memory containing the meta information;
         3. a mentor domain processor including access to the mentor domain memory;
         4. a mentor switch cooperating with the mentor domain processor for mentoring all communications between the sets of processors and memories in the data and instruction domain according to the meta information;

b. a communication link for transferring information in the data and instruction domain among the plurality of computer sub-systems; and
c. a communication link for transferring information in the meta mentor domain among the plurality of computer sub-systems.

6. The computer system according to claim 5 further comprising:
   a. a plurality of sensors each communicating with the plurality of computer sub-systems; and
   b. a plurality of display devices each communicating with the plurality of computer sub-systems.

7. A dynamically erectable computer system comprising:
   a. a data and instruction domain comprising:
      i. a set of processors operating only in the data and instruction domain, and
      ii. a set of memories operable in the data and instruction domain; and
   b. a meta mentor domain comprising:
      i. meta information;
      ii. a mentor domain memory containing the meta information;
      iii. a plurality of mentor domain processors including access to the mentor domain memory; and
      iv. a set of mentor switches providing communication between the sets of processors and memories in the data and instruction domain, the set of mentor switches cooperating with the plurality of mentor domain processors for mentoring all said communications according to the meta information,
   c. wherein the meta information includes a master set of rules;
   d. and wherein the plurality of mentor domain processors comprises a first processor functioning as a rules server; and a set of secondary processors mentoring a set of processors operating only in the data and instruction domain, said mentoring including at least enforcing a subset of the master rules served by the first processor, said subset of the rules being relevant to processes being run by said set of processors operating only in the data and instruction domain.

8. The computer system according to claim 7 wherein the mentor domain memory comprises:
   a. a first memory containing the master set of rules accessible by the first processor; and
   b. a set of secondary memories corresponding to the set of secondary processors, each secondary memory containing a subset of rules relevant to the mentoring being done by said each secondary memory's corresponding set of secondary processors.

9. A dynamically erectable computer system comprising:
   a. a data and instruction domain comprising:
      i. a set of processor cores operating only in the data and instruction domain, and
      ii. a set of caches operable in the data and instruction domain;
   b. a meta mentor domain comprising:
      i. meta information including a master set of rules;
      ii. a first processor functioning as a rules server;
      iii. a set of secondary processors mentoring a corresponding set of processor cores, said mentoring including at least enforcing a subset of the master rules served by the first processor, said subset of the rules being relevant to processes being run by said corresponding set of processor cores;
      iv. a first memory containing the master set of rules accessible by the first processor;
      v. a set of secondary memories corresponding to the set of secondary processors, each secondary memory containing a subset of rules relevant to the mentoring being done by said each secondary memory's corresponding set of secondary processors; and
      vi. a set of mentor switches providing communication between the sets of processor cores and caches, the set of mentor switches cooperating with the set of mentor domain processors for mentoring all said communications according to the meta information.

10. The computer system according to claim 9 wherein the set of processor cores comprises a single core having an instruction cache, an data cache, and a level two (L2) cache, and wherein the set of mentor switches provides communication between the instruction cache and data cache, and the L2 cache, the set of mentor switches cooperating with the set of mentor domain processors for mentoring said communication, said mentoring comprising virtualizing information being transferred to and from the L2 cache.

11. The computer system according to claim 9 wherein the set of processor cores are multiple cores characterized as follows: each core having a control unit and an arithmetic-logic unit, each core having in its control unit an associative instruction cache in communication with a common instruction bus, each core having in its arithmetic-logic unit an associative data cache in communication with a common data bus, and a common level two (L2) cache; and wherein:
    a. the set of mentor switches provides communication between the common instruction and data buses, and the L2 cache, the set of mentor switches cooperating with the set of mentor domain processors for mentoring said communication, said mentoring comprising virtualizing information being transferred to and from the L2 cache; and
    b. further comprising a core meta mentor comprising:
       i. core meta information;
       ii. a mentor domain memory containing the core meta information;
       iii. a core mentor domain processor including access to the core mentor domain memory;
       iv. a core mentor switch cooperating with the core mentor domain processor for mentoring all communications between the control units of the cores and their respective arithmetic-logic units according to the core meta information; and
       v. a communication link between the core mentor domain processor and the set of mentor domain processors mentoring the L2 cache for coordination.

12. The computer system according to claim 9 further comprising a tertiary memory operating in the meta mentor domain, the tertiary memory functioning as an L2 cache virtualized into at least two partitions for each processor core by a mentor domain processor in cooperation with a mentor switch according to said meta information.

13. The computer system according to claim 9 wherein the set of processor cores comprise a set of graphics processing units, and the set of caches comprises a set of L2 caches in communication with a like number of frame buffers, and wherein the meta information is used by the set of mentor switches in cooperation with the set of mentor domain processors to virtualize the set of L2 caches.

* * * * *